(12) United States Patent
Volin

(10) Patent No.: US 10,667,490 B2
(45) Date of Patent: Jun. 2, 2020

(54) BIG-DOG-ACCOMMODATING TRIPLE-HINGED MULTI-FUNCTION-SHELF-TRUNK-PLATFORM-AND-DOOR PET CRATE, HAVING MULTI-FUNCTION SLANTED URINE-STORING BED-ROOF-TERRACE SYSTEM, MULTI-FUNCTION PLATFORM-LOCKING SHOCK-ABSORBING GUSSET SYSTEM, MULTI-FUNCTION GROOMING-PLATFORM SYSTEM, AND MULTI-FUNCTION BIG-DOG-ACCOMMODATING TRIPLE-HINGED TRIPLE-FRONT-LOCK SINGLE-TOP-LOCK SHELF-TRUNK-PLATFORM-AND-DOOR SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 208 days.

(21) Appl. No.: 16/035,082

(22) Filed: Jul. 13, 2018

(65) Prior Publication Data

US 2020/0015449 A1 Jan. 16, 2020

(51) Int. Cl.
*A01K 1/03* (2006.01)
*A01K 1/01* (2006.01)
(Continued)

(52) U.S. Cl.
CPC ............ *A01K 1/034* (2013.01); *A01K 1/0107* (2013.01); *A01K 13/001* (2013.01);
(Continued)

(58) Field of Classification Search
CPC ...... A01K 1/0245; A01K 1/033; A01K 1/034; A01K 1/03; A01K 1/0236; A01K 1/035;
(Continued)

(56) References Cited

U.S. PATENT DOCUMENTS 2,712,677 A 7/1955 Hyde
2,758,646 A 8/1956 Johnson
(Continued)

*Primary Examiner* — Yvonne R Abbott-Lewis

(57) ABSTRACT

A big-dog-accommodating triple-hinged multi-function-shelf-trunk-platform-and-door pet crate comprises top, bottom, left, right, front, and rear panels attached to one another, multi-function slanted urine-storing bed-roof-terrace having built-in gutters and ridges disposed on the bottom panel, a grooming platform, multi-function shock-absorbing gussets covering all the corners of the panels to lock the grooming platform and to absorb shocks and vibrations, a big-dog-accommodating triple-hinged multi-function-shelf-trunk-platform-and-door having triple hinges thereon to allow it to close after a big dog enters the pet crate and to allow it to also function as a shelf or a trunk or a platform, triple locking rods to lock the big-dog-accommodating triple-hinged multi-function-shelf-trunk-platform-and-door to the front panel, a palm knob with palm recesses and palm hills for an arthritic to use without the need for folding his or her fingers, a spring-loaded palm knob to lock the big-dog-accommodating triple-hinged multi-function-shelf-trunk-platform-and-door against and parallel to the top panel, and double magnets attached to the big-dog-accommodating triple-hinged multi-function-shelf-trunk-platform-and-door system and the front panel, respectively, to stop the big-dog-accommodating triple-hinged multi-function-shelf-trunk-platform-and-door from swinging.

20 Claims, 74 Drawing Sheets

(51) Int. Cl.
*A01K 13/00* (2006.01)
*E05C 19/16* (2006.01)
*E05B 1/00* (2006.01)
*E05C 9/06* (2006.01)
*E05C 9/20* (2006.01)

(52) U.S. Cl.
CPC .......... *E05B 1/0053* (2013.01); *E05B 1/0092* (2013.01); *E05C 9/06* (2013.01); *E05C 9/20* (2013.01); *E05C 19/16* (2013.01)

(58) Field of Classification Search
CPC ........ A01K 31/02; A01K 31/06; A01K 13/00; A01K 1/0017; A01K 1/031; A01K 23/005; A01K 31/08; A01K 31/10; E06B 7/32
See application file for complete search history.

(56) References Cited

U.S. PATENT DOCUMENTS

| | | | |
|---|---|---|---|
| 3,098,465 A | 7/1963 | Ivey | |
| 3,978,616 A | 9/1976 | Pennock | |
| 4,216,743 A | 8/1980 | Cohen | |
| 4,776,133 A | 10/1988 | Green | |
| 5,016,926 A | 5/1991 | Sharp | |
| 5,476,066 A | 12/1995 | Hoffman | |
| D367,734 S | 3/1996 | Sharp | |
| 5,497,728 A | 3/1996 | Watanabe | |
| 6,385,909 B1 | 5/2002 | Marsh | |
| 6,688,657 B2 | 2/2004 | Peacock | |
| 6,732,676 B1 | 5/2004 | Smith | |
| 7,120,967 B2 | 10/2006 | Johnson | |
| 7,918,188 B1 | 4/2011 | Harper | |
| 7,950,439 B2 | 5/2011 | Anderson | |
| 8,267,048 B2 | 9/2012 | Flannery | |
| 8,408,416 B2 | 4/2013 | Cheng-Lung | |
| 8,985,058 B2 | 3/2015 | Cantwell | |
| 9,115,523 B2 | 8/2015 | Friesen | |
| 9,297,190 B2 | 3/2016 | Lee | |
| 9,357,748 B2 | 6/2016 | Cantwell | |
| 9,546,511 B2 | 1/2017 | Dittmer | |
| D778,510 S | 2/2017 | Edmonds | |
| 9,695,636 B2* | 7/2017 | Cantwell | A01K 1/034 |
| 9,943,063 B1* | 4/2018 | Volin | A01K 1/0353 |
| 2007/0012257 A1* | 1/2007 | Siegal | A01K 31/06 119/479 |
| 2010/0282179 A1 | 11/2010 | Ho | |
| 2014/0150728 A1* | 6/2014 | Tamiozzo | A01K 1/0236 119/501 |
| 2017/0020103 A1 | 1/2017 | Nichols | |
| 2017/0122350 A1* | 5/2017 | Link | F16B 5/0004 |

* cited by examiner

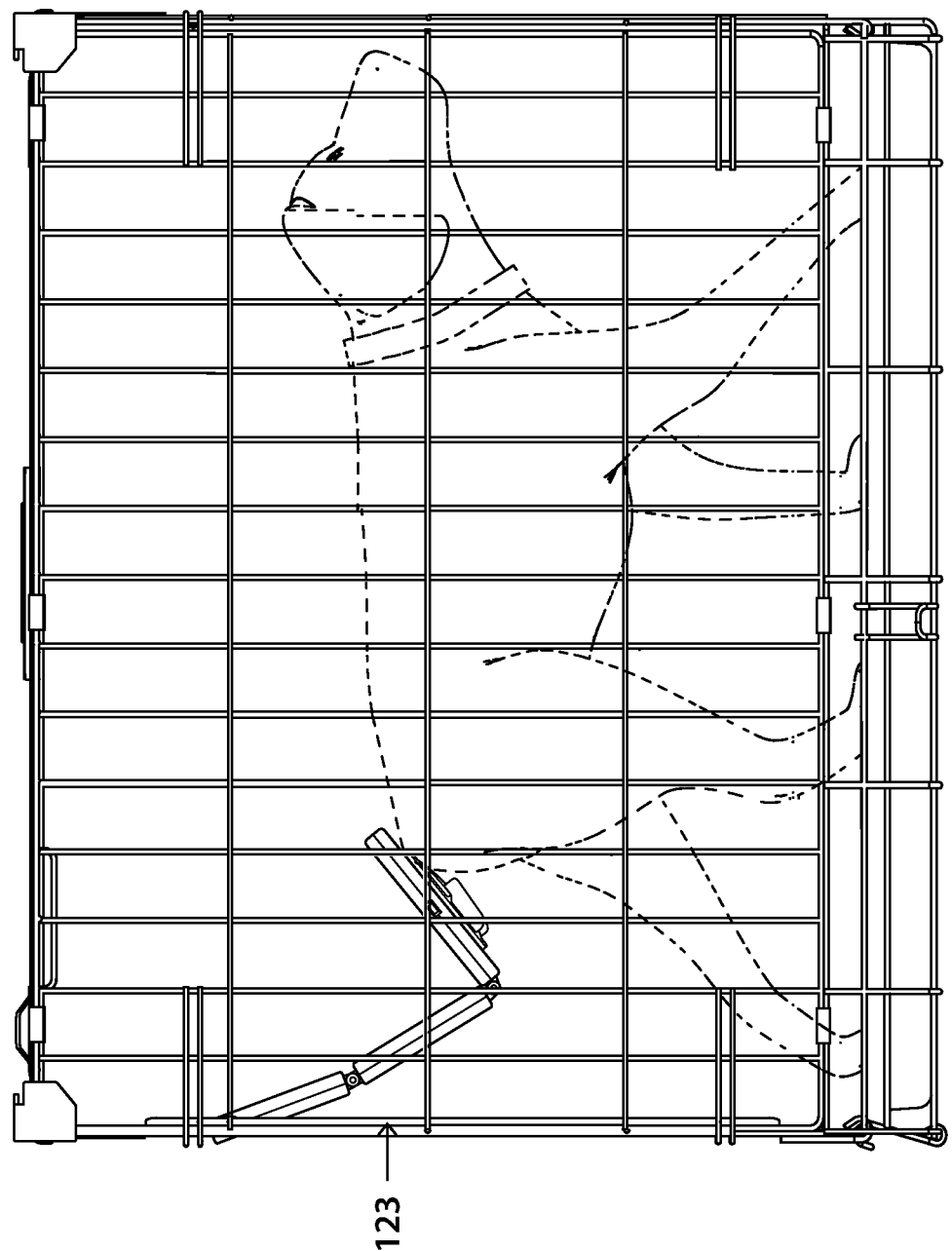

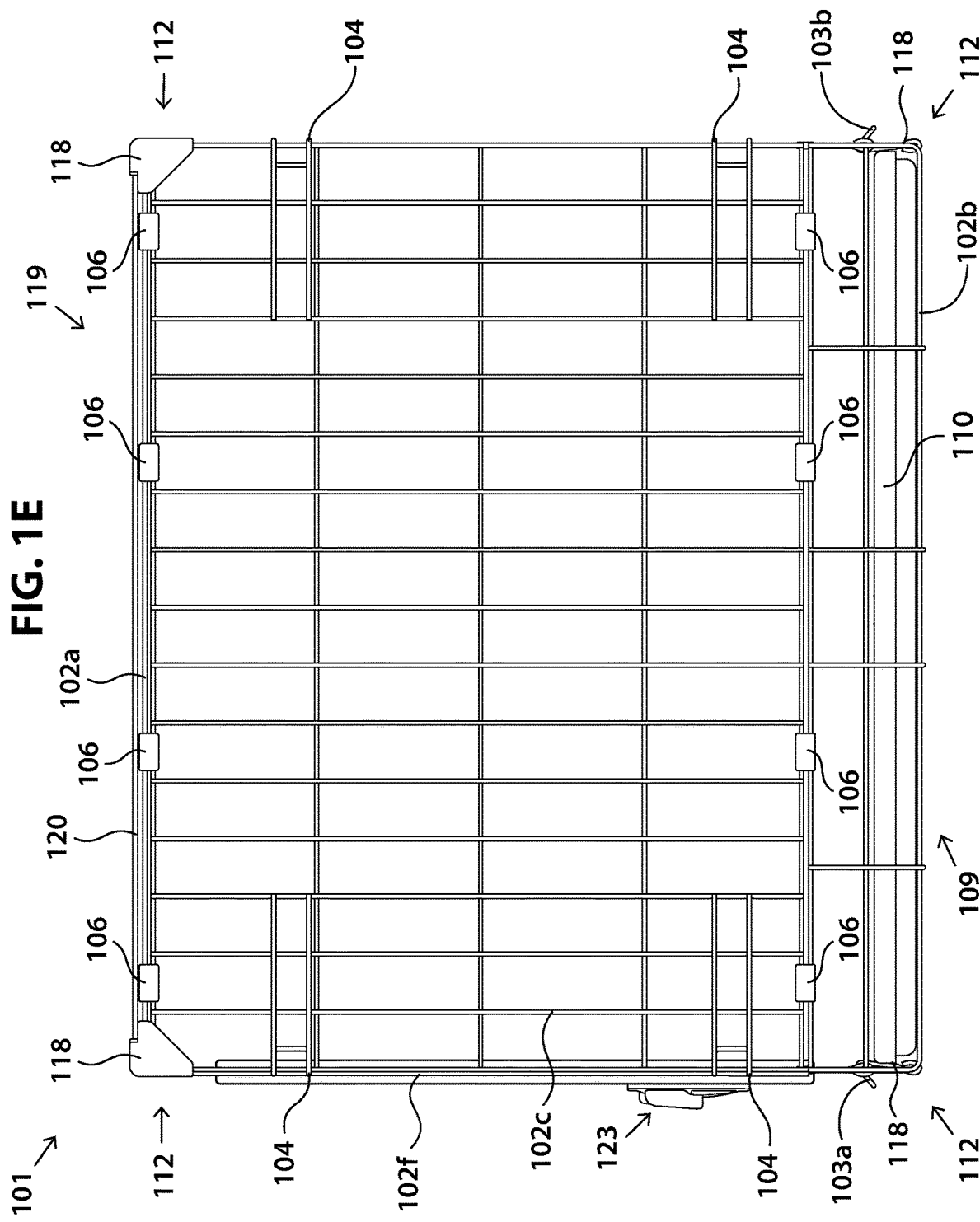

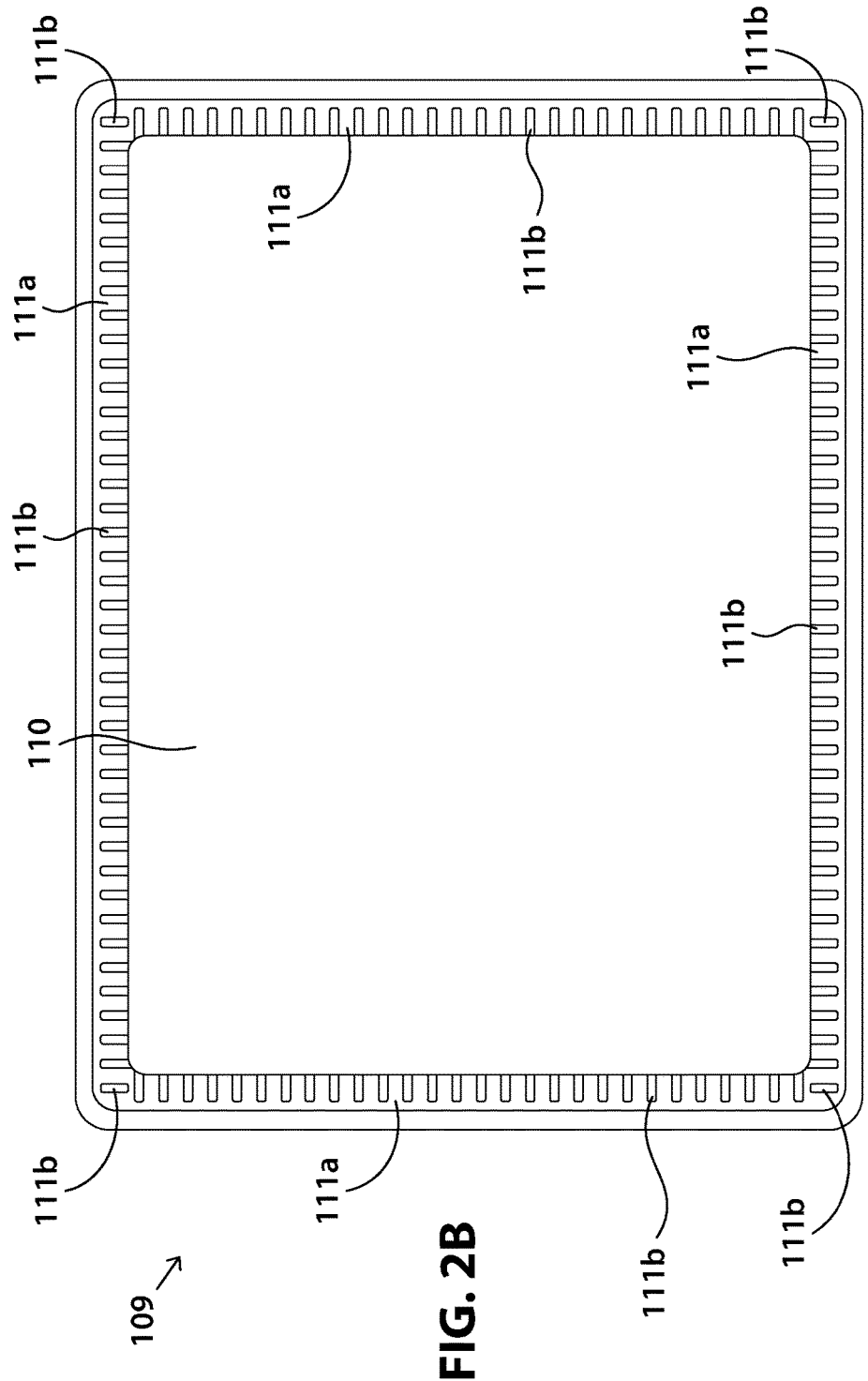

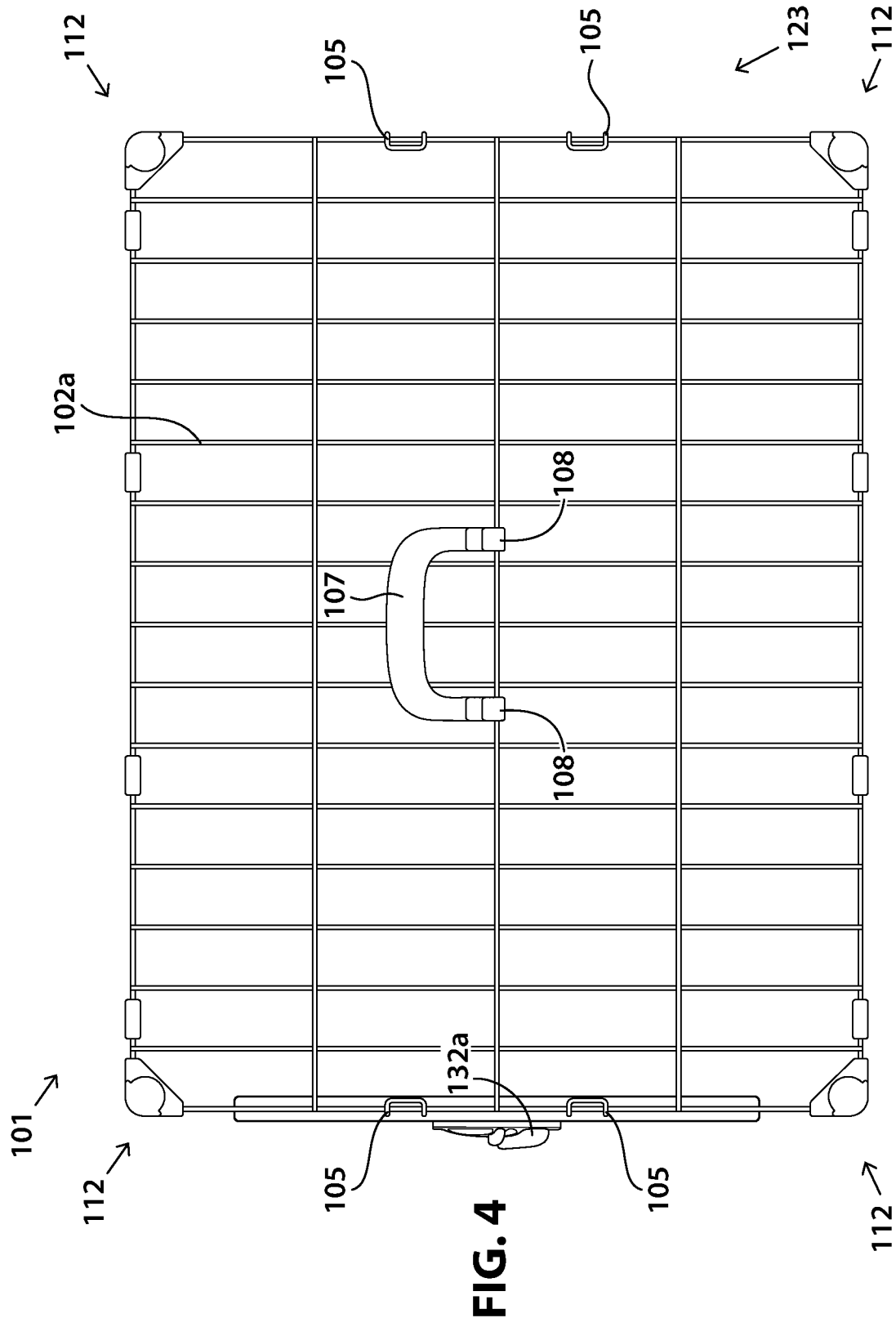

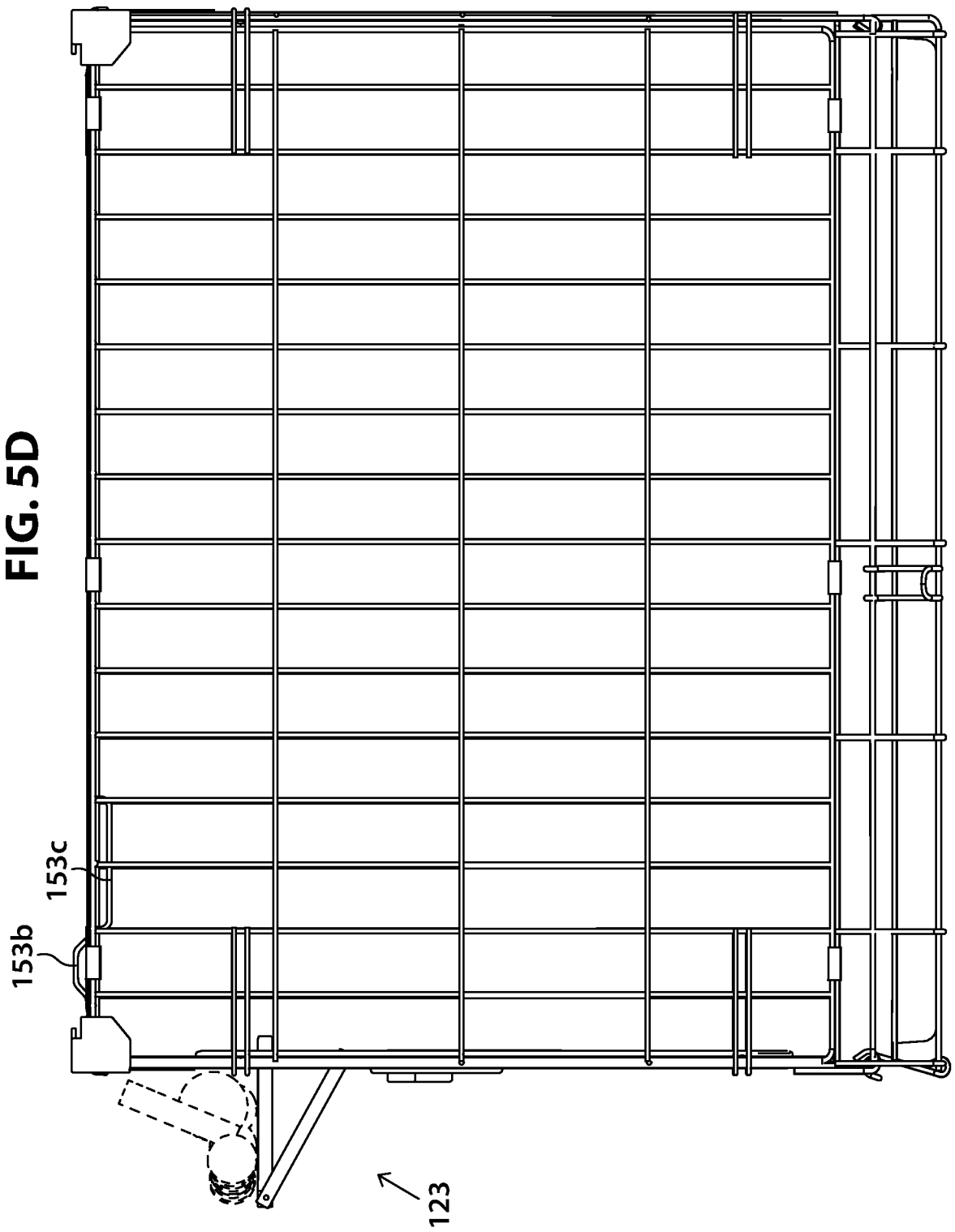

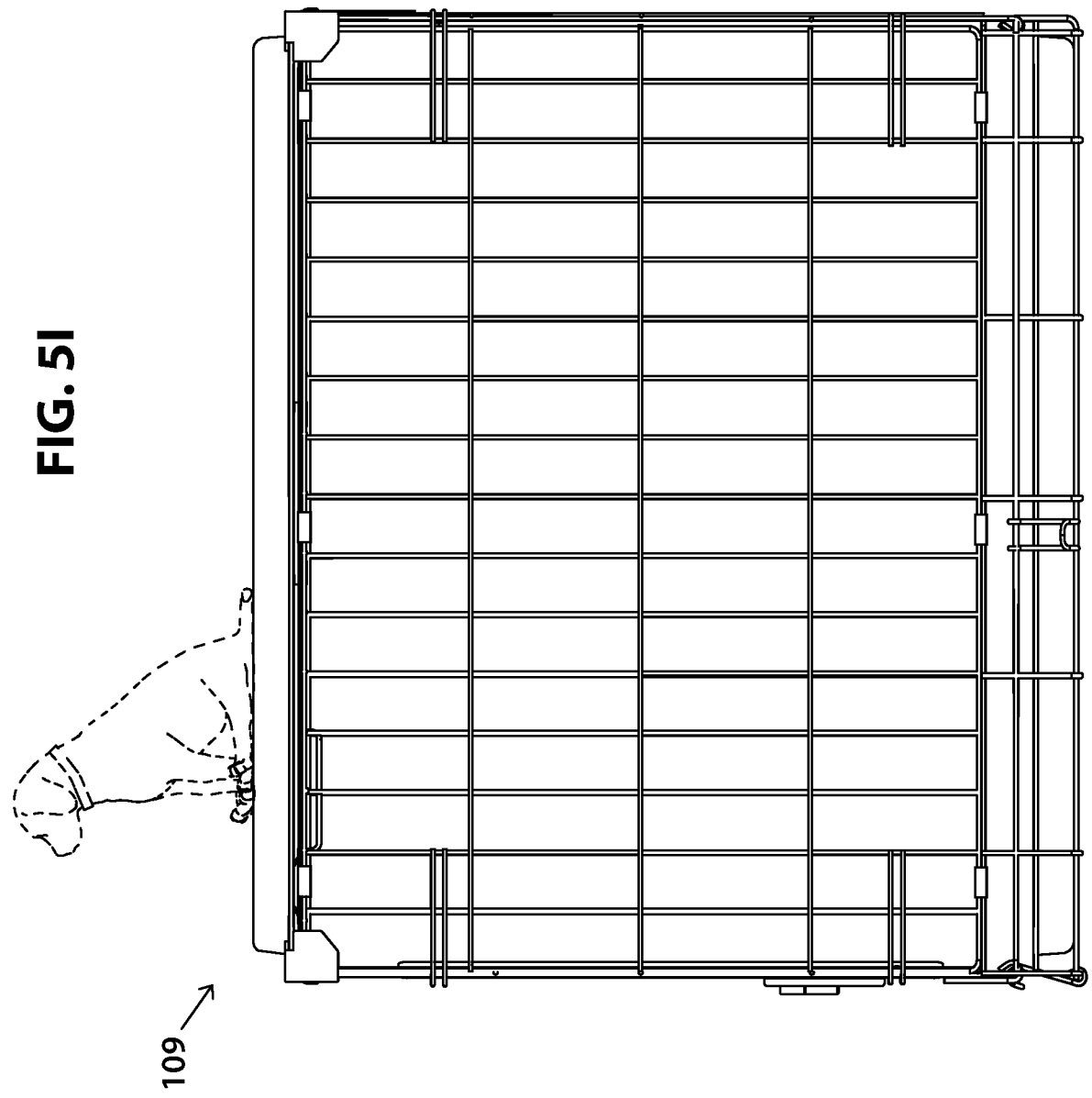

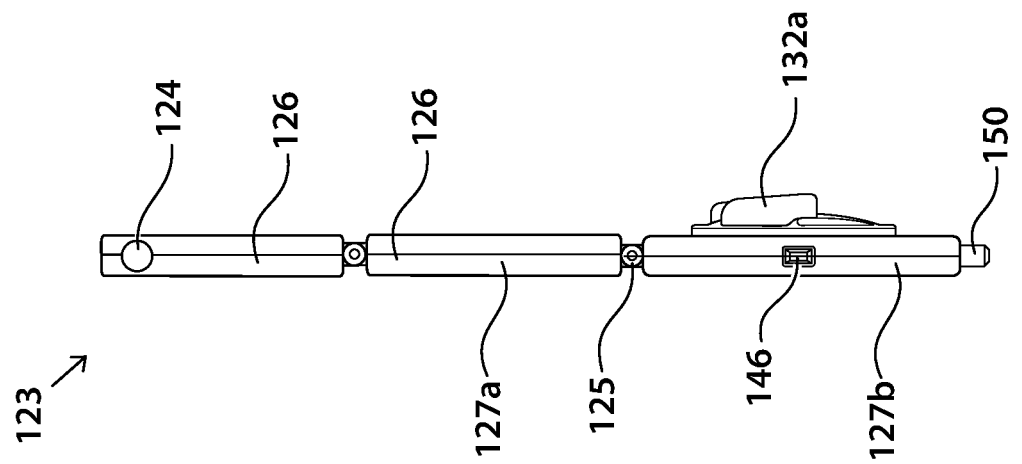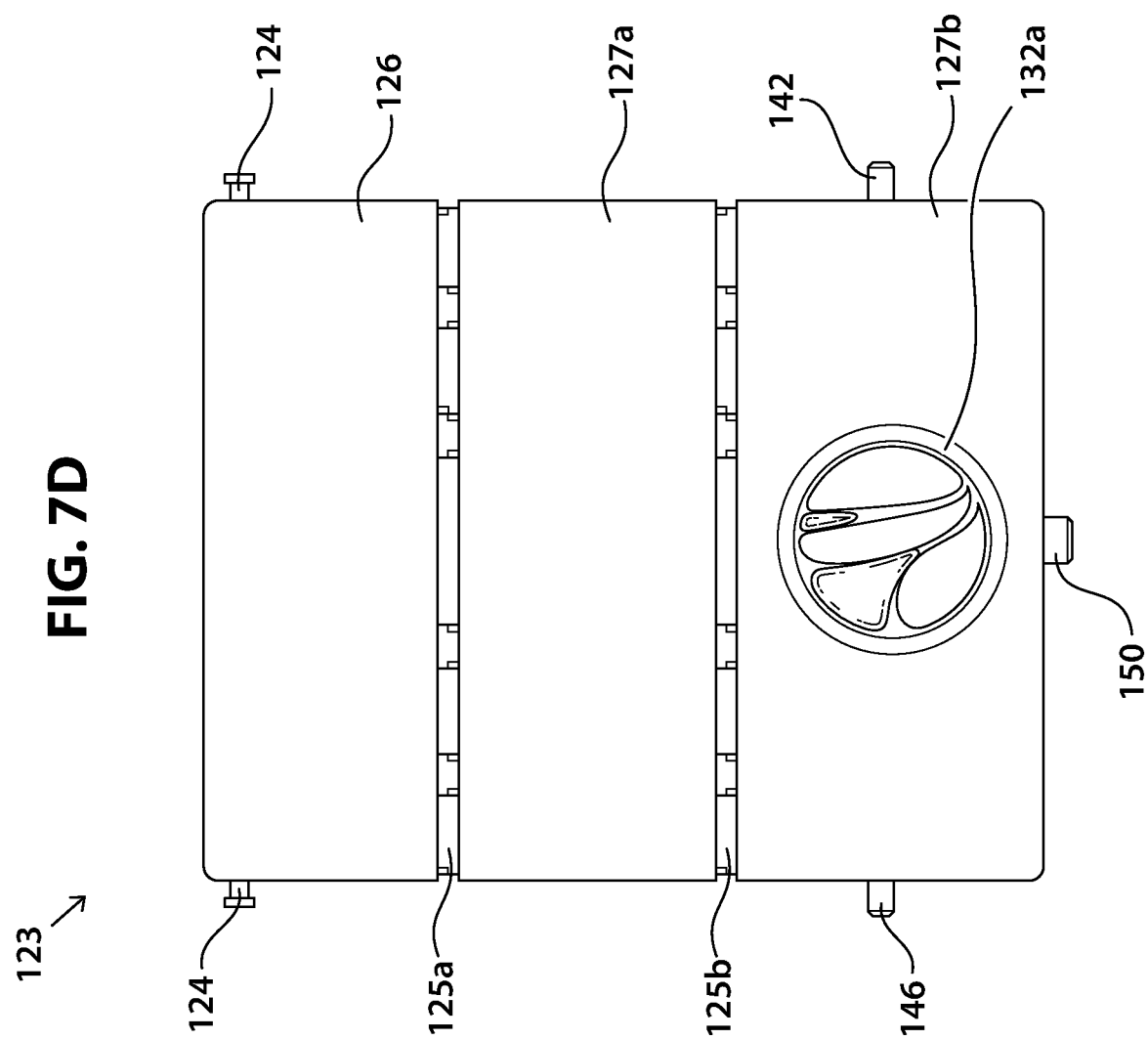

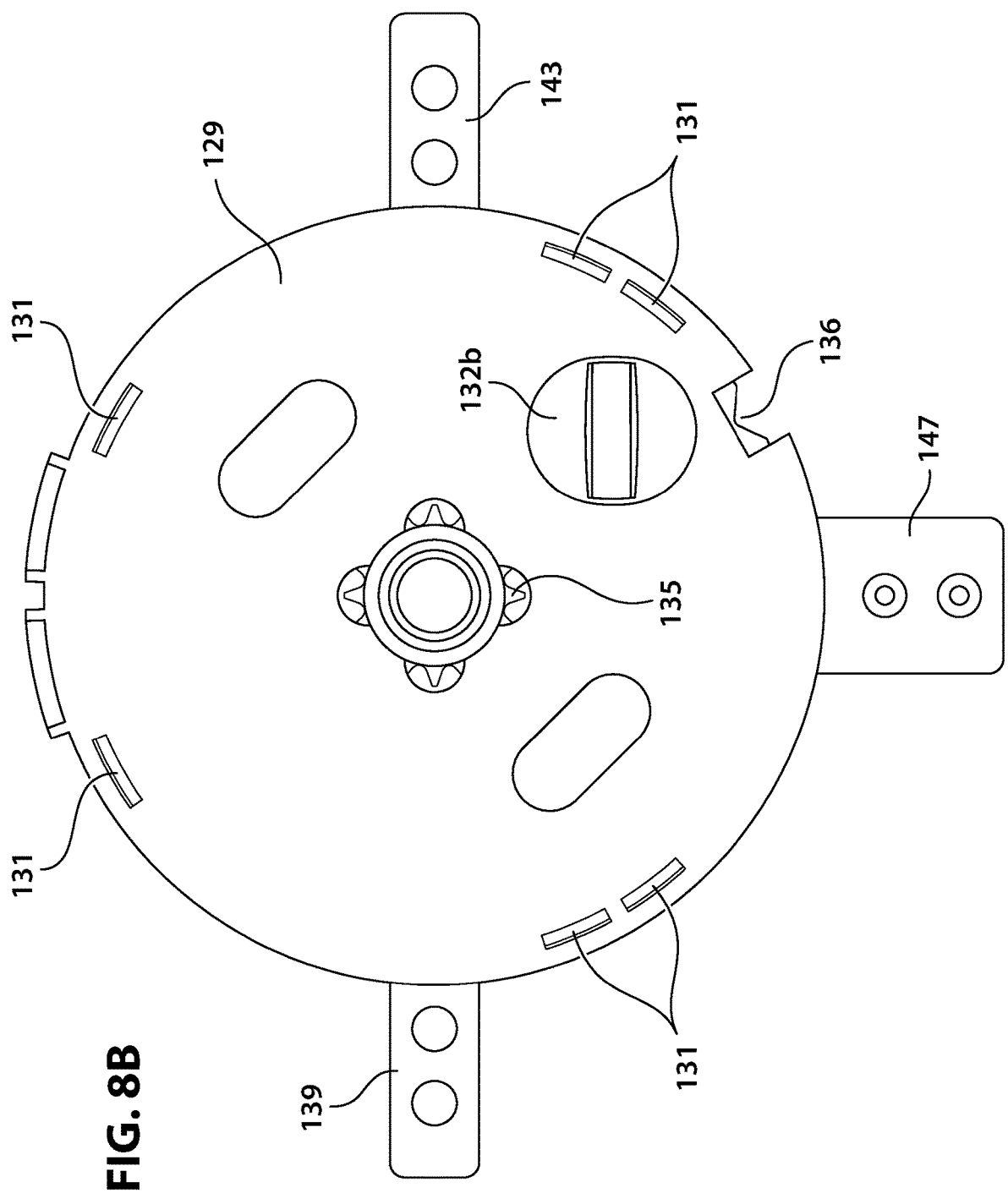

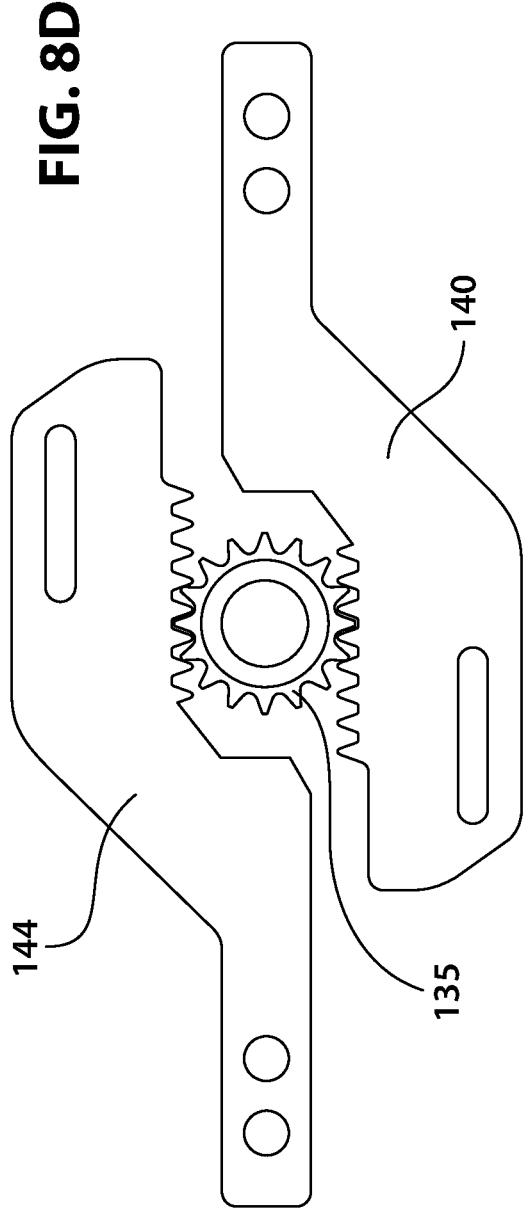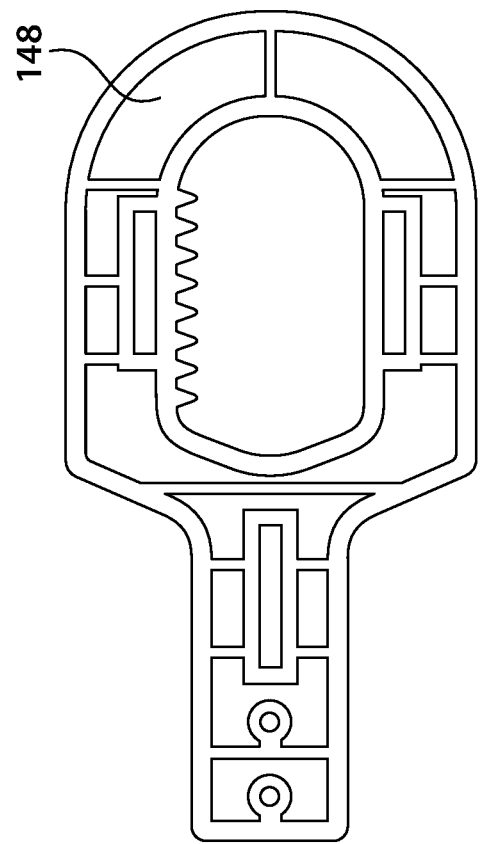

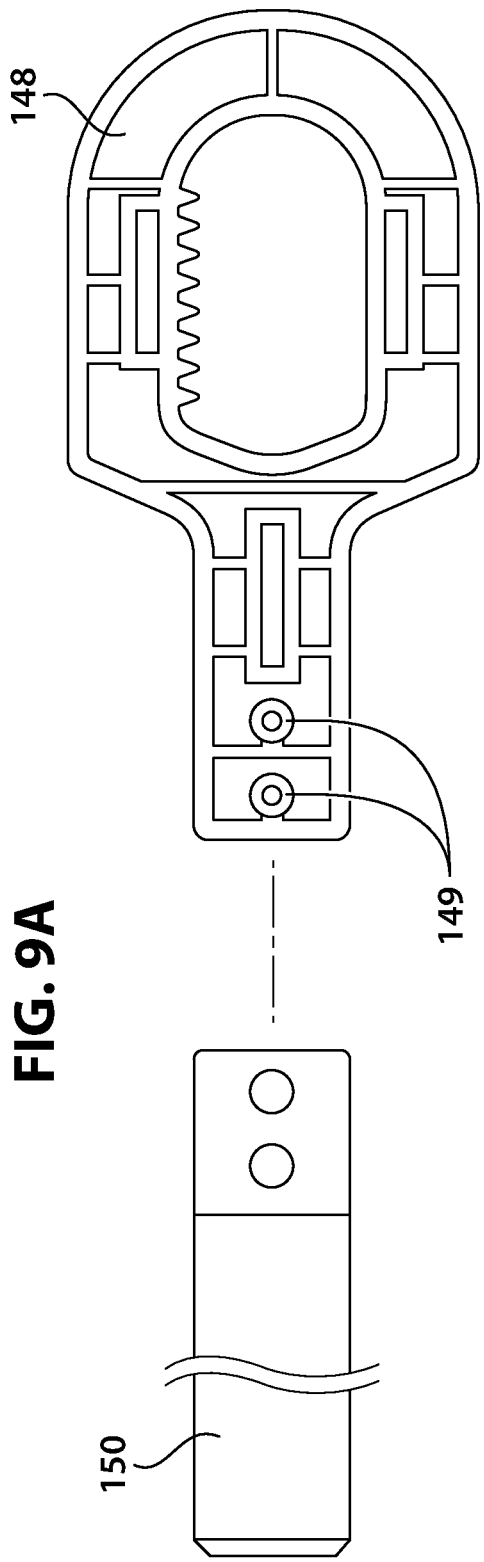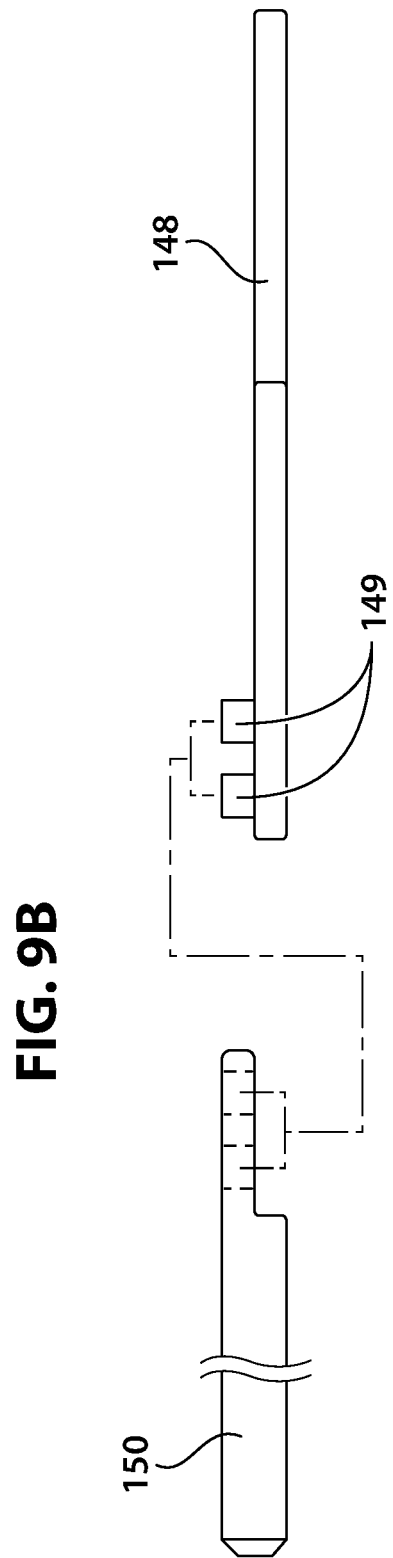

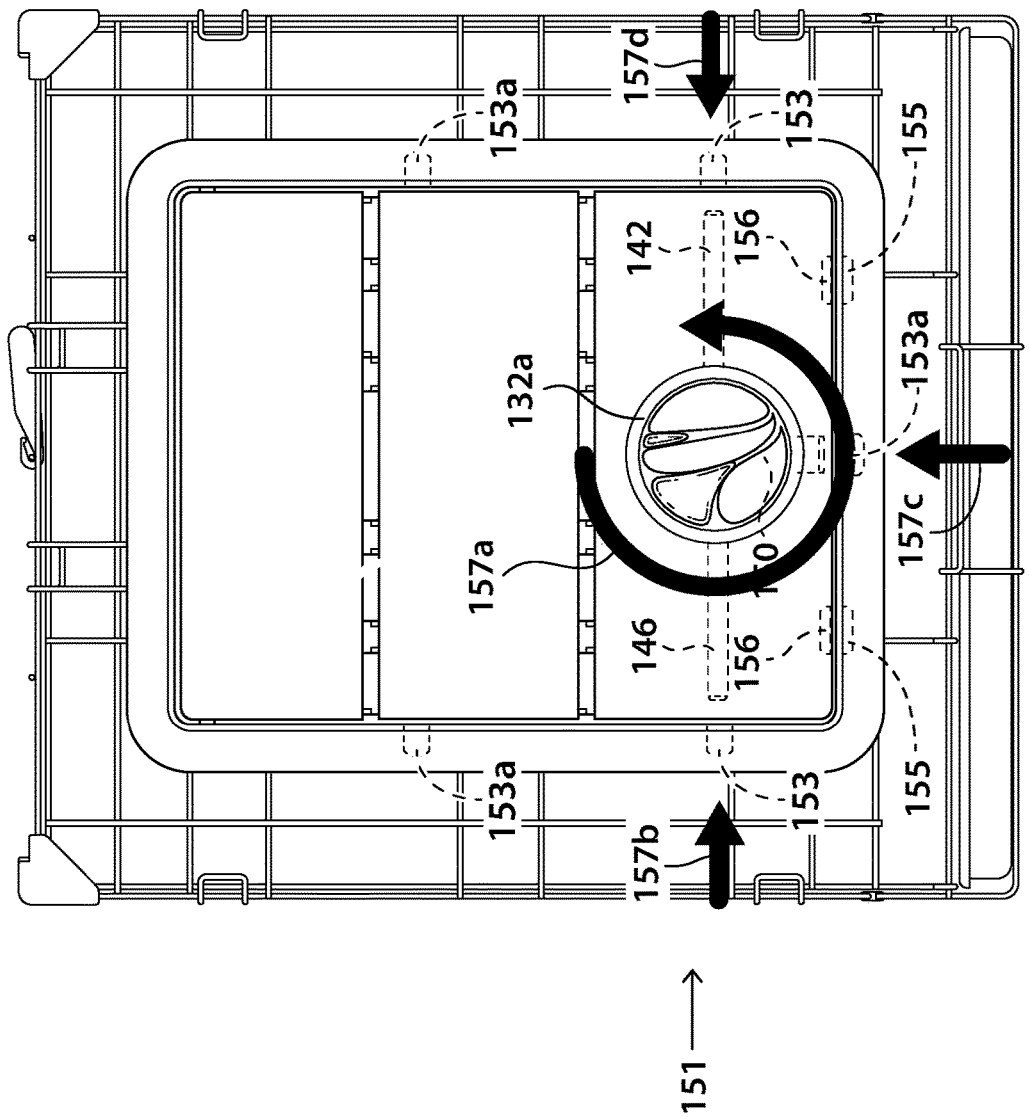

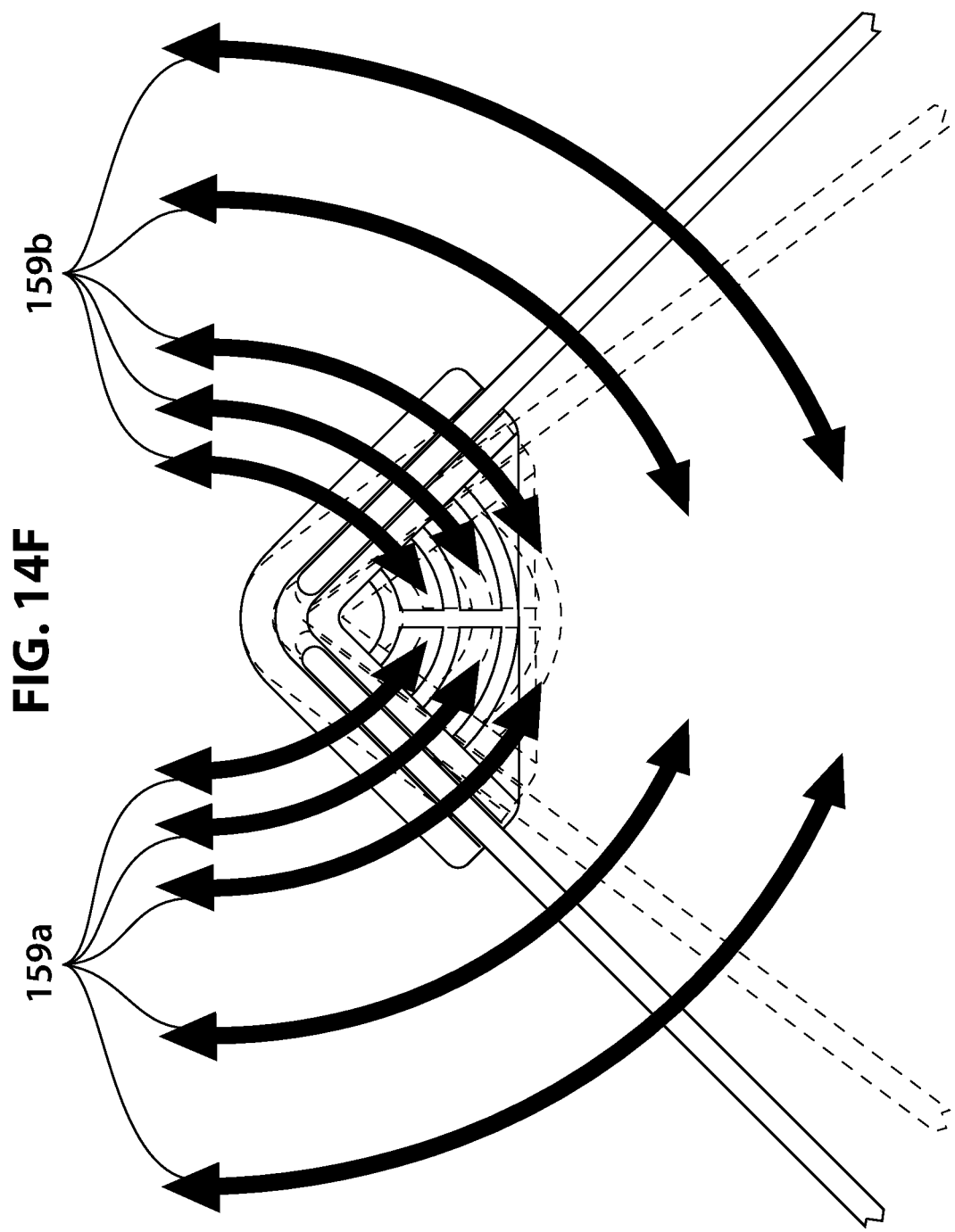

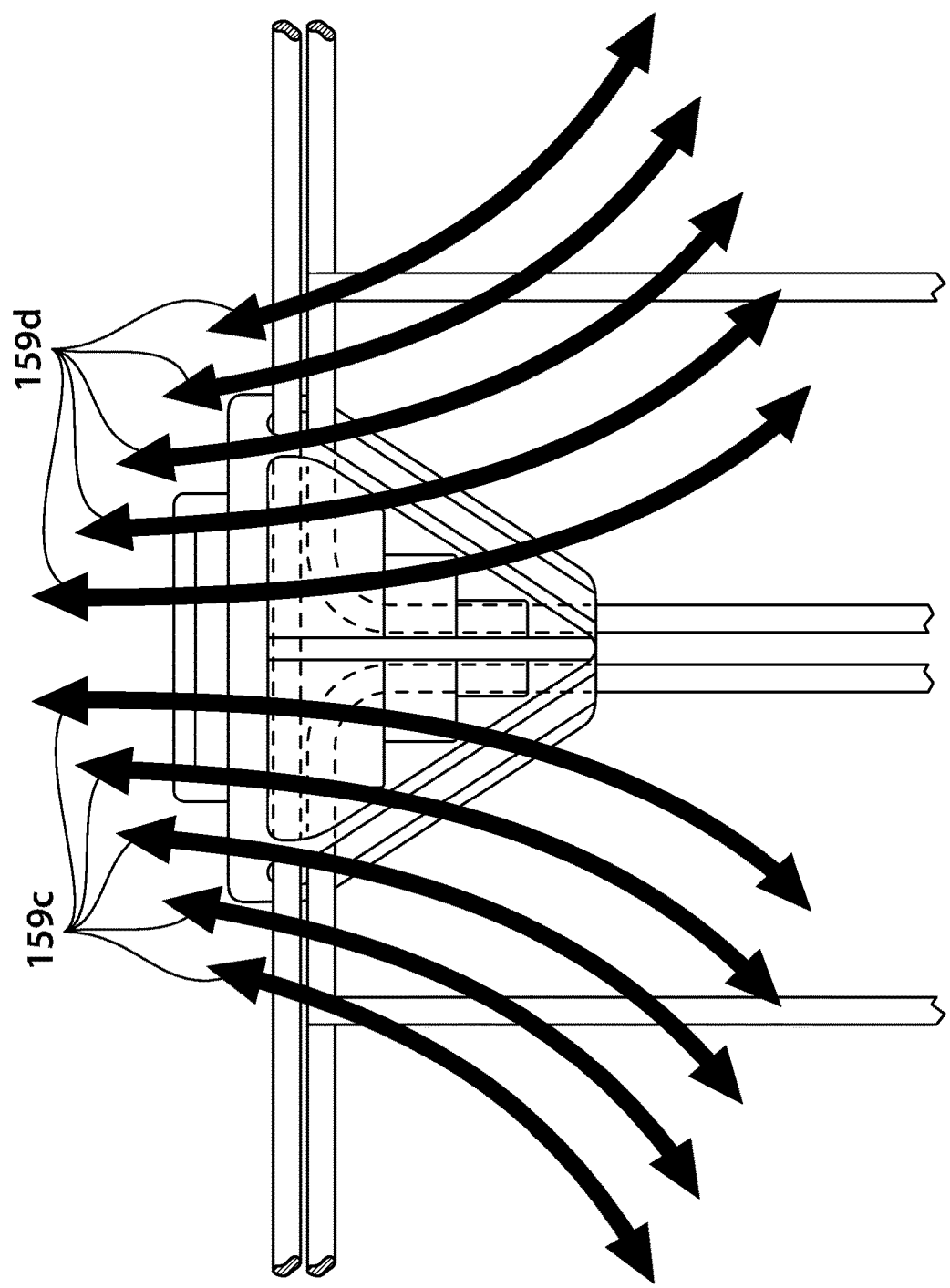

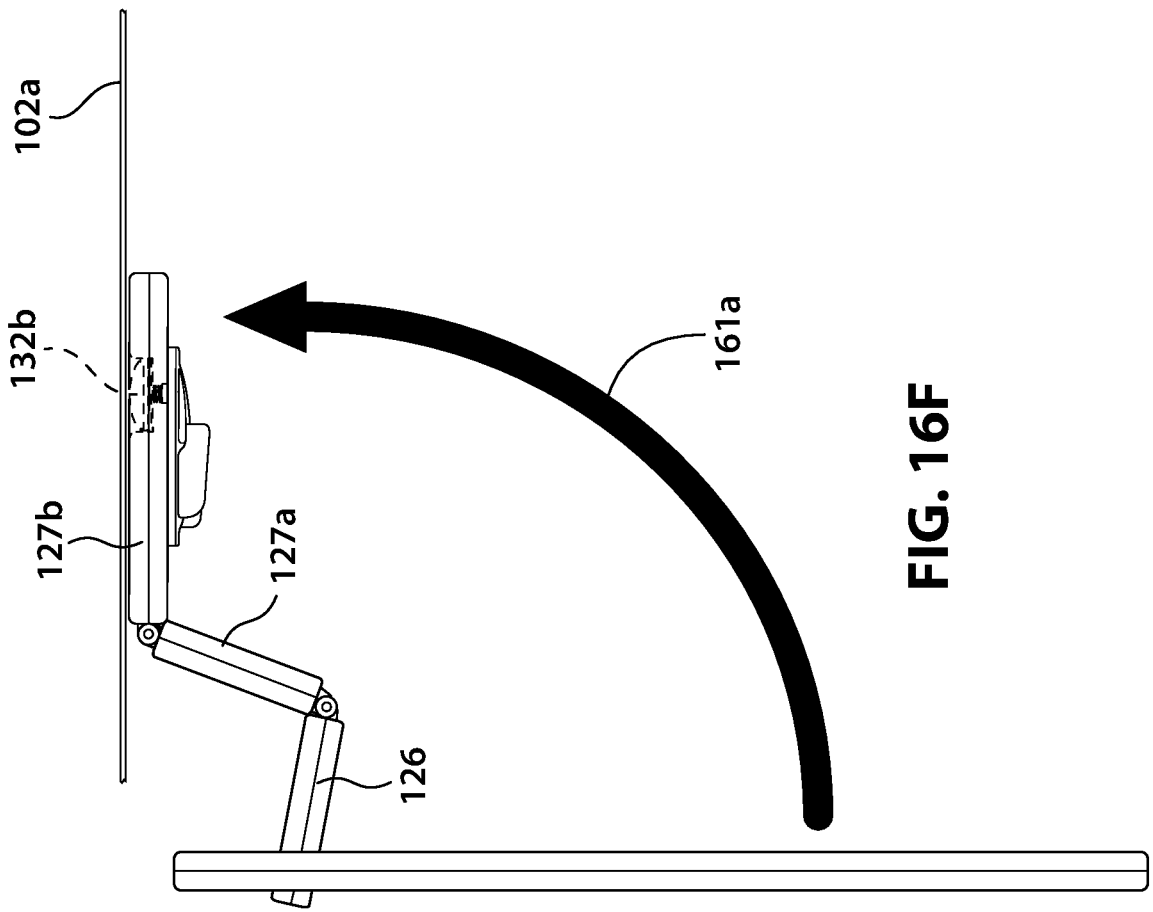
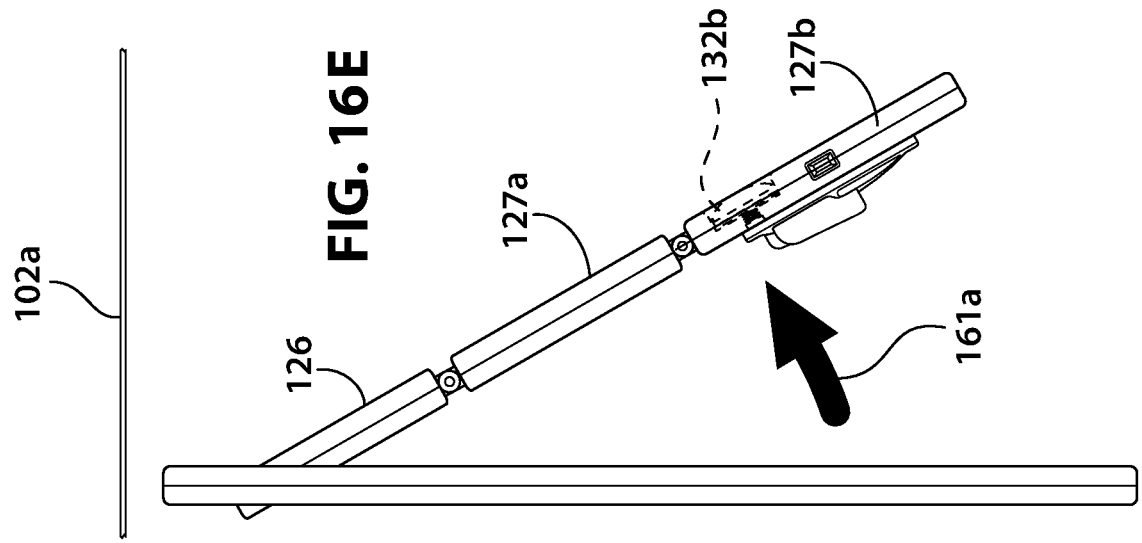

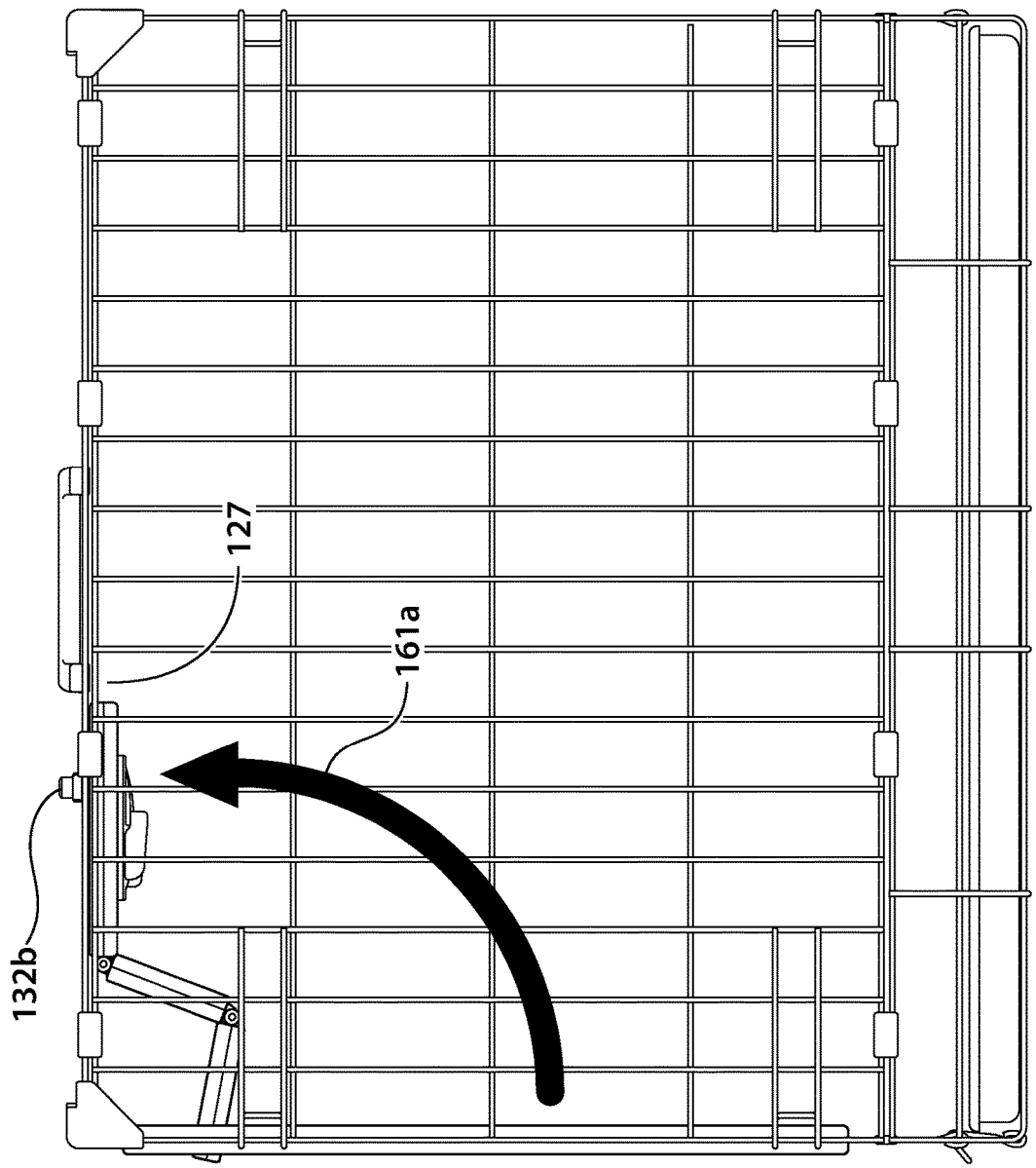

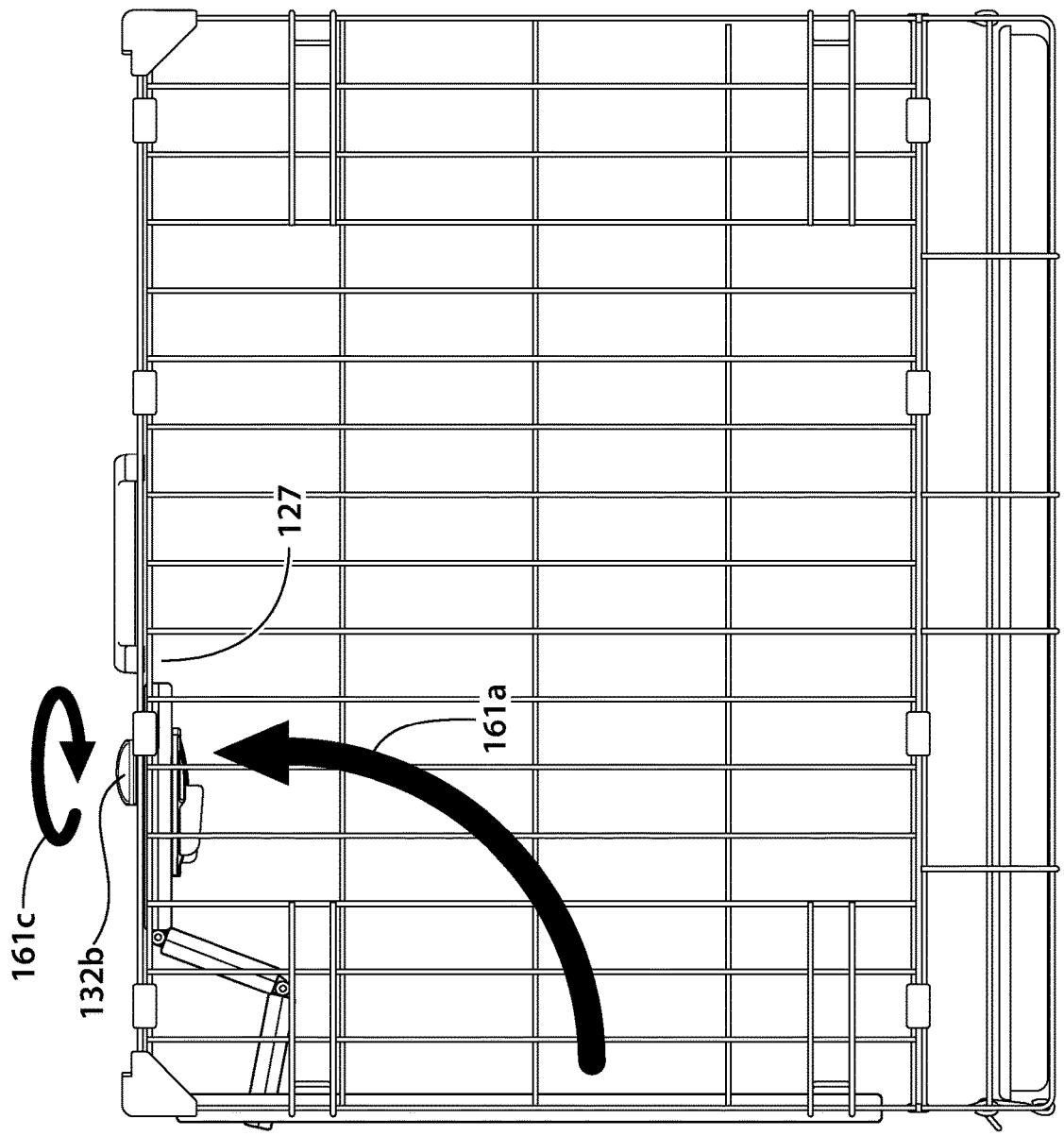

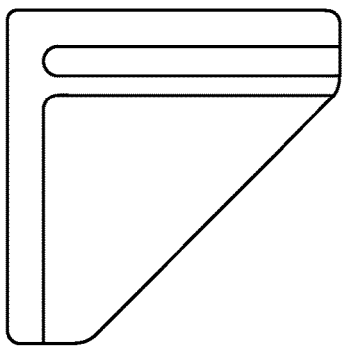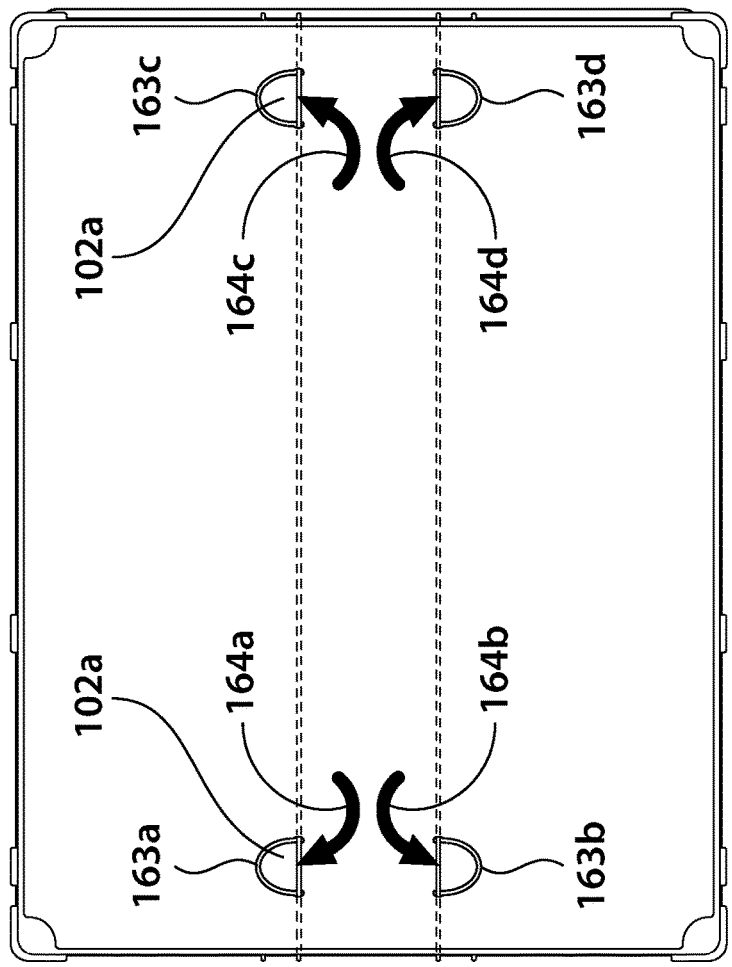
FIG. 18A
FIG. 18B

BIG-DOG-ACCOMMODATING TRIPLE-HINGED MULTI-FUNCTION-SHELF-TRUNK-PLATFORM-AND-DOOR PET CRATE, HAVING MULTI-FUNCTION SLANTED URINE-STORING BED-ROOF-TERRACE SYSTEM, MULTI-FUNCTION PLATFORM-LOCKING SHOCK-ABSORBING GUSSET SYSTEM, MULTI-FUNCTION GROOMING-PLATFORM SYSTEM, AND MULTI-FUNCTION BIG-DOG-ACCOMMODATING TRIPLE-HINGED TRIPLE-FRONT-LOCK SINGLE-TOP-LOCK SHELF-TRUNK-PLATFORM-AND-DOOR SYSTEM

1. FIELD OF THE INVENTION

The present invention relates to a collapsible pet crate, which is cheap to produce, is easy to ship as one unit, requires little assembly, and can be quickly and easily folded and unfolded. Particularly, the present invention relates to a big-dog-accommodating triple-hinged multi-function-shelf-trunk-platform-and-door pet crate, having:
1) Multi-function slanted urine-storing bed-roof-terrace system,
2) Multi-function platform-locking shock-absorbing gusset systems,
3) Multi-function grooming platform system, and
4) Multi-function big-dog-accommodating triple-hinged triple-front-lock single-top-lock multi-function-shelf-trunk-platform-and-door system.

2. DESCRIPTION OF THE PRIOR ART

A number of collapsible pet crates have been introduced.

U.S. Pat. No. 2,712,677, issued 1955 Jul. 12, to Cecil M. Hyde, shows a portable pet shelter.

U.S. Pat. No. 2,758,646, issued 1956 Aug. 14, to Don D. Johnson, relates to a door structure.

U.S. Pat. No. 3,098,465, issued 1963 Jul. 23, to Lee R. Ivey, describes a Dog Cage.

U.S. Pat. No. 3,978,616, issued 1976 Sep. 7, to Everett C. Pennock, describes a pet door for closing an opening through a pet confining wall in a building, kennel, pen or the like, said door having a peripheral frame for mounting in the wall opening, a door member having its upper edge portion hinged to the frame on a horizontal axis for swinging movement of the door in either direction from a vertical closed position within the frame, and a spring tensioned slide acting between the frame and a cam on the upper edge of the door to yieldably retain the door in closed position.

U.S. Pat. No. 4,216,743, issued 1980 Aug. 12, to Robert E. Cohen, discloses a magnetically actuated pet door which allows only the owner's pet, such as a cat or dog, to enter. The door is hinged at the top to open in both directions for ingress and egress, but is prevented from opening in the ingress direction by a solenoid-actuated, one-way latch comprised of a plunger against the inside of a flap that is in turn hinged on the inside of the pet door, and held flat against the pet door by springs. A notch in the pet door behind the flap permits the door to swing freely open in the egress direction without the solenoid being energized to withdraw the plunger. A permanent magnet attached to the collar of a pet induces a signal in magnetosensitive devices disposed on the outside of the pet door. That signal is processed to energize the latch solenoid and thereby withdrawing the solenoid plunger from the path of the flap on the pet door to allow the pet to ingress.

U.S. Pat. No. 4,776,133, issued 1988 Oct. 11, to Anthony J. Green, describes a pet door which comprises a hinged flap mounted within a fixed frame and pivotable to allow passage therethrough in both directions. A locking mechanism is provided comprising a slide with two projections thereon which, in different lateral positions of the slide, are aligned with corresponding projections or cut-outs on the flap to allow or prevent pivoting of the flap in one or both directions.

U.S. Pat. No. 5,016,926, issued 1991 May 21, to Douglas J. Sharp, relates to a latching mechanism having utility in securing a pivotable member in at least one position with respect to a stationary structure. The housing includes a base that is adapted to be mounted adjacent the pivotable member (e.g., a cage door), with the base lying in a plane which is generally parallel to the plane established by the cage door. A pair of spaced flanges is affixed to the base, with each of the flanges extending away from the door and lying in planes which are generally perpendicular to the base.

U.S. Pat. No. 5,476,066, issued 1995 Dec. 19, to Oneal M. Hoffman, relates to an apparatus for use in the housing of dogs which includes a molded fiberglass flooring, fencing and a top. Alternatively, the flooring can be comprised of sections with flanged ends for facilitating the bolting together of the sections to form the flooring surface. The apparatus is movable and sanitary, and is modular for side-by-side kennels. The composite flooring has a rim to prevent waste from splashing from one kennel to an adjacent one, and a trough outside the fencing with a drain for flushing animal wastes into a sewage system. The top layers of the flooring is textured fiberglass, providing the animal with a non-abrasive, non-slip surface, that is easy to clean, stain-resistant, non-porous, waterproof and rigid. The flooring is formed in three layers, two layers oil fiberglass with a layer of light wood or foamed plastic therebetween.

U.S. Pat. No. 5,497,728, issued 1996 Mar. 12, to Kenichi Watanabe, outlines a pet cage comprising a top and side panels made of metal wires to hold a pet within and indoors. At one corner of the top panel, a corner connector is provided to connect the top panel with the two side panels. The corner connector has three engagement grooves in which the metal wire of the connected panels fit. To strengthen the cage further, an edge connector may be provided to connect the two adjacent panels.

U.S. Pat. No. 6,385,909, issued 2002 May 14, to Gary F. Marsh, outlines a pet door including a cammed closing mechanism and a sliding lock mechanism. The cammed closing mechanism returns the pet door to a resting closed position and provides sufficient force to resist opening by normal weather conditions such as wind or a hard rain without the need for additional components such as magnets. The sliding lock mechanism serves to control the ingress and/or the egress of an animal through the pet door as selected by the pet door owner.

U.S. Pat. No. 6,688,657, issued 2004 Feb. 10, to James L. Peacock, refers to a dual hinge door assembly that enables selective opening of one side of a two-sided door or removal of the door. The two sides of the door have identical assemblies that connect via a horizontal bar. Actuating a switch causes the bar to move horizontally in one of two directions. Movement of the bar causes assemblies on each side of the door to rotate and translate the horizontal motion of the bar to vertical motion of a set of lock pins, and causes the handle on the side of the door selected for opening to become visible to the operator.

U.S. Pat. No. 6,732,676, issued 2004 May 11, to Douglas C. Smith, refers to an integrated pet storage crate and grooming table. The integrated table includes a structure having a pet storage area covered by an openable gate, an equipment storage area for storing equipment, a horizontal surface resting on a top portion of the pet storage area and the equipment storage area, and a grooming surface rotatably connected to the horizontal surface. The grooming surface, which may be optionally covered with a material, covers the equipment storage area in a vertical orientation and is rotated upwardly to a horizontal orientation against the horizontal surface to provide an area for grooming a pet. The structure also includes a plurality of wheels mounted on a bottom surface of the structure allowing mobility of the structure. In addition, a telescopic ramp is mounted under the bottom surface of the structure to facilitate movement of the structure.

U.S. Pat. No. 7,120,967, issued 2006 Oct. 17, to Ryan E. Johnson, refers to a pet door hinge adapted to accommodate potentially damaging forces. The hinge mechanism includes a shaft that is received by a shock-absorbing bearing. The bearing is received by a sleeve. The bearing rotates within the sleeve to allow pivoting of the flap. In the event of potentially damaging forces, a resilient and deformable material forming the core of the bearing gives to prevent damage to or destruction of the hinge mechanism or the pet door.

U.S. Pat. No. 7,918,188, issued 2011 Apr. 5, to Mike Harper, refers to a cage for housing an animal and includes a top wall, bottom, first and second sidewalls, a front wall and a rear wall. A door is disposed in at least one of the walls and is hinged for movement between an open and closed position. The door is mounted in a wall having a doorway. The door includes a plurality of loops on each side of the door. The wall includes a plurality of loops along each side of the doorway. The door loops are positionable adjacent the wall loops when the door is disposed within the doorway to form mating hinge structures. A hinge pin is selectively insertable into either of the door loops on one edge of the door together with the corresponding loops on the wall, to thereby hingedly mount the door to the wall for door swinging movement in either a first direction or a second direction with respect to the wall.

U.S. Pat. No. 7,950,439, issued 2011 May 31, to Victor R. Anderson, provides a door with components forming a multi-panel unit, a support & alignment mechanism, an automatic actuating panel action locking and release mechanism, sliding mechanism and hinges, a dual action door assembly is achieved which allows the door assembly to operate within controlled confines combining first a sliding action and then a swing action to open the door for full unobstructed access of a range of doorway widths from narrow to ultra-wide while overcoming the support problems, full open access problems and wide swing radii problems consistent with conventional doors.

U.S. Pat. No. 8,267,048, issued 2012 Sep. 18, to Mark A. Flannery, demonstrates a pet crate having a top, a bottom, and a cage between the top and bottom. The cage can be engaged to and disengaged from each of the top and bottom. When engaged to the top and bottom, or when disengaged from either one or both of the top and bottom, the cage is endless and can safely hold a pet therein. When disengaged from the top and bottom, the cage is foldable into a closed, endless and flat configuration such that the cage can be stored between the top and bottom such that the crate as a whole in such stored configuration is generally flat. When disengaged from the top and bottom, the cage is foldable out into a fence configuration by disconnecting two ends of the cage.

U.S. Pat. No. 8,408,416, issued 2013 Apr. 2, to Wu Cheng-Lung, demonstrates a crate is provided with a base, sides, front, and back that form an enclosure. The front includes and opening and a door positioned within the opening in the closed position. The door is hung by hinges, which are associated with uninterrupted rails on the top of the crate. To open the crate, the bottom of the door is swung outward and upward to pivot the door toward the horizontal position on the hinges. Then, the door can be slid into the enclosure along the uninterrupted guides. The door may also include locks that can secure the door in the closed position. Both of the sides or both the front and back can be releasably connected with the top and pivotable into the base. After both sides or both the front and back are pivoted into the base, the remaining walls and top can be pivoted to fold into the base as a unit.

U.S. Pat. No. 8,985,058, issued 2015 Mar. 24, to Brad Cantwell, provides a wire crate for housing an animal. The wire crate includes a top panel, a bottom panel, a front panel, a back panel, and a pair of side panels oppositely disposed from one another. The crate also includes a front opening defined in the front panel. The front opening is configured to provide access to the interior of the crate. The crate further includes a pair of tracks coupled to each side of the front opening and a door slidably coupled to the pair of tracks. The door slides along the pair of tracks between an open position and a closed position.

U.S. Pat. No. 9,115,523, issued 2015 Aug. 25, to Raymond J. Friesen, defines a roller hinge assembly for connecting articulating door panels and simultaneously supporting a laterally extending panel support roller assembly including multiple uniformly sized hinges having a male hinge strap and a female strap. Two or more such uniformly sized hinge units are arrayed laterally or side by side co-joined by a single hinge pin. Further, to insure appropriate alignment, a tubular roller bushing co-joins the male or the female hinge straps.

U.S. Pat. No. 9,297,190, issued 2016 Mar. 29, to Chen-Hsiang Lee, pertains to a hinge device for connecting two door panels of a folding door, and includes two installation strips and a connection strip for connecting the two installation strips. An installation slot is formed in each installation strip for receiving an inner end of an associated door panel. Two toothed portions are respectively formed on the installation strips and mesh with each other.

U.S. Pat. No. 9,357,748 issued 2016 Jun. 7, to Brad Cantwell, pertains to an animal enclosure including a plurality of members defining an interior of the enclosure. One of the plurality of members includes a first member having a frame structure and door assembly formed by a plurality of interconnected horizontal and vertical wires. At least two of the horizontal wires of the frame structure form a hook positioned inside the defined opening. The door assembly is coupled to the frame and moves between an open and close positions. The door assembly includes a first door and a second door removably coupled to one another. The enclosure also includes a latch assembly for releasing the door assembly from the frame structure. In the close position, at least one horizontal wire of the first door and at least one horizontal wire of the second door are coupled to the hooks formed by the at least two horizontal wires of the frame structure.

U.S. Pat. No. 9,546,511, issued 2017 Jan. 17, to Jay S. Dittmer, describes a hinge for a multi-panel door including a first bracket, a second bracket pivotally coupled to the first bracket, and a carrier link carrying a roller adapted to engage in a door track. The first bracket is operably attached to a first panel of the multi-panel door, the second bracket is operably attached to second panel of the multi-panel door, and the carrier link is pivotally attached to one of the first bracket or the second bracket. The carrier link is selectively positionable in a plurality of pre-defined positions.

U.S. Pat. No. D367,734, issued 1996 Mar. 5, to Doug Sharp, depicts an ornamental design for a combined kennel door and latch.

U.S. Pat. No. D778,510, issued 2017 Feb. 7, to Addison Edmonds, depicts an ornamental design for an animal crate door.

U.S. Publication No. 20100282179, published 2010 Nov. 11, to Ying-Kuan Ho, reveals construction for a combination-type pet cage. Two lateral panels are assembled to a base by inserting flanges and screw rods into corresponding slots and holes of the base. Front and rear panel receiving portions are attached to the lateral panels onto projections formed at front ends and rear ends of the lateral panels. The lateral, front, and rear panels are secured in position to the base by wing nuts. Finally, a top panel is secured in position. Plural such pet cages are connectable and easily securable in position to one another.

U.S. Publication No. 20170020103, published 2017 Jan. 26, to Amy R. Nichols, reveals a collapsible pet crate, mountable to a wall such that the crate may be assembled for pet usage while mounted to the wall and collapsed into a compact package while mounted to the wall and not being used. A mounting bracket affixed to the wall receives a mounting rod (or mounting pins) integral with, or connected to, the crate to facilitate operation of the crate. The mounting bracket includes a first position for receipt of the mounting rod corresponding to the assembled or opened crate and a second position for receipt of the mounting rod corresponding to the collapsed or stowed crate. In another version, a pair of latches rotatably joined to a back wall for (i) joining said the wall to the bottom tray in a collapsed configuration and (ii) securing the foldable cage to the back wall in an assembled configuration.

DISADVANTAGES OF THE PRIOR ART

The prior art have failed to solve many problems associated with such collapsible pet crates, as follows:
1) No prior art mention or disclose any collapsible pet crate, having
   multi-function big-dog-accommodating triple-hinged multi-function-shelf-trunk-platform-and-door system 123.
   Therefore, the prior art of collapsible pet crate:
   a) Can not quickly and hingedly swing open and gravitationally close,
      to allow for big dogs to comfortably fit into the pet crate
      (See FIGS. 1A and 1B);
   b) Can not lock to create a grooming platform,
      to allow pets to be groomed on top of the pet crate
      (see FIG. 5F and FIG. 5G);
   c) Can not lock to create an accessory shelf,
      to allow for holding pet accessories
      (see FIG. 5D and FIG. 5E);
   d) Can not lock to create an interior accessory storage compartment,
      to allow for storing pet accessories
      (see FIG. 5B and FIG. 5C); and
   e) Can not lock to create an exterior accessory storage compartment,
      to allow for storing pet accessories
      (see FIG. 5F and FIG. 5G).
2) No prior art mention or disclose any collapsible pet crate, having
   multi-function big-dog-accommodating triple-hinged multi-function-shelf-trunk-platform-and-door system 123.
   Therefore, the prior art of collapsible pet crate:
   a) Can not lock in horizontal position against the top panel of the pet crate,
      to allow interior space for better utilization for different-size pets
      (see FIG. 5B and FIG. 5C);
   b) Can not allow a quick single sliding movement,
      to lock the door in a vertical or horizontal position;
   c) Can not lock and adapt interchangeably,
      to a wire crate panel or plastic crate panel; and
   d) Can not quickly lock against the top panel of the pet crate,
      to allow large dogs to enter and exit easily
      (see FIG. 5B and FIG. 5C).
3) No prior art mention or disclose any collapsible pet crate, having
   multi-function slanted urine-storing bed-roof-terrace system 109.
   Therefore, the prior art of collapsible pet crate:
   a) Can not provide a grooming platform (when used a grooming platform), urine to run down the sanitary urine-storing gutters,
      to keep the grooming platform dry when used as a grooming platform;
   b) Can not provide gutter ridges to elevate pet paws from the sanitary urine-storing gutters,
      to prevent pets from stepping in urine
      (see FIG. 2A and FIG. 2B);
   c) Can not provide an alternate platform for pets,
      to allow the pets to sit, stand, play, rest, and sleep thereon
      (see FIG. 5J and FIG. 5I);
   d) Can not keep pets away from urine,
      to keep the pets dry; and
   e) Can not provide a roof (when used as a roof),
      to protect pets from the weather elements
      (see FIG. 5J and FIG. 5I).
4) No prior art mention or disclose any collapsible pet crate, having
   multi-function door-locking ring system 151.
   Therefore, the prior art of collapsible pet crate:
   a) Can not lock door hinges in multiple locations,
      to create multiple configuration options;
   b) Can not lock grooming platform to top panel,
      to keep pets safe while grooming;
   c) Can not provide alternative locking location,
      to create interior storage option
      (see FIG. 5B and FIG. 5C); and
   d) Can not provide alternative locking location
      to create exterior storage options
      (see FIG. 5F and FIG. 5G).
5) No prior art mention or disclose any collapsible pet crate, having
   multi-function grooming platform system 119.

Therefore, the prior art of collapsible pet crate:
  a) Can not quickly and easily be locked
    to multi-function platform-locking shock-absorbing gusset systems
    (see FIG. 5H);
  b) Can not conveniently provide secondary location for a pet,
    to stand, sit, lay, or be groomed on
    (see FIG. 5H);
  c) Can not conveniently allow pet grooming,
    to take place in the same location as the pet crate
    (see FIG. 5H); and
  d) Can not conveniently provide standing, sitting, laying, or grooming area atop the pet crate,
    to take no additional square footage
    (see FIG. 5H).
6) No prior art mention or disclose any collapsible pet crate, having
  multi-function grooming platform system 119.
  Therefore, the prior art of collapsible pet crate:
    a) Can not conveniently provide alternate location for a pet,
      to provide them relief from confinement
      (see FIG. 5H);
    b) Can not conveniently be locked using platform-locking notches,
      to secure multi-function grooming platform from slipping
      (see FIG. 5H);
    c) Can not quickly and easily be assembled and disassembled without tools; and
    d) Can not quickly and easily be cleaned.
7) No prior art mention or disclose any collapsible pet crate, having
  palm knob 132*a*.
  Therefore, the prior art of collapsible pet crate:
    a) Can not conform to person's arthritic hand with little bending of fingers or hand,
      to lock and unlock the multi-function door system easily
      (see FIG. 12C and FIG. 12D);
    b) Can not allow other conventional grips on the palm knob,
      to lock and unlock the multi-function door system with one hand;
    c) Can not allow minimal movement for a person's arthritic hand,
      to rotate the palm knob; and
    d) Can not fit differently sized hands.
8) No prior art mention or disclose any collapsible pet crate, having
  multi-function platform-locking shock-absorbing gusset systems 112.
  Therefore, the prior art of collapsible pet crate:
    a) Can not minimize shocks and impacts exerted on the pet crate,
      to provide pets with comfort while being stationary or transported;
    b) Can not prevent all top corners of the pet crate from causing injuries to people and pets,
      to make the pet crate safer to use;
    c) Can not absorb vibrations exerted on the pet crate,
      to provide pets with comfort while being stationary or transported; and
    d) Can not resist the twisting, bending, and wobbling forces exerted on the pet crate
      to strengthen the pet crate
      (see FIG. 14E, FIG. 14F, FIG. 14G, FIG. 14H, FIG. 14I, and FIG. 14J).

OBJECTS AND ADVANTAGES OF THE INVENTION

The present invention substantially departs from the conventional concepts and designs of the prior art. In doing so, the present invention provides the big-dog-accommodating triple-hinged multi-function-shelf-trunk-platform-and-door pet crate (having: a) Multi-function slanted urine-storing bed-roof-terrace system, b) Multi-function platform-locking shock-absorbing gusset systems, c) Multi-function grooming platform system, and d) Multi-function big-dog-accommodating triple-hinged triple-front-lock single-top-lock multi-function-shelf-trunk-platform-and-door system), having many unique and significant features, functions, and advantages, which overcome all the disadvantages of the prior art, as follows:
1) It is an object of the new invention to provide a big-dog-accommodating triple-hinged multi-function-shelf-trunk-platform-and-door pet crate, having
  multi-function big-dog-accommodating triple-hinged multi-function-shelf-trunk-platform-and-door system 123.
  Therefore, the big-dog-accommodating triple-hinged multi-function-shelf-trunk-platform-and-door pet crate:
    a) Can quickly and hingedly swing open and gravitationally close,
      to allow for big dogs to comfortably fit into the big-dog-accommodating triple-hinged multi-function-shelf-trunk-platform-and-door pet crate
      (See FIGS. 1C and 1D);
    b) Can lock to create a grooming platform,
      to allow pets to be groomed on top of the big-dog-accommodating triple-hinged multi-function-shelf-trunk-platform-and-door pet crate
      (see FIG. 5F and FIG. 5G);
    c) Can lock to create an accessory shelf,
      to allow for holding pet accessories
      (see FIG. 5D and FIG. 5E);
    d) Can lock to create an interior accessory storage compartment,
      to allow for storing pet accessories
      (see FIG. 5B and FIG. 5C); and
    e) Can lock to create an exterior accessory storage compartment,
      to allow for storing pet accessories
      (see FIG. 5F and FIG. 5G).
2) It is an object of the new invention to provide a big-dog-accommodating triple-hinged multi-function-shelf-trunk-platform-and-door pet crate, having
  multi-function big-dog-accommodating triple-hinged multi-function-shelf-trunk-platform-and-door system 123.
  Therefore, the big-dog-accommodating triple-hinged multi-function-shelf-trunk-platform-and-door pet crate:
    a) Can lock in horizontal position against the top panel of the big-dog-accommodating triple-hinged multi-function-shelf-trunk-platform-and-door pet crate, to allow interior space for better utilization for different-size pets
(see FIG. 5B and FIG. 5C);
b) Can allow a quick single sliding movement,
to lock the door in multiple vertical or horizontal positions;
c) Can lock and adapt interchangeably,
to multiple wire crate panel or multiple plastic crate panel; and
d) Can quickly lock against the top panel of the big-dog-accommodating triple-hinged multi-function-shelf-trunk-platform-and-door pet crate,
to allow large dogs to enter and exit easily
(see FIG. 5B and FIG. 5C).
3) It is another object of the new invention to provide a big-dog-accommodating triple-hinged multi-function-shelf-trunk-platform-and-door pet crate, having multi-function slanted urine-storing bed-roof-terrace system 109.
Therefore, the big-dog-accommodating triple-hinged multi-function-shelf-trunk-platform-and-door pet crate:
a) Can provide a grooming platform (when used a grooming platform), which allows urine to run down the sanitary urine-storing gutters,
to keep the grooming platform dry when used as a grooming platform,
b) Can provide gutter ridges to elevate pet paws from the sanitary urine-storing gutters,
to prevent pets from stepping in urine
(see FIG. 2A and FIG. 2B);
c) Can provide an alternate platform for pets,
to allow the pets to sit, stand, play, rest, and sleep thereon
(see FIG. 5J and FIG. 5I);
d) Can keep pets away from urine,
to keep the pets dry; and
e) Can provide a roof (when used as a roof),
to protect pets from the weather elements,
(See FIG. 5J and FIG. 5I).
4) It is another object of the new invention to provide a big-dog-accommodating triple-hinged multi-function-shelf-trunk-platform-and-door pet crate, having multi-function door-locking ring system 151.
Therefore, the big-dog-accommodating triple-hinged multi-function-shelf-trunk-platform-and-door pet crate:
a) Can lock door hinges in multiple locations,
to create multiple configuration options;
b) Can lock grooming platform to top panel,
to keep pets safe while grooming;
c) Can provide alternative locking location,
to create interior storage option
(see FIG. 5B and FIG. 5C); and
d) Can provide alternative locking location
to create exterior storage options
(see FIG. 5F and FIG. 5G).
5) It is a further object of the new invention to provide a big-dog-accommodating triple-hinged multi-function-shelf-trunk-platform-and-door pet crate, having multi-function grooming platform system 119.
Therefore, the big-dog-accommodating triple-hinged multi-function-shelf-trunk-platform-and-door pet crate:

a) Can quickly and easily be locked
to multi-function platform-locking shock-absorbing gusset systems
(see FIG. 5H);
b) Can conveniently provide secondary location for a pet,
to stand, sit, lay, or be groomed on
(see FIG. 5H);
c) Can conveniently allow pet grooming,
to take place in the same location as the big-dog-accommodating triple-hinged multi-function-shelf-trunk-platform-and-door pet crate
(see FIG. 5H); and
d) Can conveniently provide standing, sitting, laying, or grooming area atop the big-dog-accommodating triple-hinged multi-function-shelf-trunk-platform-and-door pet crate,
to take no additional square footage
(see FIG. 5H).
6) It is a further object of the new invention to provide a big-dog-accommodating triple-hinged multi-function-shelf-trunk-platform-and-door pet crate, having multi-function grooming platform system 119.
Therefore, the big-dog-accommodating triple-hinged multi-function-shelf-trunk-platform-and-door pet crate:
a) Can conveniently provide alternate location for a pet,
to provide them relief from confinement
(see FIG. 5H);
b) Can conveniently be locked using platform-locking notches,
to secure multi-function grooming platform from slipping
(see FIG. 5H);
c) Can quickly and easily be assembled and disassembled without tools; and
d) Can quickly and easily be cleaned.
7) It is an even further object of the new invention to provide a big-dog-accommodating triple-hinged multi-function-shelf-trunk-platform-and-door pet crate, having palm knob 132*a*.
Therefore, the big-dog-accommodating triple-hinged multi-function-shelf-trunk-platform-and-door pet crate:
a) Can conform to person's arthritic hand with little bending of fingers or hand,
to lock and unlock the multi-function door system easily
(see FIG. 12C and FIG. 12D);
b) Can allow other conventional grips on the palm knob,
to lock and unlock the multi-function door system with one hand;
c) Can allow minimal movement for a person's arthritic hand,
to rotate the palm knob; and
d) Can fit differently sized hands.
8) It is yet another object of the new invention to provide a big-dog-accommodating triple-hinged multi-function-shelf-trunk-platform-and-door pet crate, having multi-function platform-locking shock-absorbing gusset systems 112.
Therefore, the big-dog-accommodating triple-hinged multi-function-shelf-trunk-platform-and-door pet crate:

a) Can minimize shocks and impacts exerted on the big-dog-accommodating triple-hinged multi-function-shelf-trunk-platform-and-door pet crate,
  to provide pets with comfort while being stationary or transported;
b) Can prevent all top corners of the big-dog-accommodating triple-hinged multi-function-shelf-trunk-platform-and-door pet crate from causing injuries to people and pets,
  to make the big-dog-accommodating triple-hinged multi-function-shelf-trunk-platform-and-door pet crate safer to use;
c) Can absorb vibrations exerted on the big-dog-accommodating triple-hinged multi-function-shelf-trunk-platform-and-door pet crate,
  to provide pets with comfort while being stationary or transported; and
d) Can resist the twisting, bending, and wobbling forces exerted on the big-dog-accommodating triple-hinged multi-function-shelf-trunk-platform-and-door pet crate
  to strengthen the big-dog-accommodating triple-hinged multi-function-shelf-trunk-platform-and-door pet crate
    (see FIG. 14E, FIG. 14F, FIG. 14G, FIG. 14H, FIG. 14I, and FIG. 14J).

Other objects and advantages of the present invention will become apparent from a consideration of the accompanying drawings and ensuing description.

SUMMARY OF THE INVENTION

A big-dog-accommodating triple-hinged multi-function-shelf-trunk-platform-and-door pet crate comprises top, bottom, left, right, front, and rear panels attached to one another, multi-function slanted urine-storing bed-roof-terrace having built-in gutters and ridges disposed on the bottom panel, a grooming platform, multi-function shock-absorbing gussets covering all the corners of the panels to lock the grooming platform and to absorb shocks and vibrations, a big-dog-accommodating triple-hinged multi-function-shelf-trunk-platform-and-door having triple hinges thereon to allow it to close after a big dog enters the pet crate and to allow it to also function as a shelf or a trunk or a platform, triple locking rods to lock the big-dog-accommodating triple-hinged multi-function-shelf-trunk-platform-and-door to the front panel, a palm knob with palm recesses and palm hills for an arthritic to use without the need for folding his or her fingers, a spring-loaded palm knob to lock the big-dog-accommodating triple-hinged multi-function-shelf-trunk-platform-and-door against and parallel to the top panel, and double magnets attached to the big-dog-accommodating triple-hinged multi-function-shelf-trunk-platform-and-door system and the front panel, respectively, to stop the big-dog-accommodating triple-hinged multi-function-shelf-trunk-platform-and-door from swinging.

BRIEF DESCRIPTION OF THE DRAWINGS

FIG. 1C, FIG. 1D, FIG. 1E, FIG. 1F, FIG. 2A, and FIG. 2B illustrate side and top views of the big-dog-accommodating triple-hinged multi-function-shelf-trunk-platform-and-door pet crate, having multi-function slanted urine-storing bed-roof-terrace system, multi-function platform-locking shock-absorbing gusset systems, multi-function grooming platform, and multi-function big-dog-accommodating triple-hinged triple-front-lock single-top-lock multi-function-shelf-trunk-platform-and-door system.

FIG. 3A, FIG. 3B and FIG. 4 illustrate front, perspective and top views of how multi-function big-dog-accommodating triple-hinged multi-function-shelf-trunk-platform-and-door system is installed on the front panel of the big-dog-accommodating triple-hinged multi-function-shelf-trunk-platform-and-door pet crate.

FIG. 5A, FIG. 5B, FIG. 5C, FIG. 5D, FIG. 5E, FIG. 5F, FIG. 5G FIG. 5H, FIG. 5I, FIG. 5J, FIG. 6, FIG. 7A, FIG. 7B, FIG. 7C, FIG. 7D, FIG. 7E, FIG. 7F, FIG. 8A, FIG. 8B, FIG. 8C, FIG. 8D, FIG. 8E, FIG. 8F, FIG. 8G, FIG. 9A, and FIG. 9B illustrate side, front, and rear views of how door-locking rods and rod-locking-and-unlocking gears are installed on multi-function big-dog-accommodating triple-hinged multi-function-shelf-trunk-platform and-door system and demonstrates how multi-function big-dog-accommodating triple-hinged multi-function-shelf-trunk-platform-and-door system can be configured to create a storage tray, exterior storage, interior storage and grooming platform.

FIG. 10A, FIG. 10B, FIG. 10C, FIG. 10D, FIG. 10E, FIG. 10F, FIG. 10G, FIG. 10H, FIG. 11A, FIG. 11B, FIG. 12A, FIG. 12B, FIG. 12C, FIG. 12D, FIG. 13A, and FIG. 13B illustrate side, front, and perspective views of how door-locking rods and rod-locking-and-unlocking gears are operated on big-dog-accommodating triple-hinged multi-function-shelf-trunk-platform-and-door system.

FIG. 14A, FIG. 14B, FIG. 14C, FIG. 14D, FIG. 14E, FIG. 14F, FIG. 14G, FIG. 14H, FIG. 14I, FIG. 14J, and FIG. 14K illustrate top, side, front, and rear views of how multi-function platform-locking shock-absorbing gusset systems work.

FIG. 16E, FIG. 16F, FIG. 16G, FIG. 16H, FIG. 16I, FIG. 16J, FIG. 16K, FIG. 16L, FIG. 16M, and FIG. 16N illustrate top, front, and perspective views of how to lock big-dog-accommodating triple-hinged multi-function-shelf-trunk-platform-and-door system on the big-dog-accommodating triple-hinged multi-function-shelf-trunk-platform-and-door pet crate.

FIG. 18A illustrates a side view of an equivalent variation of multi-function platform-locking shock-absorbing gusset systems.

FIG. 18B illustrates a top view of four platform-locking tabs, which are equivalent to and can replace the top four of platform-locking shock-absorbing gusset tabs

DETAILED DESCRIPTION OF THE INVENTION

Figure 1A:
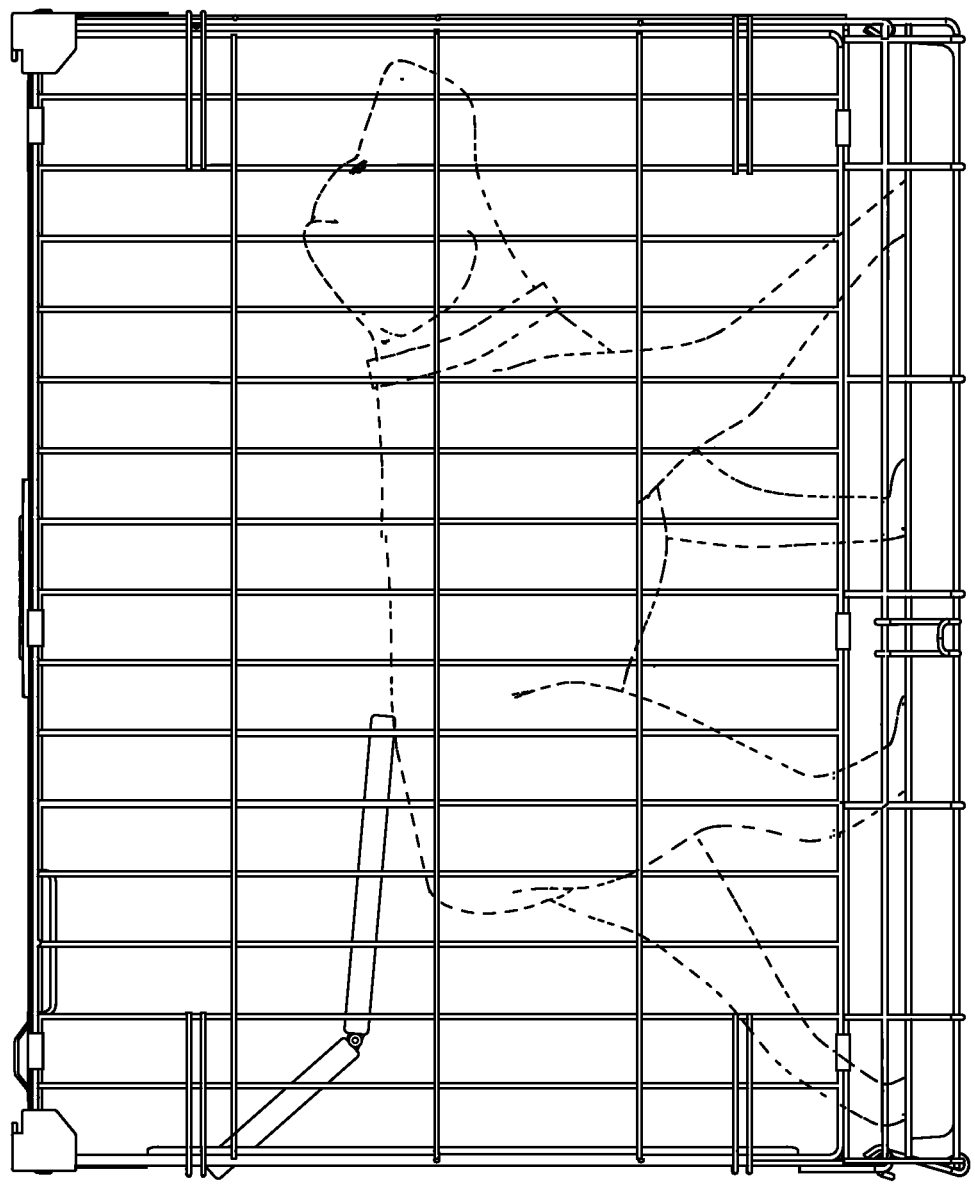
FIG. 1A (Prior Art) and FIG. 1B (Prior Art) illustrate prior art and of pet crate and how the big-dog-accommodating triple-hinged multi-function-shelf-trunk-platform-and-door pet crate solves the problem.
Figure 1B:
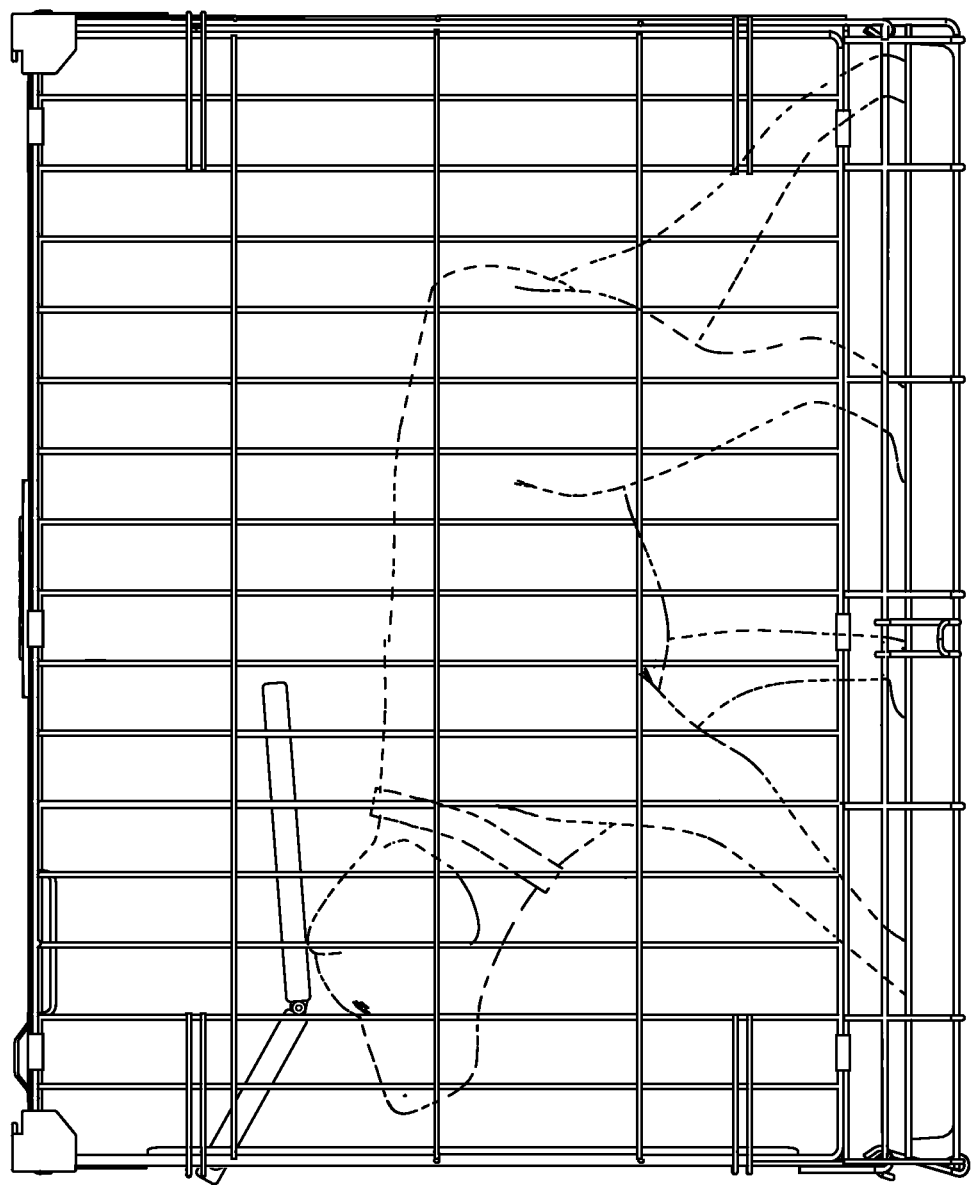
Figure 1D:
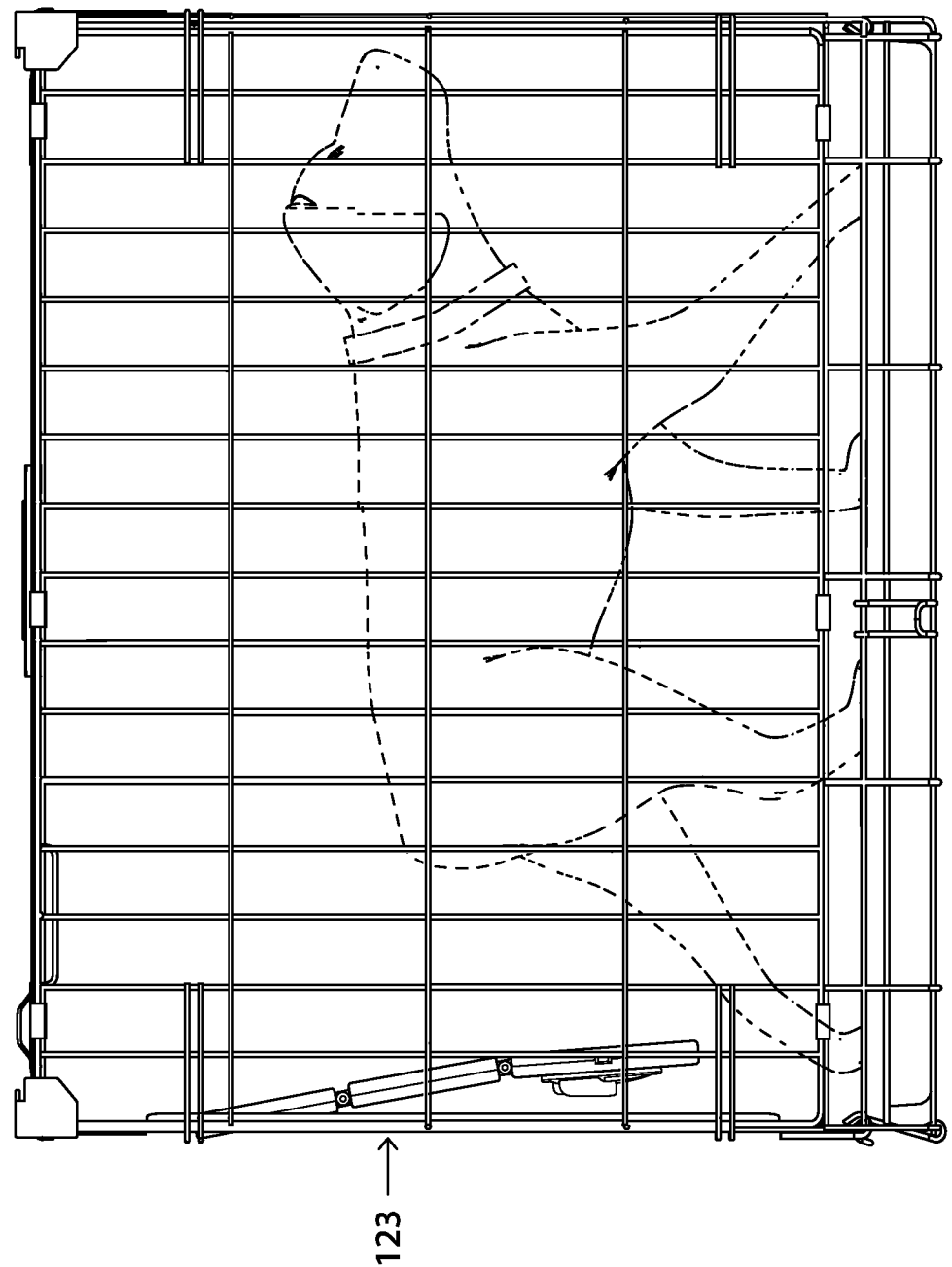
Figure 1F:
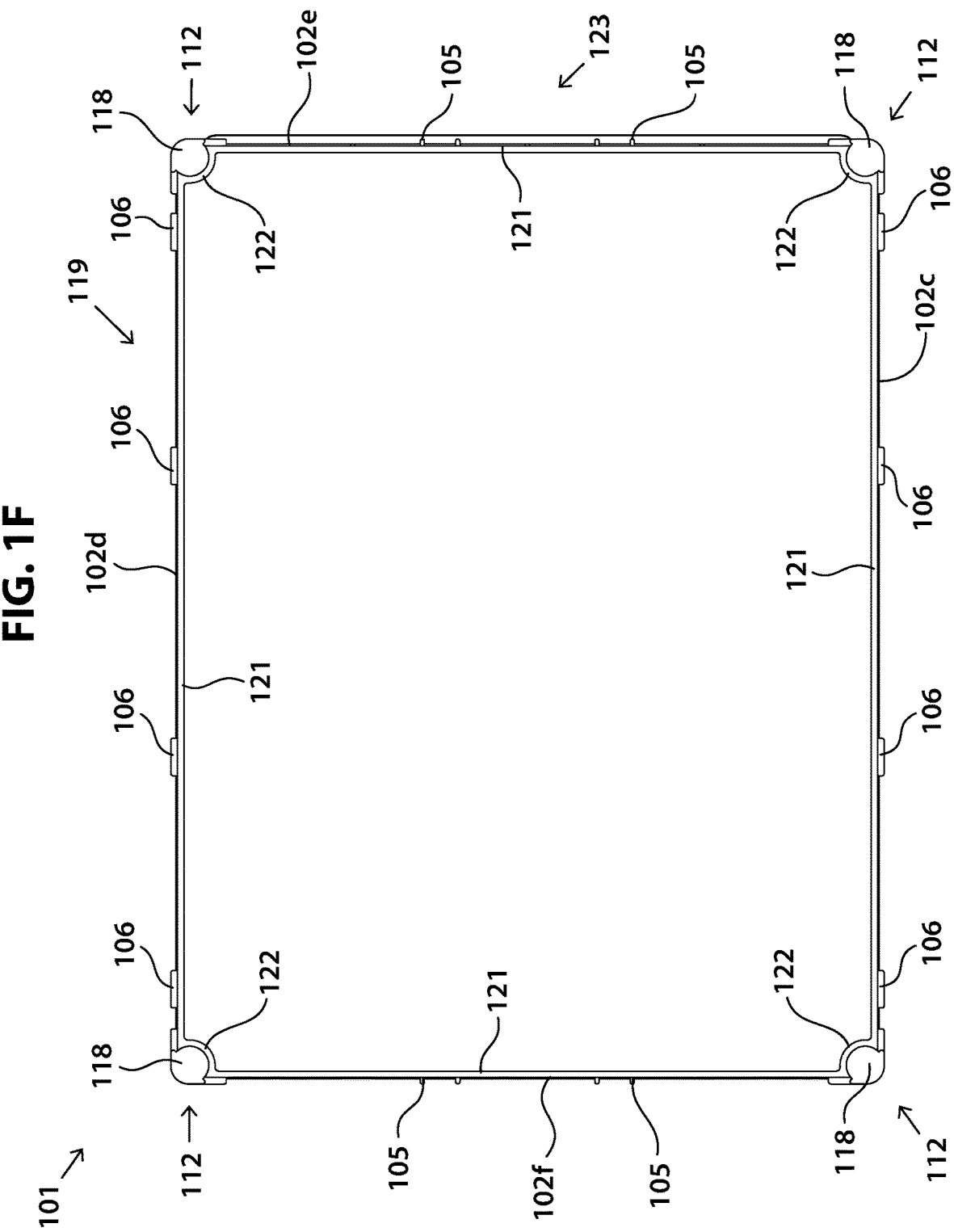
Figure 3A:
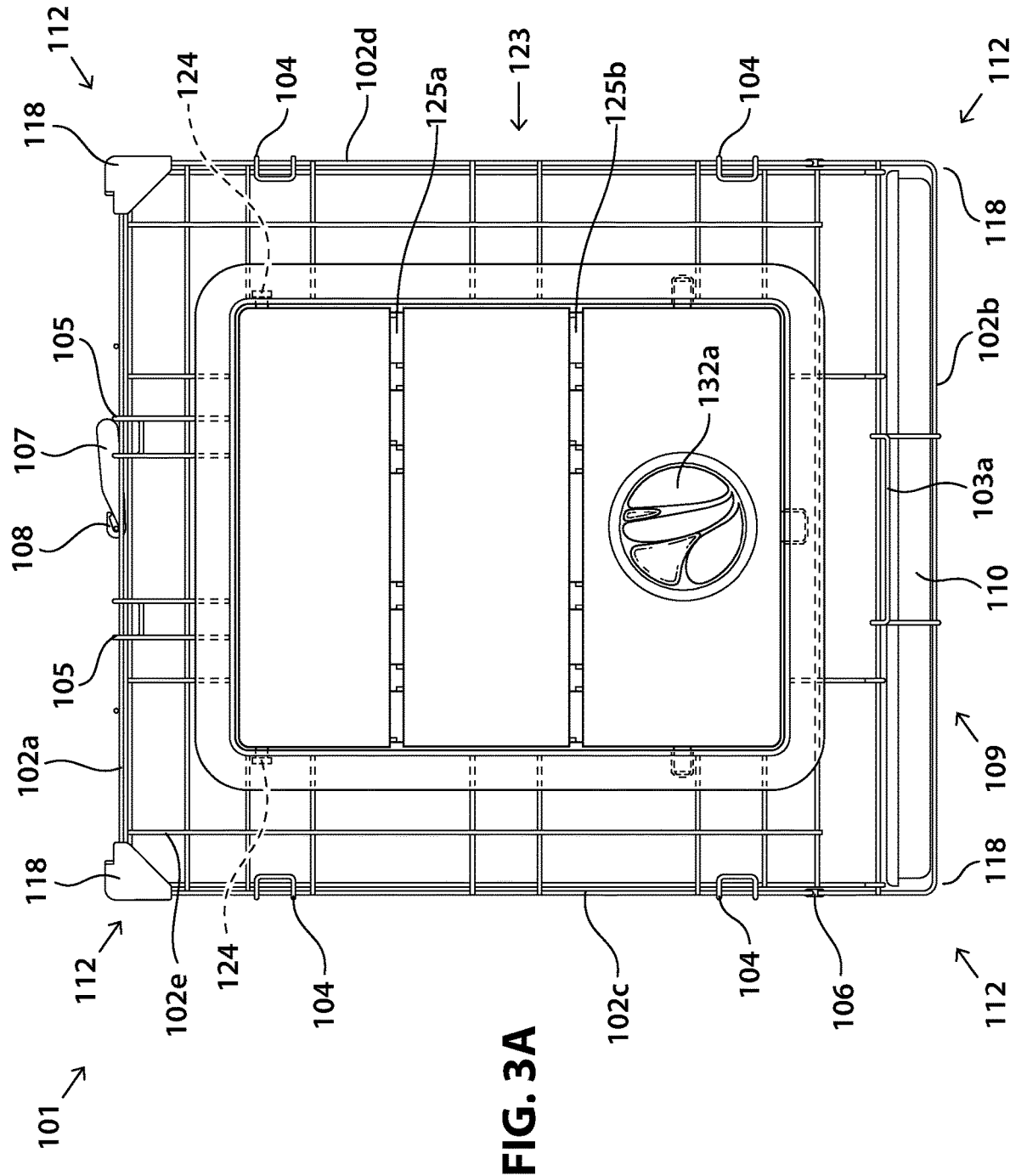
Figure 3B:
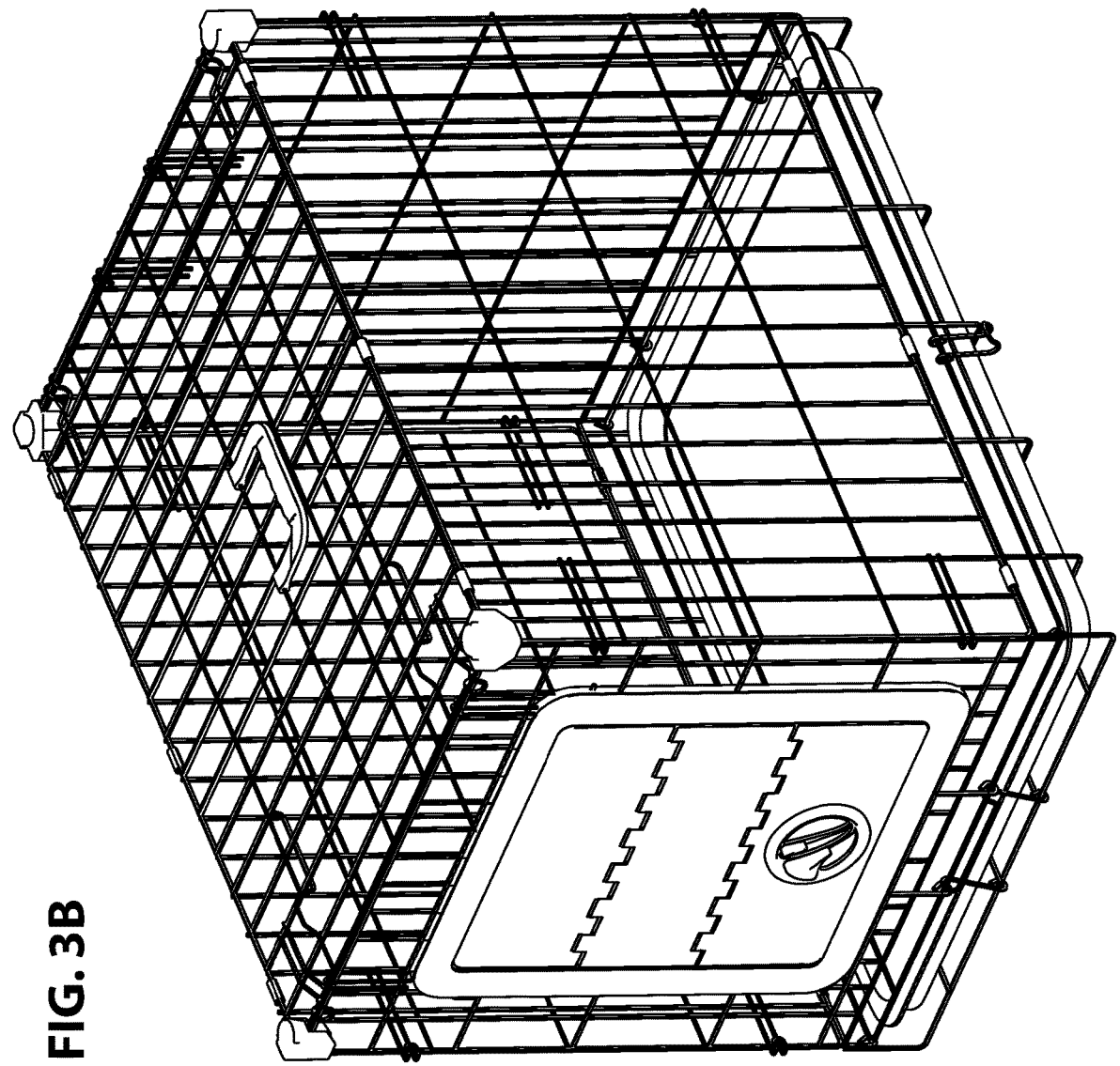

The big-dog-accommodating triple-hinged multi-function-shelf-trunk-platform-and-door pet crate has:
1) Multi-function slanted urine-storing bed-roof-terrace system,
2) Multi-function platform-locking shock-absorbing gusset systems,
3) Multi-function grooming platform system, and
4) Multi-function big-dog-accommodating triple-hinged triple-front-lock
single-top-lock multi-function-shelf-trunk-platform-and-door system.

Component

Referring to FIG. 1C, FIG. 1D, FIG. 1E, FIG. 1F, FIG. 2A, FIG. 2B, FIG. 3A, FIG. 3B, FIG. 4, FIG. 5A, FIG. 6, FIG. 7A, FIG. 7B, FIG. 7C, FIG. 7D, FIG. FIG. 7E, FIG. 7F, FIG. 8A, FIG. 8B, FIG. 8C, FIG. 8D, and FIG. 8E, the big-dog-accommodating triple-hinged multi-function-shelf-trunk-platform-and-door pet crate comprises:
1) Crate-panel system 101, comprising:
2) Top, bottom, left, right, front, and rear panels 102a, 102b, 102c, 102d, 102e, and 102f,
3) Bottom panel-locking hooks 103a and 103b,
4) Side panel-locking hooks 104,
5) Top panel-locking hooks 105,
6) Panel-coupling clamps 106,
7) Handle 107,
8) Handle-locking hooks 108;
9) Multi-function slanted urine-storing bed-roof-terrace system 109, comprising:
10) Slanted sanitary-urine-storing-gutter bed-roof-terrace 110,
11) Sanitary urine-storing gutters and gutter ridges 111a and 111b;
12) Multi-function platform-locking shock-absorbing gusset systems 112, each comprising:
13) Gusset walls 113,
14) Wire-locking gusset recesses 114a and 114b,
15) Curved gusset springs 115a, 115b, and 115c,
16) Vertical gusset spring 116,
17) Horizontal gusset spring 117,
18) Platform-locking shock-absorbing gusset tab 118;
19) Multi-function grooming platform system 119, comprising:
20) Grooming platform 120,
21) Platform dikes 121,
22) Platform-locking corners 122a,
Platform-locking notches 122b;
23) Multi-function big-dog-accommodating triple-hinged multi-function-shelf-trunk-platform-and-door system 123, comprising:
24) First big-dog-accommodating door hinge 124,
25) Second big-dog-accommodating door hinge 125a,
Third big-dog-accommodating door hinge 125b,
26) First multi-position shelf-trunk-platform-and-door panel 126,
27) Second multi-position shelf-trunk-platform-and-door panel 127a,
Third multi-position shelf-trunk-platform-and-door panel 127b,
28) Front knob panel 128,
29) Rear knob panel 129,
30) Front knob hooks 130,
31) Rear knob hooks 131,
32) Palm knob 132a,
Spring-loaded palm knob 132b,
33) Palm recesses 133,
34) Palm hills 134,
35) Circular knob gears 135,
36) Knob-stopping notches 136,
37) Knob-stopping spring-loaded pin 137,
38) Spring-loaded-pin housing 138,
39) First locking rod 139,
40) First-locking-rod linear gears 140,
41) First-locking-rod attacher 141,
42) First-locking-rod extender 142,
43) Second locking rod 143,
44) Second-locking-rod linear gears 144,
45) Second-locking-rod attacher 145,
46) Second-locking-rod extender 146,
47) Third locking rod 147,
48) Third-locking-rod linear gears 148,
49) Third-locking-rod attacher 149,
50) Third-locking-rod extender 150;
51) Multi-function door-locking ring system 151, comprising:
52) Hinge-locking rings 152,
53) Rod-locking rings 153a,
Rod-Locking rings 153b,
Rod-Locking rings 153c; and
54) Door-panel-and-door magnet system 154,
55) Panel magnet 155,
56) Door magnet 156.

Material

Referring to FIG. 1C, FIG. 1D, FIG. 1E, FIG. 1F, FIG. 2A, FIG. 2B, FIG. 3A, FIG. 3B, FIG. 4, FIG. 5A, FIG. 6, FIG. 7A, FIG. 7B, FIG. 7C, FIG. 7D, FIG. 7E, FIG. 7F, FIG. 8A, FIG. 8B, FIG. 8C, FIG. 8D, and FIG. 8E:
1) Crate-panel system 101 is made of the combined materials of its components.
2) Top, bottom, left, right, front, and rear panels 102a, 102b, 102c, 102d, 102e, and 102f each are made of plastic, wooden, or metallic material, or a combination of at least two of the above-mentioned materials.
3) Bottom panel-locking hooks 103a and 103b each are made of plastic, wooden, or metallic material, or a combination of at least two of the above-mentioned materials.
4) Side panel-locking hooks 104 each are made of plastic, wooden, or metallic material, or a combination of at least two of the above-mentioned materials.
5) Top panel-locking hooks 105 each are made of plastic, wooden, or metallic material, or a combination of at least two of the above-mentioned materials.

6) Panel-coupling clamps 106 each are made of plastic, wooden, or metallic material, or a combination of at least two of the above-mentioned materials.
7) Handle 107 is made of plastic, wooden, or metallic material, or a combination of at least two of the above-mentioned materials.
8) Handle-locking hooks 108 each are made of plastic, wooden, or metallic material, or a combination of at least two of the above-mentioned materials.
9) Multi-function slanted urine-storing bed-roof-terrace system 109 is made of the combined materials of its components.
10) Slanted sanitary-urine-storing-gutter bed-roof-terrace 110 is made of plastic, wooden, or metallic material, or a combination of at least two of the above-mentioned materials.
11) Sanitary urine-storing gutters and gutter ridges 111*a* and 111*b* each are made of plastic, wooden, or metallic material, or a combination of at least two of the above-mentioned materials.
12) Multi-function platform-locking shock-absorbing gusset systems 112 each are made of the combined materials of its components.
13) Gusset walls 113 each are made of plastic, wooden, or metallic material, or a combination of at least two of the above-mentioned materials.
14) Wire-locking gusset recesses 114*a* and 114*b* each are made of empty space.
15) Curved gusset springs 115*a*, 115*b*, and 115*c* each are made of plastic, wooden, or metallic material, or a combination of at least two of the above-mentioned materials.
16) Vertical gusset spring 116 is made of plastic, wooden, or metallic material, or a combination of at least two of the above-mentioned materials.
17) Horizontal gusset spring 117 is made of plastic, wooden, or metallic material, or a combination of at least two of the above-mentioned materials.
18) Platform-locking shock-absorbing gusset tab 118 is made of plastic, wooden, or metallic material, or a combination of at least two of the above-mentioned materials.
19) Multi-function grooming platform system 119 is made of the combined materials of its components.
20) Grooming platform 120 is made of plastic, wooden, or metallic material, or a combination of at least two of the above-mentioned materials.
21) Platform dikes 121 each are made of plastic, wooden, or metallic material, or a combination of at least two of the above-mentioned materials.
22) Platform-locking corners 122*a* each are made of plastic, wooden, or metallic material, or a combination of at least two of the above-mentioned materials.
Platform-locking notches 122*b* each are made of empty space.
23) Multi-function big-dog-accommodating triple-hinged multi-function-shelf-trunk-platform-and-door system 123 is made of the combined materials of its components.
24) First big-dog-accommodating door hinge 124 is made of plastic, wooden, or metallic material, or a combination of at least two of the above-mentioned materials.
25) Second big-dog-accommodating door hinge 125*a* and third big-dog-accommodating door hinge 125*b* each are made of plastic, wooden, or metallic material, or a combination of at least two of the above-mentioned materials.
26) First multi-position shelf-trunk-platform-and-door panel 126 is made of plastic, wooden, or metallic material, or a combination of at least two of the above-mentioned materials.
27) Second multi-position shelf-trunk-platform-and-door panel 127*a* and third multi-position shelf-trunk-platform-and-door panel 127*b* each are made of plastic, wooden, or metallic material, or a combination of at least two of the above-mentioned materials.
28) Front knob panel 128 is made of plastic, wooden, or metallic material, or a combination of at least two of the above-mentioned materials.
29) Rear knob panel 129 is made of plastic, wooden, or metallic material, or a combination of at least two of the above-mentioned materials.
30) Front knob hooks 130 each are made of plastic, wooden, or metallic material, or a combination of at least two of the above-mentioned materials.
31) Rear knob hooks 131 each are plastic, wooden, or metallic material, or a combination of at least two of the above-mentioned materials.
32) Palm knob 132*a* is made of plastic, wooden, or metallic material, or a combination of at least two of the above-mentioned materials.
Spring-loaded palm knob 132*b* is made of plastic, wooden, or metallic material, or a combination of at least two of the above-mentioned materials.
33) Palm recesses 133 each are made of empty space.
34) Palm hills 134 each are made of plastic, wooden, or metallic material, or a combination of at least two of the above-mentioned materials.
35) Circular knob gears 135 each are made of plastic, wooden, or metallic material, or a combination of at least two of the above-mentioned materials.
36) Knob-stopping notches 136 each are made of empty space.
37) Knob-stopping spring-loaded pin 137 is made of plastic, wooden, or metallic material, or a combination of at least two of the above-mentioned materials.
38) Spring-loaded-pin housing 138 is made of plastic, wooden, or metallic material, or a combination of at least two of the above-mentioned materials.
39) First locking rod 139 is made of plastic, wooden, or metallic material, or a combination of at least two of the above-mentioned materials.
40) First-locking-rod linear gears 140 each are made of plastic, wooden, or metallic material, or a combination of at least two of the above-mentioned materials.
41) First-locking-rod attacher 141 is made of plastic, wooden, or metallic material, or a combination of at least two of the above-mentioned materials.
42) First-locking-rod extender 142 is made of plastic, wooden, or metallic material, or a combination of at least two of the above-mentioned materials.
43) Second locking rod 143 is made of plastic, wooden, or metallic material, or a combination of at least two of the above-mentioned materials.
44) Second-locking-rod linear gears 144 each are made of plastic, wooden, or metallic material, or a combination of at least two of the above-mentioned materials.
45) Second-locking-rod attacher 145 is made of plastic, wooden, or metallic material, or a combination of at least two of the above-mentioned materials.
46) Second-locking-rod extender 146 is made of plastic, wooden, or metallic material, or a combination of at least two of the above-mentioned materials.
47) Third locking rod 147 is made of plastic, wooden, or metallic material, or a combination of at least two of the above-mentioned materials.

17

48) Third-locking-rod linear gears 148 each are made of plastic, wooden, or metallic material, or a combination of at least two of the above-mentioned materials.
49) Third-locking-rod attacher 149 is made of plastic, wooden, or metallic material, or a combination of at least two of the above-mentioned materials.
50) Third-locking-rod extender 150 is made of plastic, wooden, or metallic material, or a combination of at least two of the above-mentioned materials.
51) Multi-function door-locking ring system 151 is made of the combined materials of its components.
52) Hinge-locking rings 152 each are made of plastic, wooden, or metallic material, or a combination of at least two of the above-mentioned materials.
53) Rod-locking rings 153a, rod-locking rings 153b and rod-locking rings 153c each are made of plastic, wooden, or metallic material, or a combination of at least two of the above-mentioned materials.
54) Door-panel-and-door magnet system 154 is made of the combined materials of its components.
55) Panel magnet 155 is made of metallic material.
56) Door magnet 156 is made of metallic material.

Shape

Referring to FIG. 1C, FIG. 1D, FIG. 1E, FIG. 1F, FIG. 2A, FIG. 2B, FIG. 3A, FIG. 3B, FIG. 4, FIG. 5A, FIG. 6, FIG. 7A, FIG. 7B, FIG. 7C, FIG. 7D, FIG. 7E, FIG. 7F, FIG. 8A, FIG. 8B, FIG. 8C, FIG. 8D, and FIG. 8E:

1) Crate-panel system 101 is formed into the combined shapes of its components.
2) Top, bottom, left, right, front, and rear panels 102a, 102b, 102c, 102d, 102e, and 102f, each are formed into a rectangular shape.
3) Bottom panel-locking hooks 103a and 103b each are formed into a curved L shape.
4) Side panel-locking hooks 104 each are formed into an L shape.
5) Top panel-locking hooks 105 each are formed into an L shape.
6) Panel-coupling clamps 106 each are formed into a C shape with curved ends.
7) Handle 107 is formed into a C shape.
8) Handle-locking hooks 108 each are formed into a U shape.
9) Multi-function slanted urine-storing bed-roof-terrace system 109 is formed into the combined shapes of its components.
10) Slanted sanitary-urine-storing-gutter bed-roof-terrace 110 is formed into a rectangular shape.
11) Sanitary urine-storing gutters 111a each are formed into a rectangular shape with a U-shaped cross-section. Gutter ridges 111b each are formed into a rectangular shape.
12) Multi-function platform-locking shock-absorbing gusset systems 112 each have the combined shapes of its components.
13) Gusset walls 113 each are formed into a triangular shape.
14) Wire-locking gusset recesses 114a and 114b each are formed into a triangular shape.
15) Curved gusset springs 115a, 115b, and 115c each are formed into a curved rectangular shape.
16) Vertical gusset spring 116 is formed into a rectangular shape.
17) Horizontal gusset spring 117 is formed into a triangular shape.
18) Platform-locking shock-absorbing gusset tab 118 is formed into a triangular shape with a curved front edge.
19) Multi-function grooming platform system 119 is formed into the combined shapes of its components.

20) Grooming platform 120 is formed into a rectangular shape.
21) Platform dikes 121 each are formed into a rectangular shape with a U-shaped cross-section.
22) Platform-locking corners 122a each are formed into a triangular shape
    Platform-locking notches 122b each are formed into a rectangular shape.
23) Multi-function big-dog-accommodating triple-hinged multi-function-shelf-trunk-platform-and-door system 123 is formed into the combined shapes of its components.
24) First big-dog-accommodating door hinge 124 is formed into an I shape.
25) Second big-dog-accommodating door hinge 125a and third big-dog-accommodating door hinge 125b each are formed into an I shape.
26) First multi-position shelf-trunk-platform-and-door panel 126 is formed into a rectangular shape.
27) Second multi-position shelf-trunk-platform-and-door panel 127a and Third multi-position shelf-trunk-platform-and-door panel 127b each are formed into a rectangular shape.
28) Front knob panel 128 is formed into a ring shape.
29) Rear knob panel 129 is formed into a ring shape.
30) Front knob hooks 130 each are formed into an L shape.
31) Rear knob hooks 131 each are formed into an L shape.
32) Palm knob 132a is formed into a round shape.
    Spring-loaded palm knob 132b is formed into a leeter-T shape.
33) Palm recesses 133 each are formed into a curved-water-drop shape.
34) Palm hills 134 each are formed into a curved-water-drop shape.
35) Circular knob gears 135 each are formed into a circular-gear shape.
36) Knob-stopping notches 136 each are formed into a triangular shape.
37) Knob-stopping spring-loaded pin 137 is formed into a cylindrical shape.
38) Spring-loaded-pin housing 138 is formed into a bottle shape.
39) First locking rod 139 is formed into an S-rod shape.
40) First-locking-rod linear gears 140 each are formed into a linear-gear shape.
41) First-locking-rod attacher 141 is formed into a tube-cylinder shape.
42) First-locking-rod extender 142 is formed into an I-rod shape.
43) Second locking rod 143 is formed into an S-rod shape.
44) Second-locking-rod linear gears 144 each are formed into a linear-gear shape.
45) Second-locking-rod attacher 145 is formed into a tube-cylinder shape.
46) Second-locking-rod extender 146 is formed into an I-rod shape.
47) Third locking rod 147 is formed into an O-rod shape.
48) Third-locking-rod linear gears 148 each are formed into a linear-gear shape.
49) Third-locking-rod attacher 149 is formed into a tube-cylinder shape.
50) Third-locking-rod extender 150 is formed into an I-rod shape.
51) Multi-function door-locking ring system 151 is formed into the combined shapes of its components.
52) Hinge-locking rings 152 each are formed into an O shape.

53) Rod-locking rings 153a, rod-locking rings 153b and rod-locking rings 153c each are formed into an O shape.
54) Door-panel-and-door magnet system 154 is formed into the combined shapes of its components.
55) Panel magnet 155 is formed into a rectangular-cube shape.
56) Door magnet 156 is formed into a rectangular-cube shape.

Connection

Referring to FIG. 1C, FIG. 1D, FIG. 1E, FIG. 1F, FIG. 2A, FIG. 2B, FIG. 3A, FIG. 3B, FIG. 4, FIG. 5A, FIG. 6, FIG. 7A, FIG. 7B, FIG. 7C, FIG. 7D, FIG. 7E, FIG. 7F, FIG. 8A, FIG. 8B, FIG. 8C, FIG. 8D, and FIG. 8E:

1) Crate-panel system 101 has the combined connections of its components.
2) Top, bottom, left, right, front, and rear panels 102a, 102b, 102c, 102d, 102e, and 102f respectively are foldably connected to one another.
3) Bottom panel-locking hooks 103a and 103b respectively are foldably connected to bottom panel 102b.
4) Side panel-locking hooks 104 respectively are welded to left and right panels 102c and 102d.
5) Top panel-locking hooks 105 respectively are welded to front and rear panels 102e and 102f.
6) Panel-coupling clamps 106 respectively are clamped on top, bottom, left, and right panels 102a, 102b, 102c, and 102d.
7) Handle 107 is molded to handle-locking hooks 108.
8) Handle-locking hooks 108 respectively are molded to handle 107.
9) Multi-function slanted urine-storing bed-roof-terrace system 109 has the combined connections of its components.
10) Slanted sanitary-urine-storing-gutter bed-roof-terrace 110 is seated on bottom panel 102b.
11) Sanitary urine-storing gutters and gutter ridges 111a and 111b respectively are molded to slanted sanitary-urine-storing-gutter bed-roof-terrace 110.
12) Multi-function platform-locking shock-absorbing gusset systems 112 respectively have the combined connections of its components.
13) Gusset walls 113 respectively are molded to curved gusset springs 115a, 115b, and 115c, vertical gusset spring 116, and horizontal gusset spring 117.
14) Wire-locking gusset recesses 114a and 114b respectively are molded inside gusset walls 113.
15) Curved gusset springs 115a, 115b, and 115c respectively are molded to gusset walls 113, vertical gusset spring 116, and horizontal gusset spring 117.
16) Vertical gusset spring 116 is molded to gusset walls 113, curved gusset springs 115a, 115b, and 115c, and horizontal gusset spring 117.
17) Horizontal gusset spring 117 is molded to gusset walls 113, curved gusset springs 115a, 115b, and 115c, and vertical gusset spring 116.
18) Platform-locking shock-absorbing gusset tab 118 is molded to horizontal gusset spring 117.
19) Multi-function grooming platform system 119 has the combined connections of its components.
20) Grooming platform 120 is molded to platform dikes 121.
21) Platform dikes 121 respectively are molded to and around grooming platform 120.
22) Platform-locking corners 122a respectively are molded to platform dikes 121

Platform-locking notches 122b respectively are punched into grooming platform 120.

23) Multi-function big-dog-accommodating triple-hinged multi-function-shelf-trunk-platform-and-door system 123 has the combined connections of its components.
24) First big-dog-accommodating door hinge 124 is attached to front panel 102e.
25) Second big-dog-accommodating door hinge 125a is attached to first multi-position shelf-trunk-platform-and-door panel 126.

Third big-dog-accommodating door hinge 125b is attached to second multi-position shelf-trunk-platform-and-door panel 127a.

26) First multi-position shelf-trunk-platform-and-door panel 126 is attached to first big-dog-accommodating door hinge 124.
27) Second multi-position shelf-trunk-platform-and-door panel 127a and third multi-position shelf-trunk-platform-and-door panel 127b respectively are attached to second big-dog-accommodating door hinge 125a and third big-dog-accommodating door hinge 125b.
28) Front knob panel 128 is snap-locked on rear knob panel 129.
29) Rear knob panel 129 is snap-locked on front knob panel 128.
30) Front knob hooks 130 respectively are snap-locked on rear knob hooks 131.
31) Rear knob hooks 131 respectively are snap-locked on front knob hooks 130.
32) Palm knob 132a and spring-loaded palm knob 132b respectively are sandwiched between front knob panel 128 and rear knob panel 129.
33) Palm recesses 133 respectively are molded in palm knob 132a.
34) Palm hills 134 respectively are molded on palm knob 132a.
35) Circular knob gears 135 respectively are molded on palm knob 132a.
36) Knob-stopping notches 136 respectively are molded on palm knob 132a.
37) Knob-stopping spring-loaded pin 137 is inserted into one of knob-stopping notches 136.
38) Spring-loaded-pin housing 138 is molded on front knob panel 128 and rear knob panel 129.
39) First locking rod 139 is engaged to circular knob gear 135.
40) First-locking-rod linear gears 140 respectively are engaged to circular knob gear 135.
41) First-locking-rod attacher 141 is attached to first locking rod 139.
42) First-locking-rod extender 142 is attached to first-locking-rod attacher 141.
43) Second locking rod 143 is engaged to circular knob gear 135.
44) Second-locking-rod linear gears 144 respectively are engaged to circular knob gear 135.
45) Second-locking-rod attacher 145 is attached to second locking rod 143.
46) Second-locking-rod extender 146 is attached to second-locking-rod attacher 145.
47) Third locking rod 147 is engaged to circular knob gear 135.
48) Third-locking-rod linear gears 148 respectively are engaged to circular knob gear 135.
49) Third-locking-rod attacher 149 is attached to third locking rod 147.
50) Third-locking-rod extender 150 is attached to third-locking-rod attacher 149.

51) Multi-function door-locking ring system 151 is connected by the combined connections of its components.
52) Hinge-locking rings 152 respectively are molded, welded, or otherwise attached to front panel 102e.
53) Rod-locking rings 153a, Rod-locking rings 153b and Rod-locking rings 153c respectively are molded, welded, or otherwise attached to front panel 102e.
54) Door-panel-and-door magnet system 154 is connected by the combined connections of its components.
55) Panel magnet 155 is attached to front panel 102e.
56) Door magnet 156 is attached to second door panel 127.

Function

Referring to FIG. 5B, FIG. 5C, FIG. 5D, FIG. 5E, FIG. 5F, FIG. 5G, FIG. 5H, FIG. 5I, FIG. 5J, FIG. 8F, FIG. 8G, FIG. 9A, FIG. 9B, FIG. 10A, FIG. 10B, FIG. 10C, FIG. 10D, FIG. 10E, FIG. 10F, FIG. 10G, FIG. 10h, FIG. 11A, FIG. 11B, FIG. 12A, FIG. 12B, FIG. 12C, FIG. 12D, FIG. 13A, FIG. 13B, FIG. 14A, FIG. 14B, FIG. 14C, FIG. 14D, FIG. 14E, FIG. 14F, FIG. 14G, FIG. 14H, FIG. 14I, FIG. 14J, FIG. 14K, FIG. 15A, FIG. 15B, FIG. 15C, FIG. 15D, FIG. 15E, FIG. 15F, FIG. 16A, FIG. 16B, FIG. 16C, FIG. 16D, FIG. 16E, FIG. 16F, FIG. 16G, FIG. 16H, FIG. 16I, FIG. 16J, FIG. 16K, FIG. 16L, FIG. 16M, FIG. 16N, and FIG. 17:

1) Crate-panel system 101 is for performing the combined functions of its components.
2) Top, bottom, left, right, front, and rear panels 102a, 102b, 102c, 102d, 102e, and 102f respectively are for:
   Forming a crate.
3) Bottom panel-locking hooks 103a and 103b respectively are for:
   Preventing slanted sanitary-urine-storing-gutter bed-roof-terrace 110 from sliding out of bottom panel 102b, and for Snap-locking on top, left, right, front, and/or rear panels 102a, 102c, 102d, 102e, and/or 102f.
4) Side panel-locking hooks 104 respectively are for:
   Locking front and rear panels 102e, and 102f to top, left, and right panels 102a, 102c, 102d.
5) Top panel-locking hooks 105 respectively are for:
   Locking front and rear panels 102e, and 102f to top panel 102a.
6) Panel-coupling clamps 106 respectively are for:
   Coupling top, bottom, left, and right panels 102a, 102b, 102c, and 102d.
7) Handle 107 is for:
   Carrying crate-panel system 101, multi-function slanted urine-storing bed-roof-terrace system 109, multi-function gusset systems 112, multi-function grooming platform system 119, multi-function big-dog-accommodating triple-hinged multi-function-shelf-trunk-platform-and-door system 123, and multi-function door-locking ring system 151.
8) Handle-locking hooks 108 respectively are for:
   Hooking handle 107 on crate-panel system 101.
9) Multi-function slanted urine-storing bed-roof-terrace system 109 is for performing the combined functions of its components.
10) Slanted sanitary-urine-storing-gutter bed-roof-terrace 110 is for:
    a) Allowing urine to run down into sanitary urine-storing gutters 111 to keep slanted sanitary-urine-storing-gutter bed-roof-terrace 110 dry
       (see FIG. 2A);
    b) Preventing pets from getting diseases and infections caused by their own urine; and
    c) Providing a comfort platform for a pet to sit, stand, play, rest, and sleep thereon
       (see FIG. 5I and FIG. 5J).
11) Sanitary urine-storing gutters 111a respectively are for:
    a) Storing urine running down from slanted sanitary-urine-storing-gutter bed-roof-terrace 110 to keep slanted sanitary-urine-storing-gutter bed-roof-terrace 110 dry
       (see FIG. 2A); and
    b) Preventing pets from getting diseases and infections caused by their own urine.
    Gutter ridges 111b respectively are for:
    a) Keeping pets' feet and pets away from, and not on, urine when pets step in or lay on sanitary urine-storing gutters 111a to keep pets' feet and pets dry
       (see FIG. 2A); and
    b) Preventing pets from getting diseases and infections caused by their own urine.
    Grooming platform floor 111c is for:
    a) Providing a grooming platform for a pet to sit, stand, play, rest, sleep and be groomed on the top of the big-dog-accommodating triple-hinged multi-function-shelf-trunk-platform-and-door pet crate
       (see FIG. 5I and FIG. 5J);
    b) Providing rain protection for a pet to be kept dry; and
    c) Providing sun protection for keeping a pet cool.
12) Multi-function platform-locking shock-absorbing gusset systems 112 respectively are for performing the combined functions of its components.
13) Gusset walls 113 respectively are for:
    a) Strengthening top, bottom, left, right, front, and rear panels 102a, 102b, 102c, 102d, 102e, and 102f;
    b) Strengthening crate-panel system 101; and
    c) Locking top, bottom, left, right, front, and rear panels 102a, 102b, 102c, 102d, 102e, and 102f together
       (see FIG. 14E, FIG. 14F, FIG. 14G, FIG. 14H, FIG. 14I, FIG. 14J, and FIG. 14K).
14) Wire-locking gusset recesses 114a and 114b respectively are for:
    Locking the corners of top, bottom, left, right, front, and rear panels 102a, 102b, 102c, 102d, 102e, and 102f therein
    (see FIG. 15C, FIG. 15D, and FIG. 15E).
15) Curved gusset springs 115a, 115b, and 115c respectively are for:
    a) Resisting the wobbling forces exerted on top, bottom, left, right, front, and rear panels 102a, 102b, 102c, 102d, 102e, and 102f;
    b) Resisting the warping forces exerted on top, bottom, left, right, front, and rear panels 102a, 102b, 102c, 102d, 102e, and 102f;
    c) Resisting the twisting forces exerted on top, bottom, left, right, front, and rear panels 102a, 102b, 102c, 102d, 102e, and 102f;
    d) Resisting the bending forces exerted on top, bottom, left, right, front, and rear panels 102a, 102b, 102c, 102d, 102e, and 102f;
    e) Resisting the sliding forces exerted on top, bottom, left, right, front, and rear panels 102a, 102b, 102c, 102d, 102e, and 102f;
    f) Resisting the folding forces exerted on top, bottom, left, right, front, and rear panels 102a, 102b, 102c, 102d, 102e, and 102f;
    g) Strengthening vertical gusset spring 116;
    h) Strengthening horizontal gusset spring 117; and
    i) Returning multi-function platform-locking shock-absorbing gusset systems 112 back to its former shape and dimensions
       (see FIG. 14E, FIG. 14F, FIG. 14G, FIG. 14H, FIG. 14I, and FIG. 14J).

16) Vertical gusset spring 116 is for:
   a) Resisting the wobbling forces exerted on top, bottom, left, right, front, and rear panels 102*a*, 102*b*, 102*c*, 102*d*, 102*e*, and 102*f*;
   b) Resisting the warping forces exerted on top, bottom, left, right, front, and rear panels 102*a*, 102*b*, 102*c*, 102*d*, 102*e*, and 102*f*;
   c) Resisting the twisting forces exerted on top, bottom, left, right, front, and rear panels 102*a*, 102*b*, 102*c*, 102*d*, 102*e*, and 102*f*;
   d) Resisting the bending forces exerted on top, bottom, left, right, front, and rear panels 102*a*, 102*b*, 102*c*, 102*d*, 102*e*, and 102*f*;
   e) Resisting the sliding forces exerted on top, bottom, left, right, front, and rear panels 102*a*, 102*b*, 102*c*, 102*d*, 102*e*, and 102*f*;
   f) Resisting the folding forces exerted on top, bottom, left, right, front, and rear panels 102*a*, 102*b*, 102*c*, 102*d*, 102*e*, and 102*f*;
   g) Strengthening curved gusset springs 115*a*, 115*b*, and 115*c*;
   h) Strengthening horizontal gusset spring 117; and
   i) Returning multi-function platform-locking shock-absorbing gusset systems 112 back to its former shape and dimensions
      (see FIG. 14E, FIG. 14F, FIG. 14G, FIG. 14H, FIG. 14I, and FIG. 14J).

17) Horizontal gusset spring 117 is for:
   a) Resisting the wobbling forces exerted on top, bottom, left, right, front, and rear panels 102*a*, 102*b*, 102*c*, 102*d*, 102*e*, and 102*f*;
   b) Resisting the warping forces exerted on top, bottom, left, right, front, and rear panels 102*a*, 102*b*, 102*c*, 102*d*, 102*e*, and 102*f*;
   c) Resisting the twisting forces exerted on top, bottom, left, right, front, and rear panels 102*a*, 102*b*, 102*c*, 102*d*, 102*e*, and 102*f*;
   d) Resisting the bending forces exerted on top, bottom, left, right, front, and rear panels 102*a*, 102*b*, 102*c*, 102*d*, 102*e*, and 102*f*;
   e) Resisting the sliding forces exerted on top, bottom, left, right, front, and rear panels 102*a*, 102*b*, 102*c*, 102*d*, 102*e*, and 102*f*;
   f) Resisting the folding forces exerted on top, bottom, left, right, front, and rear panels 102*a*, 102*b*, 102*c*, 102*d*, 102*e*, and 102*f*;
   g) Strengthening curved gusset springs 115*a*, 115*b*, and 115*c*;
   h) Strengthening vertical gusset spring 116; and
   i) Returning multi-function platform-locking shock-absorbing gusset systems 112 back to its former shape and dimensions
      (see FIG. 14E, FIG. 14F, FIG. 14G, FIG. 14H, FIG. 14I, and FIG. 14J).

18) Platform-locking shock-absorbing gusset tab 118 is for:
   a) Locking multi-function grooming platform system 119 in place;
   b) Resisting the wobbling forces exerted on top, bottom, left, right, front, and rear panels 102*a*, 102*b*, 102*c*, 102*d*, 102*e*, and 102*f*;
   c) Resisting the warping forces exerted on top, bottom, left, right, front, and rear panels 102*a*, 102*b*, 102*c*, 102*d*, 102*e*, and 102*f*;
   d) Resisting the twisting forces exerted on top, bottom, left, right, front, and rear panels 102*a*, 102*b*, 102*c*, 102*d*, 102*e*, and 102*f*;
   e) Resisting the bending forces exerted on top, bottom, left, right, front, and rear panels 102*a*, 102*b*, 102*c*, 102*d*, 102*e*, and 102*f*;
   f) Resisting the sliding forces exerted on top, bottom, left, right, front, and rear panels 102*a*, 102*b*, 102*c*, 102*d*, 102*e*, and 102*f*;
   g) Resisting the folding forces exerted on top, bottom, left, right, front, and rear panels 102*a*, 102*b*, 102*c*, 102*d*, 102*e*, and 102*f*;
   h) Strengthening curved gusset springs 115*a*, 115*b*, and 115*c*;
   i) Strengthening vertical gusset spring 116;
   j) Returning multi-function platform-locking shock-absorbing gusset systems 112 back to its former shape and dimensions;
   k) Preventing top corners of the unique pet crate from scratching walls, floors, and furniture;
   l) Preventing top corners of the big-dog-accommodating triple-hinged multi-function-shelf-trunk-platform-and-door pet crate from causing injuries to people and pets;
   m) Absorbing shocks exerted on the big-dog-accommodating triple-hinged multi-function-shelf-trunk-platform-and-door pet crate to provide pets with comfort while being stationary or transported; and
   n) Absorbing vibrations exerted on the big-dog-accommodating triple-hinged multi-function-shelf-trunk-platform-and-door pet crate to provide pets with comfort while being stationary or transported
      (see FIG. 14E, FIG. 14F, FIG. 14G, FIG. 14H, FIG. 14I, and FIG. 14J).

19) Multi-function grooming platform system 119 is for performing the combined functions of its components.

20) Grooming platform 120 is for:
   Providing a platform for a pet to stand, sit, or lay on to be groomed
   (see FIG. 5H).

21) Platform dikes 121 respectively are for:
   a) Preventing pet urine from running off grooming platform 120;
   b) Preventing pet hair from falling off grooming platform 120; and
   c) Providing a comfort platform for a pet to sit, stand, rest and sleep thereon while being groomed.

22) Platform-locking corners 122 respectively are for:
   Locking grooming platform 120 to platform-locking shock-absorbing gusset tabs 118 when platform-locking corners 122 are inserted under platform-locking shock-absorbing gusset tabs 118
   (see FIG. 15E).
   Platform-locking notches 122 respectively are for:
   Locking grooming platform 120 to top panel 102*a* when first-locking-rod extender 142 and second-locking-rod extender 146 are locked into rod-locking rings 153*b*
   (see FIG. 5H).

23) Multi-function big-dog-accommodating triple-hinged multi-function-shelf-trunk-platform-and-door system 123 is for performing the combined functions of its components.

24) First big-dog-accommodating door hinge 124 is for:
   Hingedly attaching first door panel 126 to front panel 102*e* to allow multi-function big-dog-accommodating triple-hinged multi-function-shelf-trunk-platform-and-door system 123 to close the opening of front panel 102*e* after a big dog enters the big-dog-accommodating triple-hinged multi-function-shelf-trunk-platform-and-door pet crate.

25) Second big-dog-accommodating door hinge 125a is for:
Hingedly attaching first multi-position shelf-trunk-platform-and-door panel 126 to second multi-position shelf-trunk-platform-and-door panel 127a
to allow multi-function big-dog-accommodating triple-hinged multi-function-shelf-trunk-platform-and-door system 123 to close the opening of front panel 102e after a big dog enters the big-dog-accommodating triple-hinged multi-function-shelf-trunk-platform-and-door pet crate.

Third big-dog-accommodating door hinge 125b is for:
Hingedly attaching second multi-position shelf-trunk-platform-and-door panel 127a to third multi-position shelf-trunk-platform-and-door panel 127b
to allow multi-function big-dog-accommodating triple-hinged multi-function-shelf-trunk-platform-and-door system 123 to close the opening of front panel 102e after a big dog enters the big-dog-accommodating triple-hinged multi-function-shelf-trunk-platform-and-door pet crate.

26) First multi-position shelf-trunk-platform-and-door panel 126 is for:
Allowing multi-function big-dog-accommodating triple-hinged multi-function-shelf-trunk-platform-and-door system 123 to close the opening of front panel 102e after a big dog enters the big-dog-accommodating triple-hinged multi-function-shelf-trunk-platform-and-door pet crate.

27) Second multi-position shelf-trunk-platform-and-door panel 127a is for:
Allowing multi-function big-dog-accommodating triple-hinged multi-function-shelf-trunk-platform-and-door system 123 to close the opening of front panel 102e after a big dog enters the big-dog-accommodating triple-hinged multi-function-shelf-trunk-platform-and-door pet crate.

Third multi-position shelf-trunk-platform-and-door panel 127b is for:
Allowing multi-function big-dog-accommodating triple-hinged multi-function-shelf-trunk-platform-and-door system 123 to close the opening of front panel 102e after a big dog enters the big-dog-accommodating triple-hinged multi-function-shelf-trunk-platform-and-door pet crate.

In addition:
First multi-position shelf-trunk-platform-and-door panel 126,
Second multi-position shelf-trunk-platform-and-door panel 127a, and
Third multi-position shelf-trunk-platform-and-door panel 127b are for:
  a) Providing easy access to accommodate big dogs to enter into the big-dog-accommodating triple-hinged multi-function-shelf-trunk-platform-and-door pet crate and having multi-function big-dog-accommodating triple-hinged multi-function-shelf-trunk-platform-and-door system 123 gravitationally and automatically close behind them
  (see FIG. 1C and FIG. 1D);
  b) Functioning as a storage shelf for pet and grooming accessories
  (see FIG. 5D and FIG. 5E);
  c) Functioning as a drying shelf for wet towels
  (see FIG. 5F and FIG. 5G);
  d) Functioning as a grooming shelf for pets to rest while being groomed
  (see FIG. 5F and FIG. 5G);
  e) Functioning as an interior and exterior storage compartment for storing pet toys and accessories
  (see FIG. 5B and FIG. 5C);
  f) Functioning as a storage area for small pets to rest and dry
  (see FIG. 5F and FIG. 5G); and
  g) Functioning as an exterior storage compartment for pet and grooming accessories
  (see FIG. 5F and FIG. 5G).

28) Front knob panel 128 is for:
Sandwiching palm knob 132a therein.
29) Rear knob panel 129 is for:
Sandwiching palm knob 132a therein.
30) Front knob hooks 130 respectively are for:
Hooking on rear knob hooks 131.
31) Rear knob hooks 131 respectively are for:
Hooking on front knob hooks 130.
32) Palm knob 132a is for:
Rotating circular knob gear 135
(see FIG. 12C and FIG. 12D).
Spring-loaded palm knob 132b is for:
Locking multi-function big-dog-accommodating triple-hinged multi-function-shelf-trunk-platform-and-door system 123 to top panel 102a
(see FIG. 16E, FIG. 16F, FIG. 16G, FIG. 16H, FIG. 16I, FIG. 16J, FIG. 16K, FIG. 16L, FIG. 16M, and FIG. 16N).
33) Palm recesses 133 respectively are for:
Allowing the palm of a user's hand to rest therein.
34) Palm hills 134 respectively are for:
Allowing the palm of a user's hand to rest therebetween.
35) Circular knob gears 135 respectively are for:
Pushing first-locking-rod linear gear 140, second-locking-rod linear gear 144, and third-locking-rod linear gear 148.
36) Knob-stopping notches 136 respectively are for:
Allowing knob-stopping spring-loaded pin 137 to be inserted therein to stop palm knob 132a.
37) Knob-stopping spring-loaded pin 137 is for:
Stopping palm knob 132a.
38) Spring-loaded-pin housing 138 is for:
Housing knob-stopping spring-loaded pin 137.
39) First locking rod 139 is for:
Locking first door panel 126 and second door panel 127 in place.
40) First-locking-rod linear gears 140 respectively are for:
Engaging with circular knob gear 135.
41) First-locking-rod attacher 141 is for:
Attaching first locking rod 139 to first-locking-rod extender 142.
42) First-locking-rod extender 142 is for:
Extending first locking rod 139.
43) Second locking rod 143 is for:
Locking first door panel 126 and second door panel 127 in place.
44) Second-locking-rod linear gears 144 respectively are for:
Engaging with circular knob gear 135.
45) Second-locking-rod attacher 145 is for:
Attaching second locking rod 143 to second-locking-rod extender 146.
46) Second-locking-rod extender 146 is for:
Extending second locking rod 143.
47) Third locking rod 147 is for:
Locking first door panel 126 and second door panel 127 in place.

48) Third-locking-rod linear gears 148 respectively are for:
Engaging with circular knob gear 135.
49) Third-locking-rod attacher 149 is for:
Attaching third locking rod 147 to third-locking-rod extender 150.
50) Third-locking-rod extender 150 is for:
Extending third locking rod 147.
51) Multi-function door-locking ring system 151 is for performing the combined functions of its components.
52) Hinge-locking rings 152 respectively are for:
Locking first door hinge 124 therein.
53) Rod-locking rings 153*a* respectively are for:
Locking first locking rod extender 142, second locking rod extender 146, and third locking rod extender 150 therein.
Rod-locking rings 153*b* respectively are for:
Locking first locking rod extender 142 and second locking rod extender 146 therein
(see FIG. 5F, FIG. 5G, and FIG. 51I).
Rod-locking rings 153*c* respectively are for:
Locking first locking rod extender 142 and second locking rod extender 146 therein
(see FIG. 5B and FIG. 5C).
54) Door-panel-and-door magnet system 154 is for performing the combined functions of its components.
55) Panel magnet 155 is for:
  a) Pulling door magnet 156 toward itself
    to stop multi-function big-dog-accommodating triple-hinged multi-function-shelf-trunk-platform-and-door system 123 from swinging back and forth; and
  b) Pulling door magnet 156 toward itself
    to close multi-function big-dog-accommodating triple-hinged multi-function-shelf-trunk-platform-and-door system 123.
56) Door magnet 156 is for:
  a) Pulling panel magnet 155 toward itself
    to stop multi-function big-dog-accommodating triple-hinged multi-function-shelf-trunk-platform-and-door system 123 from swinging back and forth; and
  b) Pulling panel magnet 155 toward itself
    to close multi-function big-dog-accommodating triple-hinged multi-function-shelf-trunk-platform-and-door system 123.

Variation

Figure 19A:
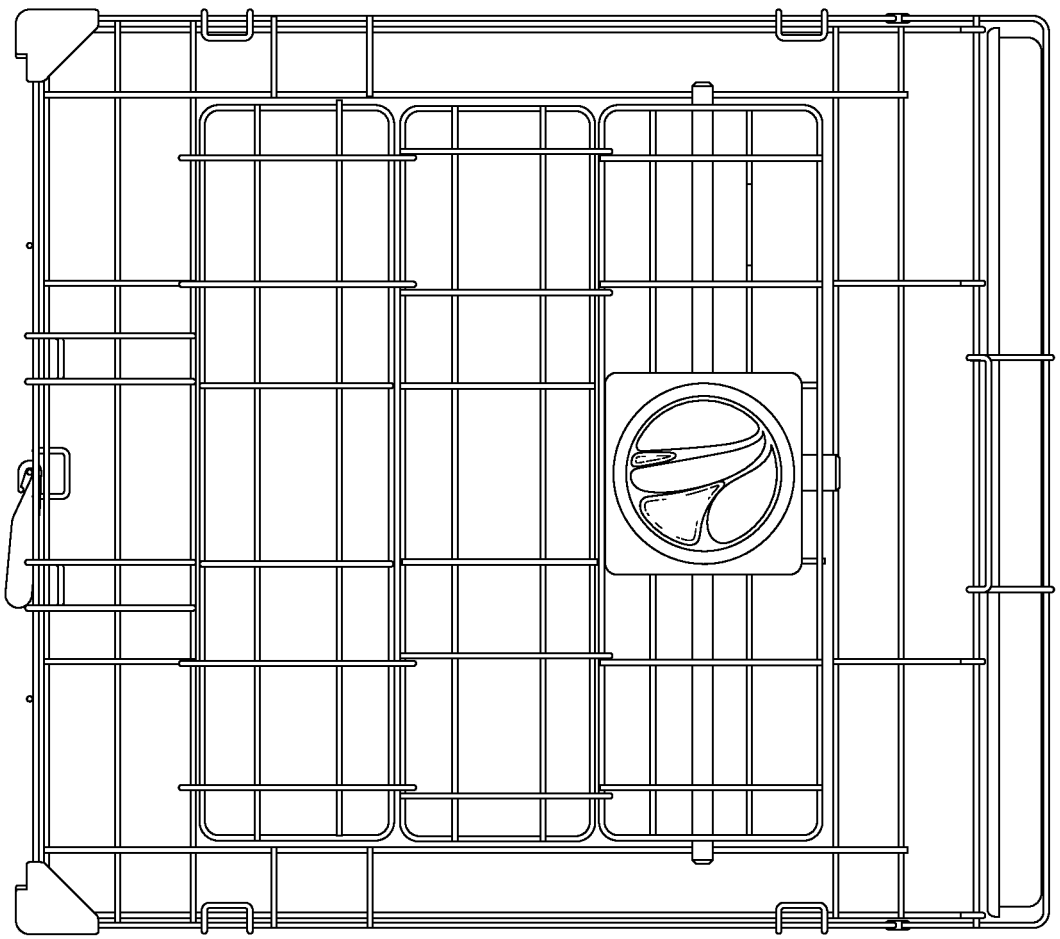
FIG. 19A, FIG. 19B, and FIG. 19C illustrate front and side views of an equivalent variation of big-dog-accommodating triple-hinged multi-function-shelf-trunk-platform-and-door system, having three rings attached to the top panel of the big-dog-accommodating triple-hinged multi-function-shelf-trunk-platform-and-door pet crate.
Figure 19B:
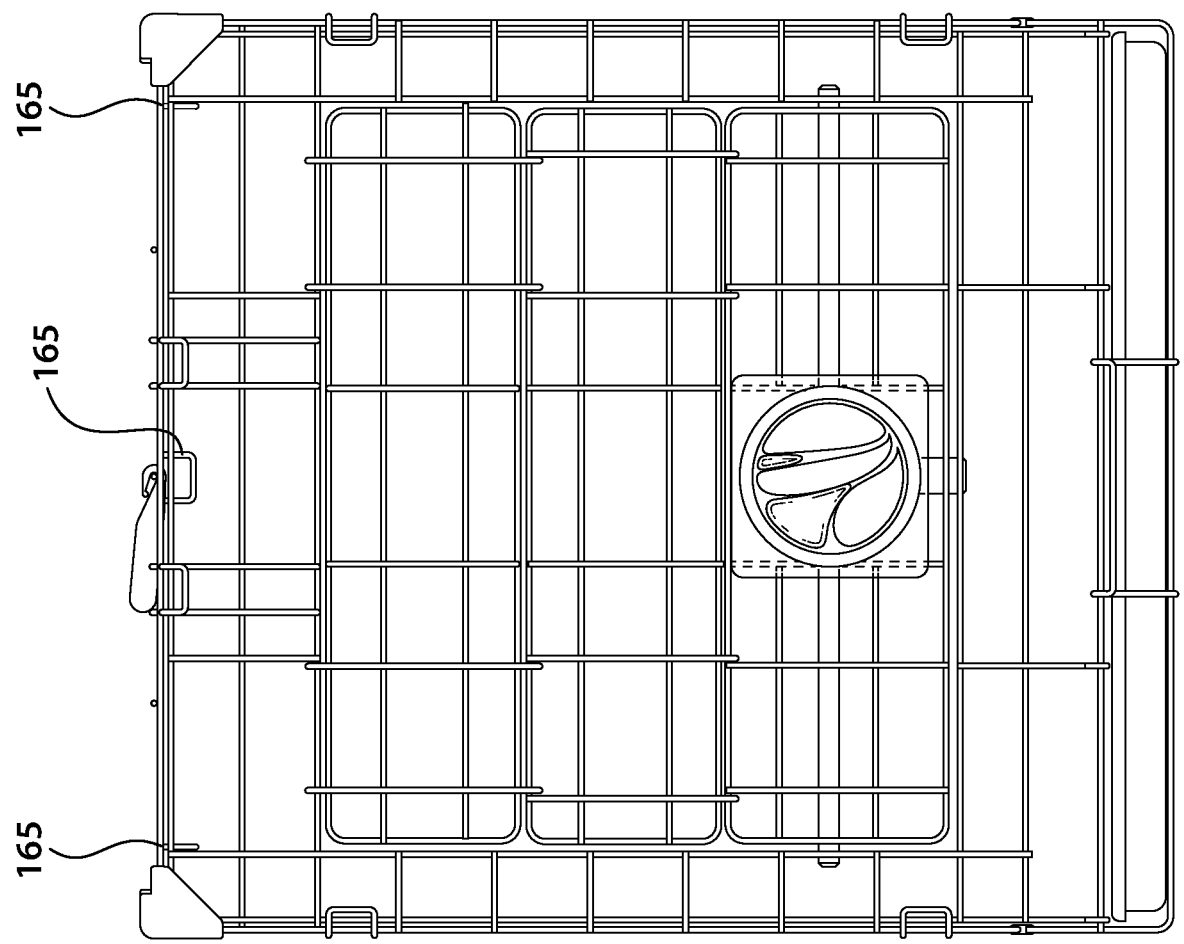
Figure 19C:
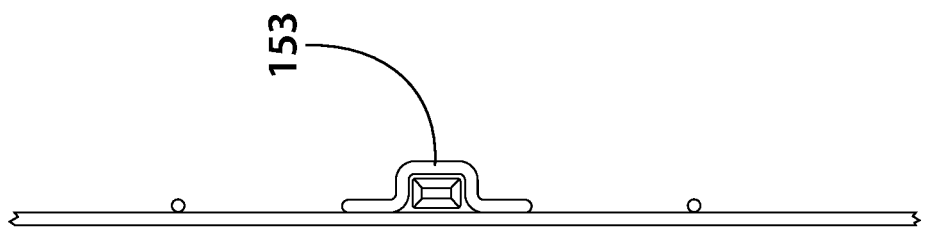
Figure 20:
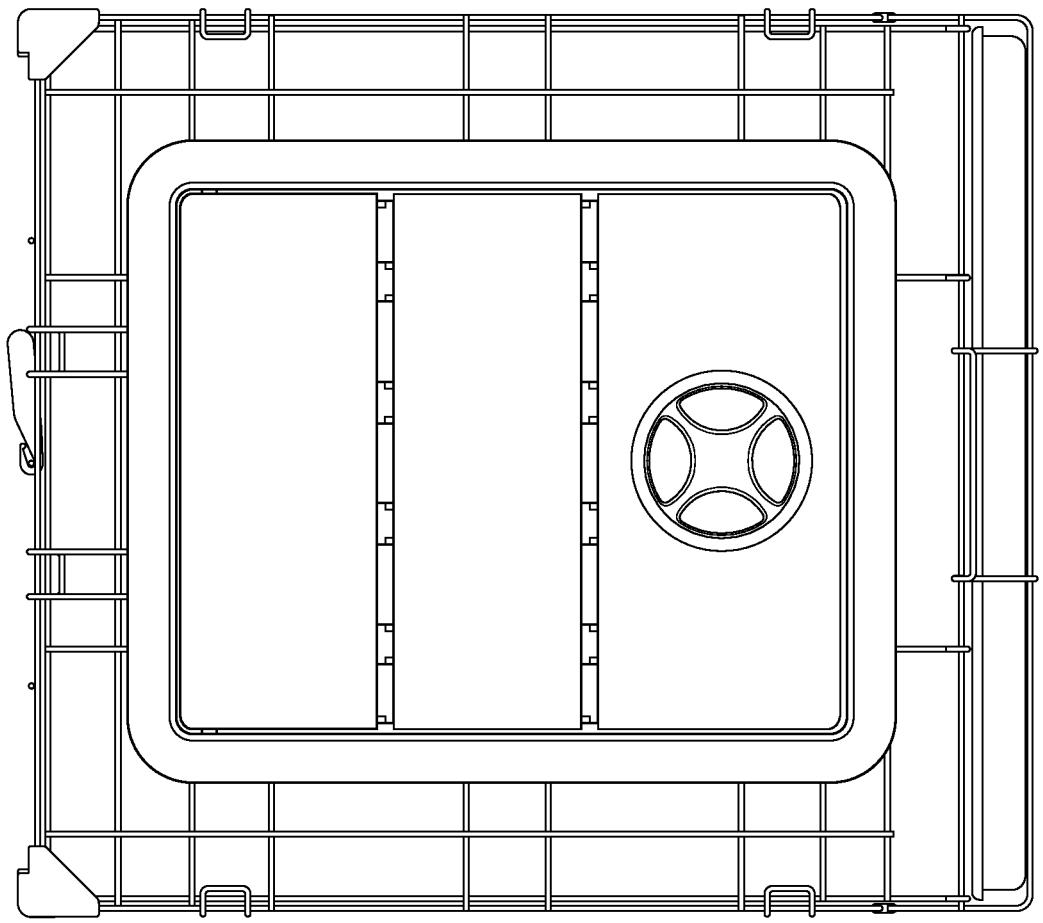
FIG. 20 illustrates a front view of an equivalent variation of big-dog-accommodating triple-hinged multi-function-shelf-trunk-platform-and-door system.
Figure 21:
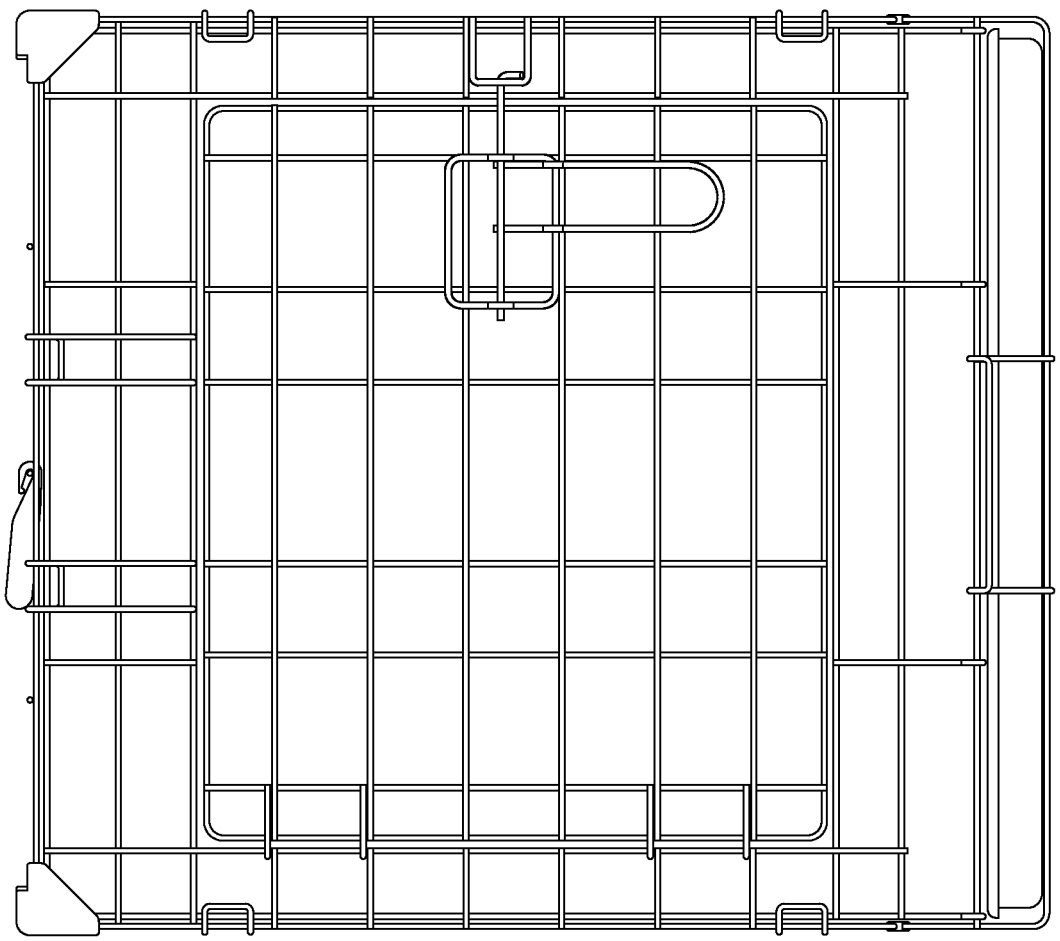
FIG. 21 illustrates a rear view of the big-dog-accommodating triple-hinged multi-function-shelf-trunk-platform-and-door pet crate, further comprising a wire door on rear panel.
Figure 22B:
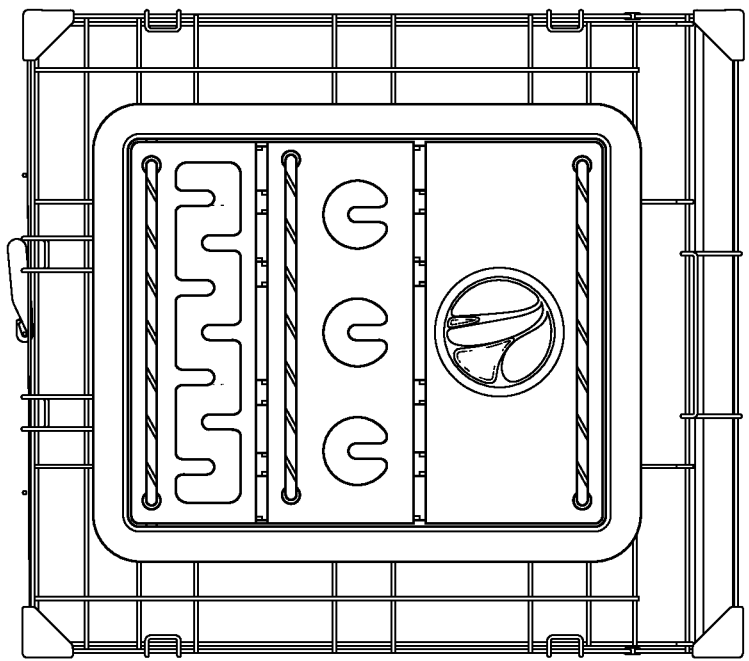
FIG. 22A and FIG. 22B illustrate front views of equivalent variations of big-dog-accommodating triple-hinged multi-function-shelf-trunk-platform-and-door system. The equivalent variations can further comprise bungee cords and hooks.
Figure 22A:
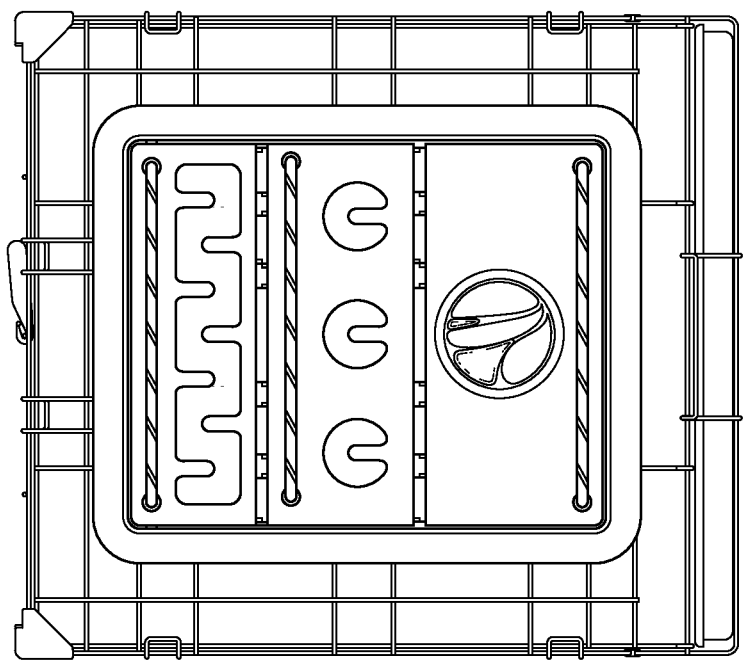
Figure 23:
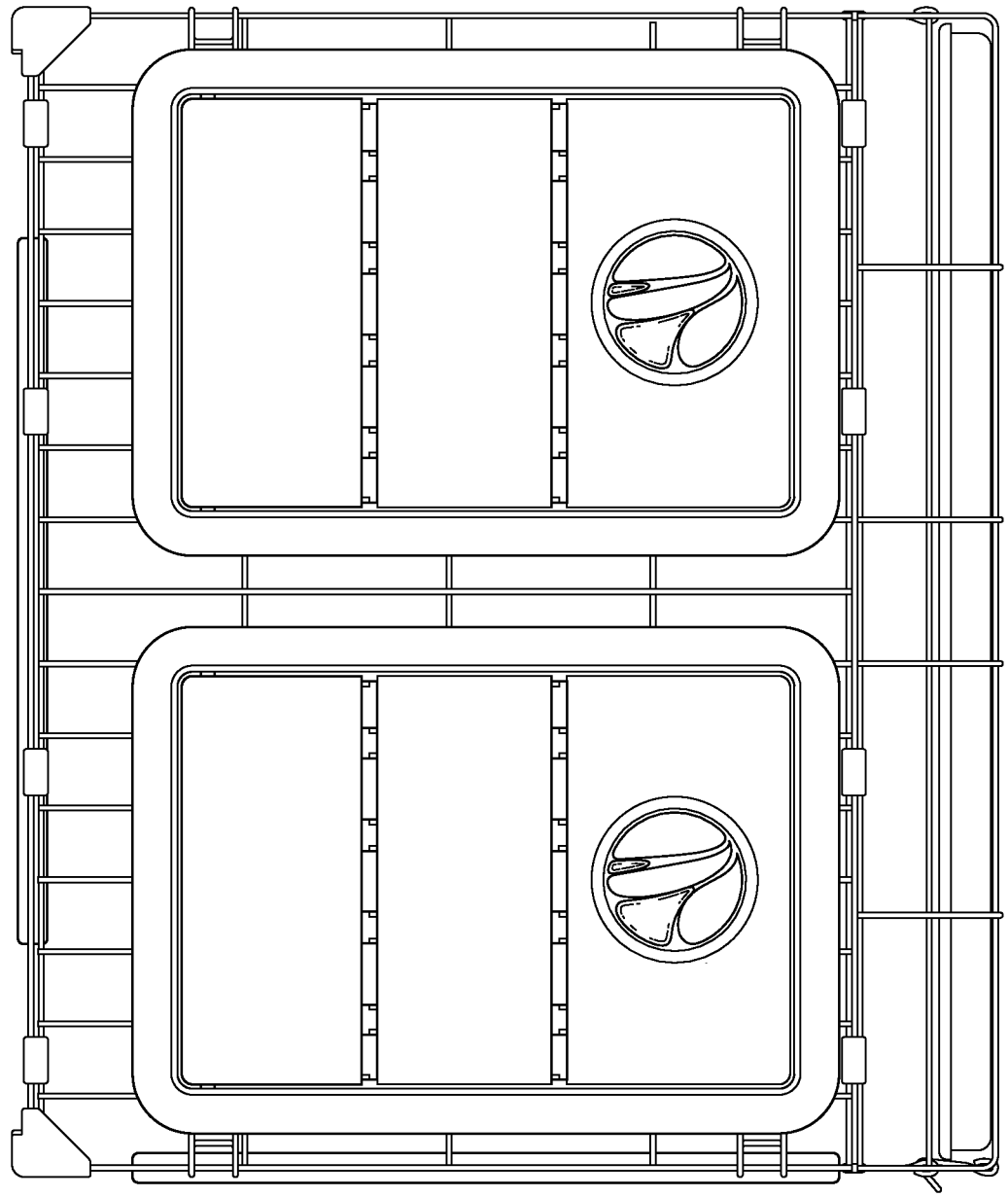
FIG. 23 illustrates a side view of the big-dog-accommodating triple-hinged multi-function-shelf-trunk-platform-and-door pet crate, further, comprising at least one additional big-dog-accommodating triple-hinged multi-function-shelf-trunk-platform-and-door system attached to top, side, and/or rear panels thereof, respectively.

Any component of the big-dog-accommodating triple-hinged multi-function-shelf-trunk-platform-and-door pet crate can have any shape and size. Any component of the big-dog-accommodating triple-hinged multi-function-shelf-trunk-platform-and-door pet crate can be made of wood, wood composite, plastic, plastic composite, metal, metal composite, wire, chain link, mesh, the like, the equivalent, or a combination of at least two of the above-mentioned materials. The big-dog-accommodating triple-hinged multi-function-shelf-trunk-platform-and-door pet crate can have four gussets on top panel 102*a* and four gussets on bottom panel 102*b* or no gussets. The big-dog-accommodating triple-hinged multi-function-shelf-trunk-platform-and-door pet crate can have at least one multi-function big-dog-accommodating triple-hinged multi-function-shelf-trunk-platform-and-door system 123 disposed at any location(s) thereon. For example, the big-dog-accommodating triple-hinged multi-function-shelf-trunk-platform-and-door pet crate can have at least one multi-function big-dog-accommodating triple-hinged multi-function-shelf-trunk-platform-and-door system 123 attached to top panel 102*a*, bottom panel 102*b*, left panel 102*c*, right panel 102*d*, front panel 102*e*, and/or rear panel 102*f,* respectively. For example, the big-dog-accommodating triple-hinged multi-function-shelf-trunk-platform-and-door pet crate, further, can comprise at least one wire door with at least one wire-door lock attached to top panel 102*a*, bottom panel 102*b*, left panel 102*c*, right panel 102*d*, front panel 102*e*, and/or rear panel 102*f,* respectively. For example, the big-dog-accommodating triple-hinged multi-function-shelf-trunk-platform-and-door pet crate can comprise an additional magnet, which is equivalent to and replaces spring-loaded palm knob 132*b*. The additional magnet is attached to top panel 102*a* to pull door magnet 156 toward itself to lock multi-function big-dog-accommodating triple-hinged multi-function-shelf-trunk-platform-and-door system 123 to top panel 102*a*. The big-dog-accommodating triple-hinged multi-function-shelf-trunk-platform-and-door pet crate can have at least one wire door with at least one wire-door lock attached to top panel 102*a*, bottom panel 102*b*, left panel 102*c*, right panel 102*d*, front panel 102*e*, and/or rear panel 102*f,* respectively. The at least one wire door with at least one wire-door lock can replace the at least one multi-function big-dog-accommodating triple-hinged multi-function-shelf-trunk-platform-and-door system 123 of the big-dog-accommodating triple-hinged multi-function-shelf-trunk-platform-and-door pet crate. The big-dog-accommodating triple-hinged multi-function-shelf-trunk-platform-and-door pet crate can have a third magnet attached to top panel 102*a* for pulling door magnet 156 thereto to lock third multi-position shelf-trunk-platform-and-door panel 127*b* to top panel 102*a*. The third magnet is equivalent to and for replacing spring-loaded palm knob 132*b*. FIG. 18A illustrates an equivalent variation of multi-function platform-locking shock-absorbing gusset systems 112. The equivalent variation can be molded with or without curved gusset springs 115*a*, 115*b*, and 115*c*, vertical gusset spring 116, and/or horizontal gusset spring 117. FIG. 18B illustrates four platform-locking tabs 163*a*, 163*b*, 163*c*, and 163*d*, which are equivalent to and can replace the top four of platform-locking shock-absorbing gusset tab 118 of multi-function platform-locking shock-absorbing gusset systems 112, respectively. Platform-locking tabs 163*a*, 163*b*, 163*c*, and 163*d* can be cut into and are part of multi-function grooming platform system 119, and can be snap-locked on top panel 102*a* of the big-dog-accommodating triple-hinged multi-function-shelf-trunk-platform-and-door pet crate, in the directions of arrows 164*a*, 164*b*, 164*c*, and 164*d*, respectively, to lock multi-function grooming platform system 119 on top of top panel 102*a*. FIGS. 19A, 19B, and 19C illustrate an equivalent variation of multi-function big-dog-accommodating triple-hinged multi-function-shelf-trunk-platform-and-door system 123. The equivalent variation has rings 165 attached to top panel 102*a*. Rings 165 replace spring-loaded palm knob 132*b* and is for locking multi-function big-dog-accommodating triple-hinged multi-function-shelf-trunk-platform-and-door system 123 to top panel 102*a*. FIG. 20 illustrates an equivalent variation of multi-function big-dog-accommodating triple-hinged multi-function-shelf-trunk-platform-and-door system 123. FIG. 21 illustrates the big-dog-accommodating triple-hinged multi-function-shelf-trunk-platform-and-door pet crate, further comprising a wire door on rear panel 102*f*. FIG. 22A and FIG. 22B illustrate equivalent variations of multi-function big-dog-accommodating triple-hinged multi-function-shelf-trunk-platform-and-door system 123 and multi-function platform-locking shock-absorbing gusset systems 112. The equivalent variations can further comprise bungee cords attached thereon and hooks molded thereon for holding cleaning accessories and grooming accessories. FIG. 23 illustrates the big-dog-accommodating triple-hinged multi-function-shelf-trunk-platform-and-door pet crate, further, comprising at least one additional multi-function big-dog-accommodating triple-hinged multi-function-shelf-trunk-platform-and-door system attached to top, side, and/or rear panels 102a, 102d, and 102f thereof, respectively.

Major Advantages of the Invention

Figure 5A:
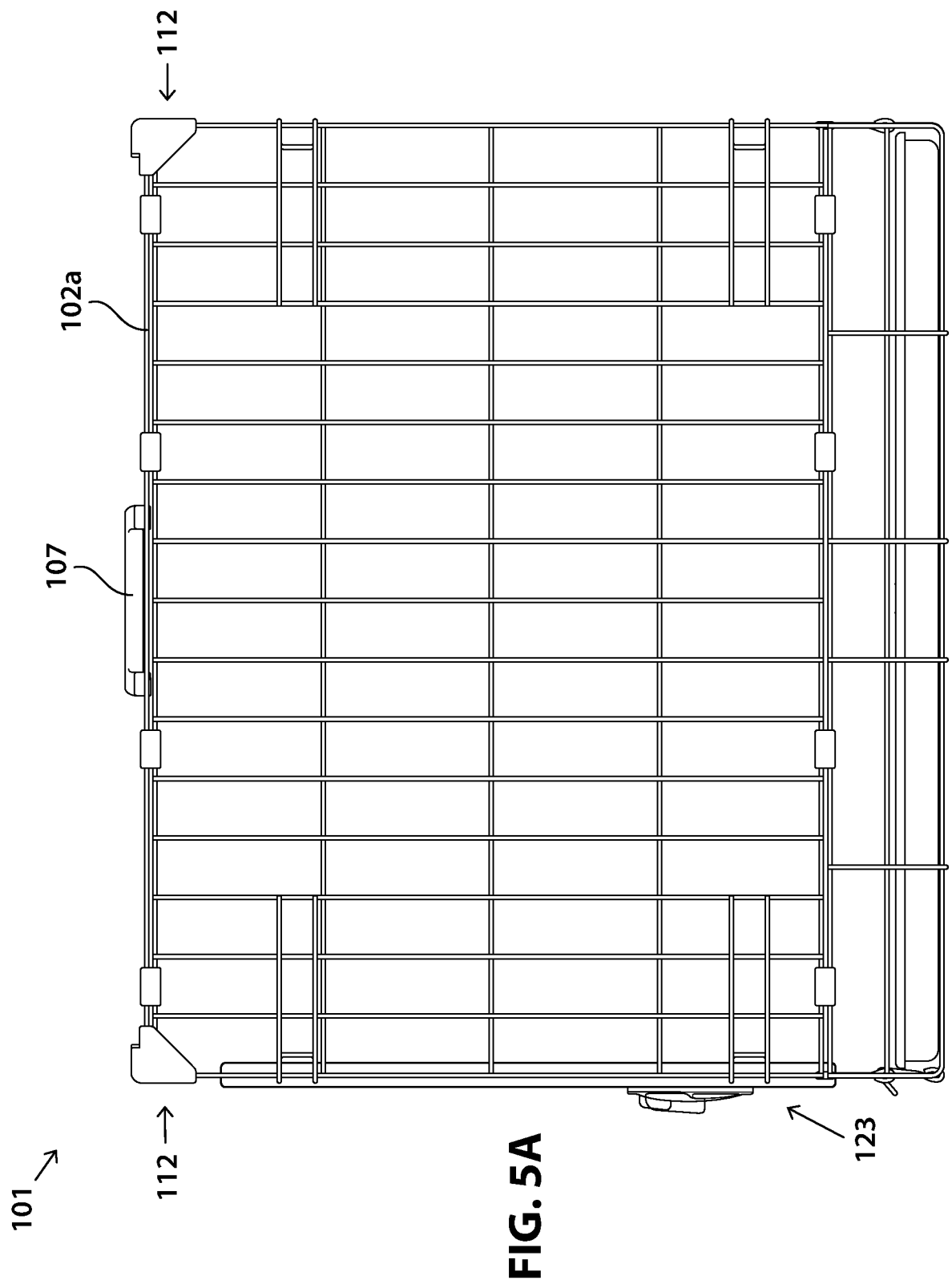
Figure 5B:
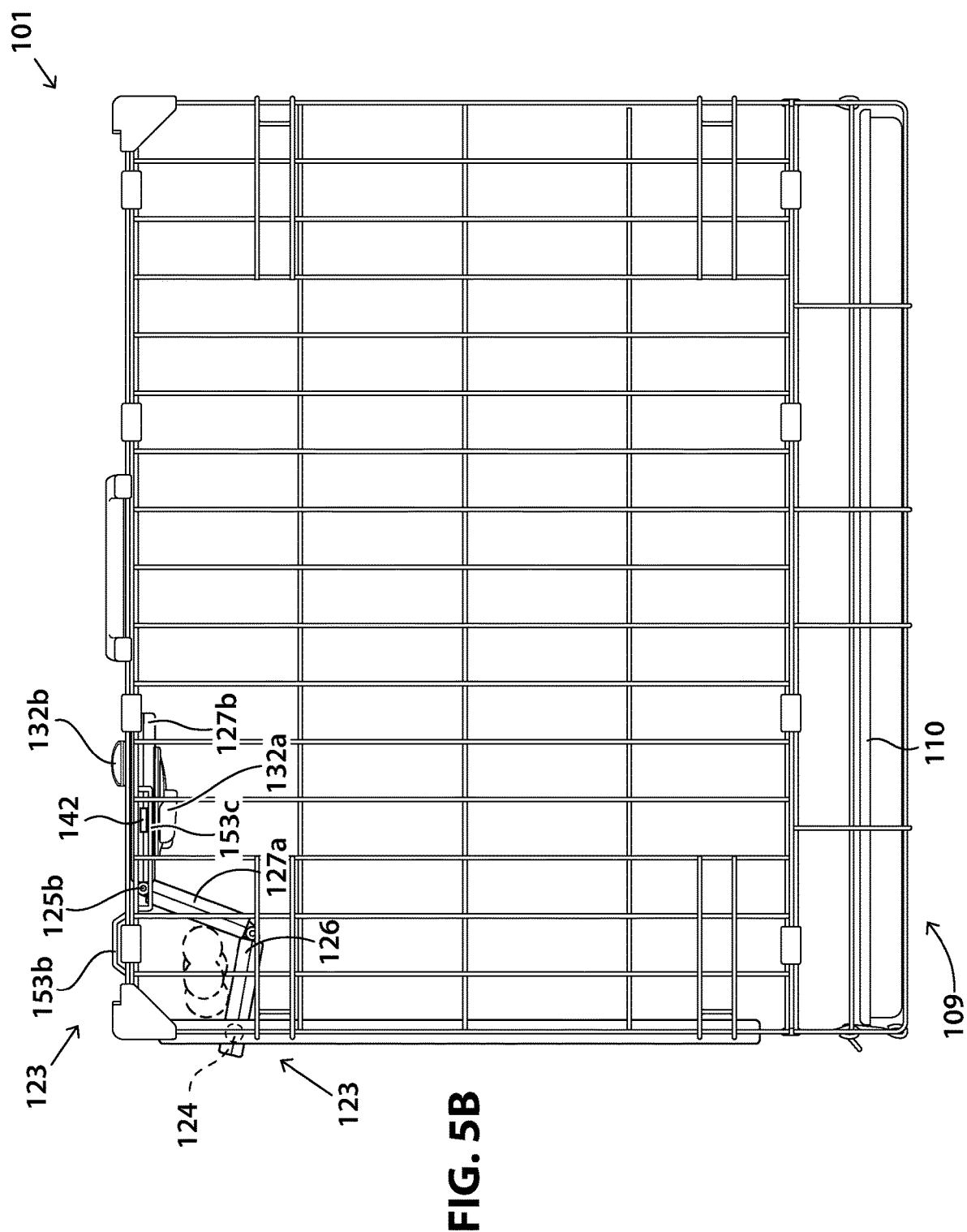
Figure 5C:
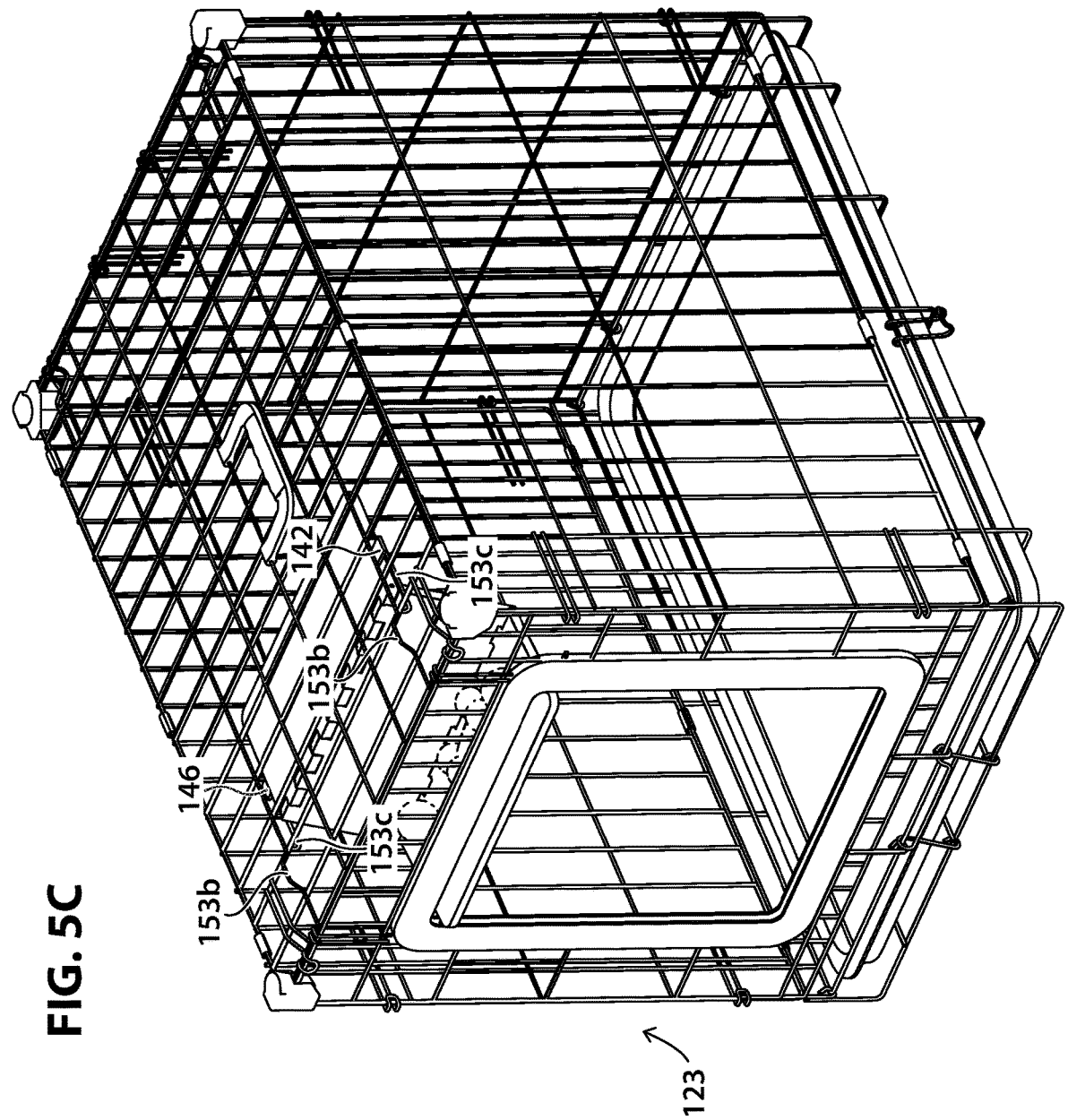
Figure 5E:
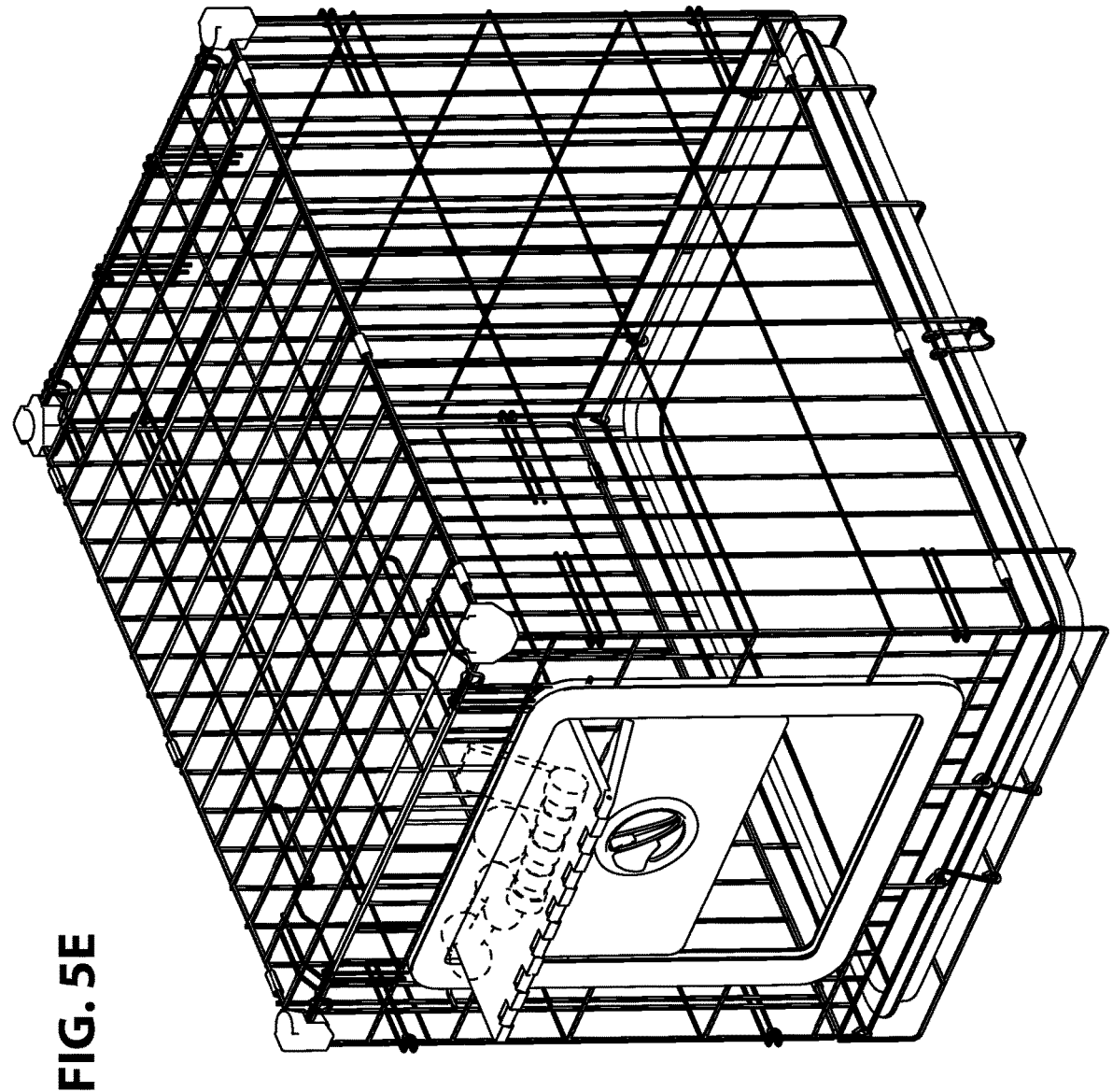
Figure 5F:
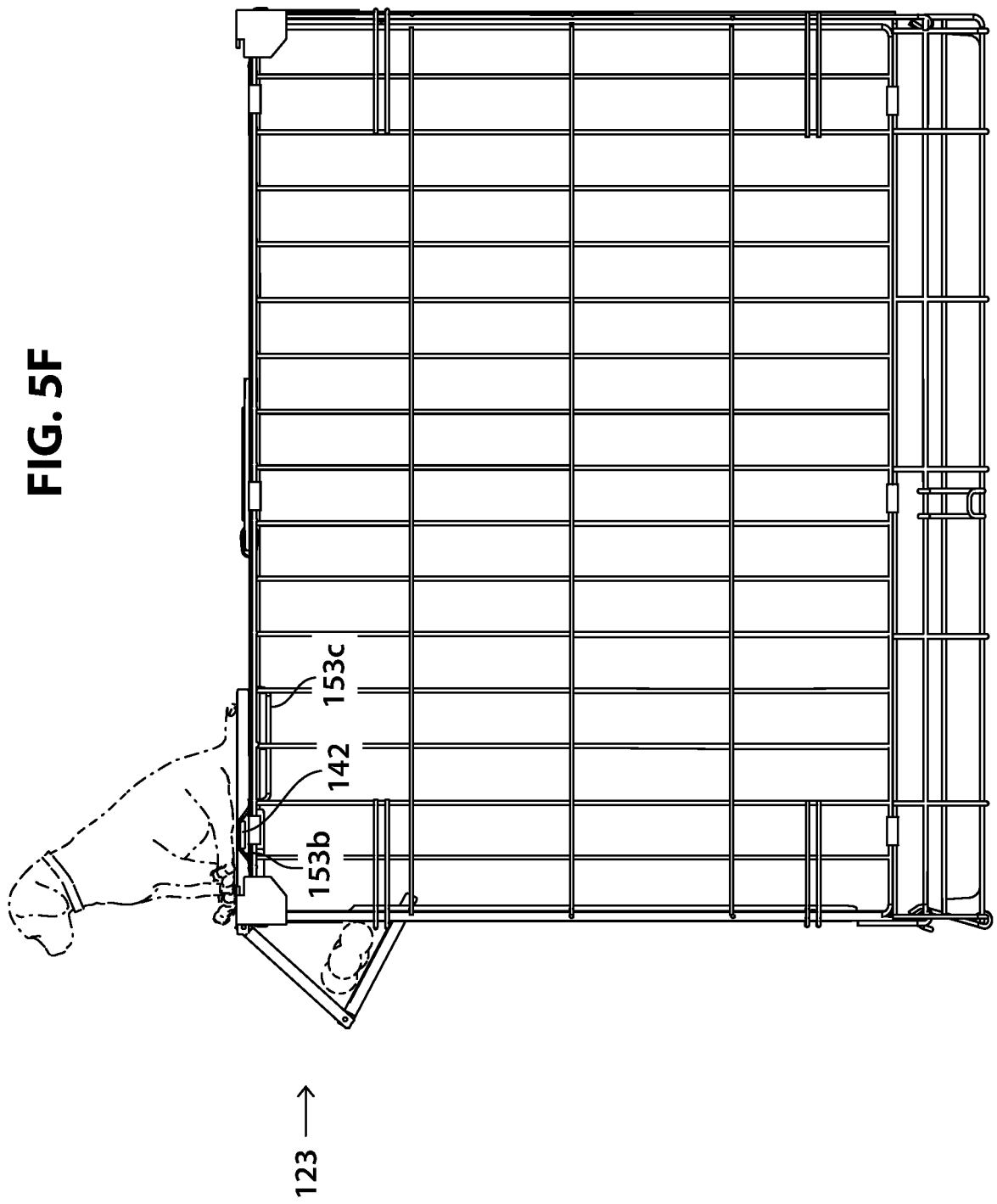
Figure 5G:
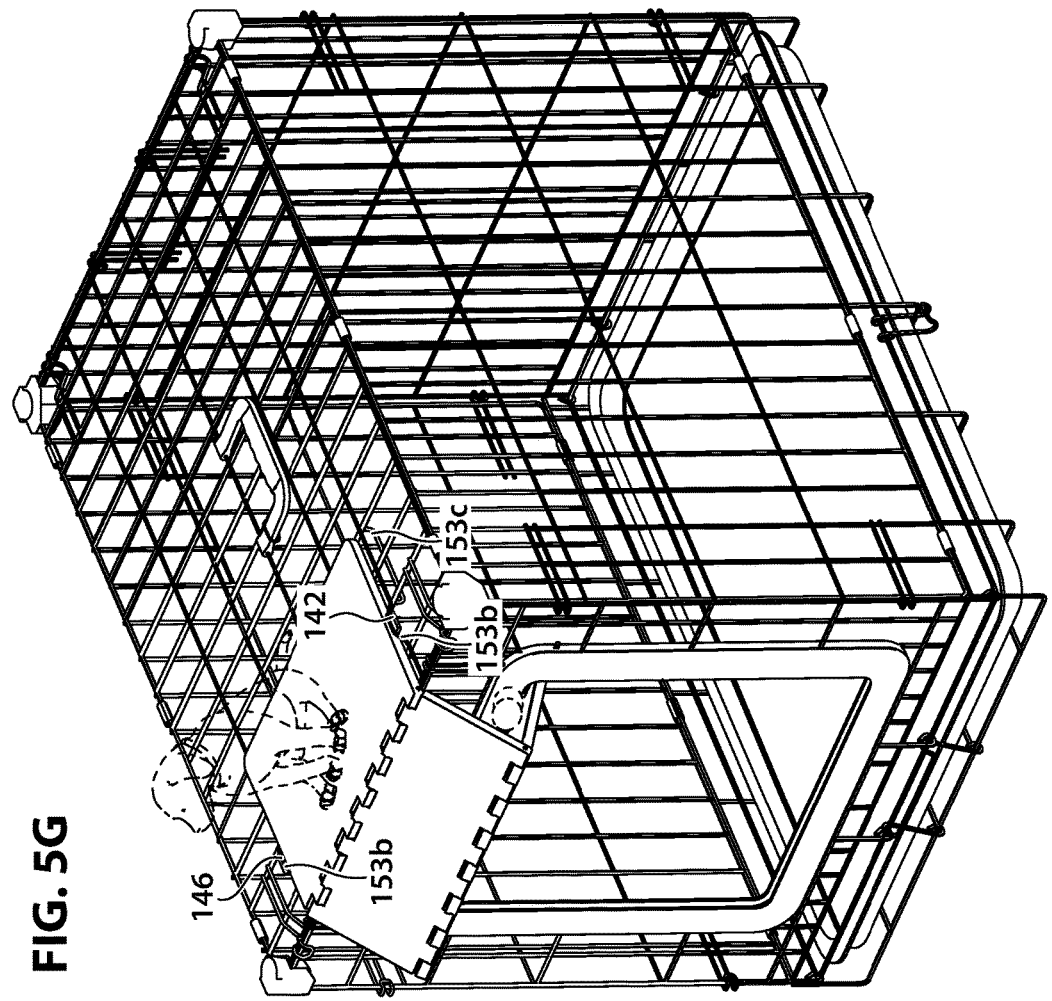
Figure 5H:
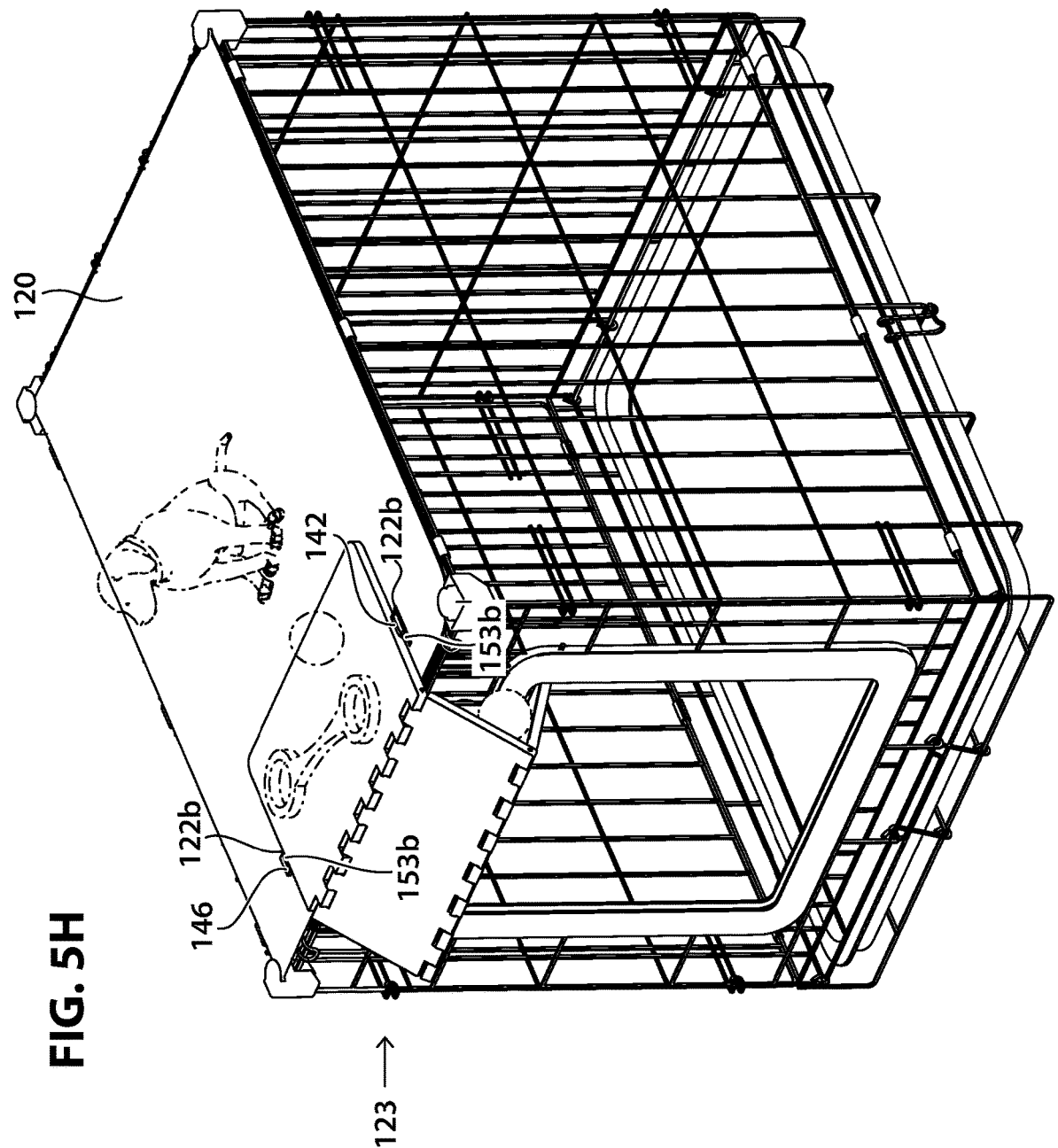
Figure 5J:
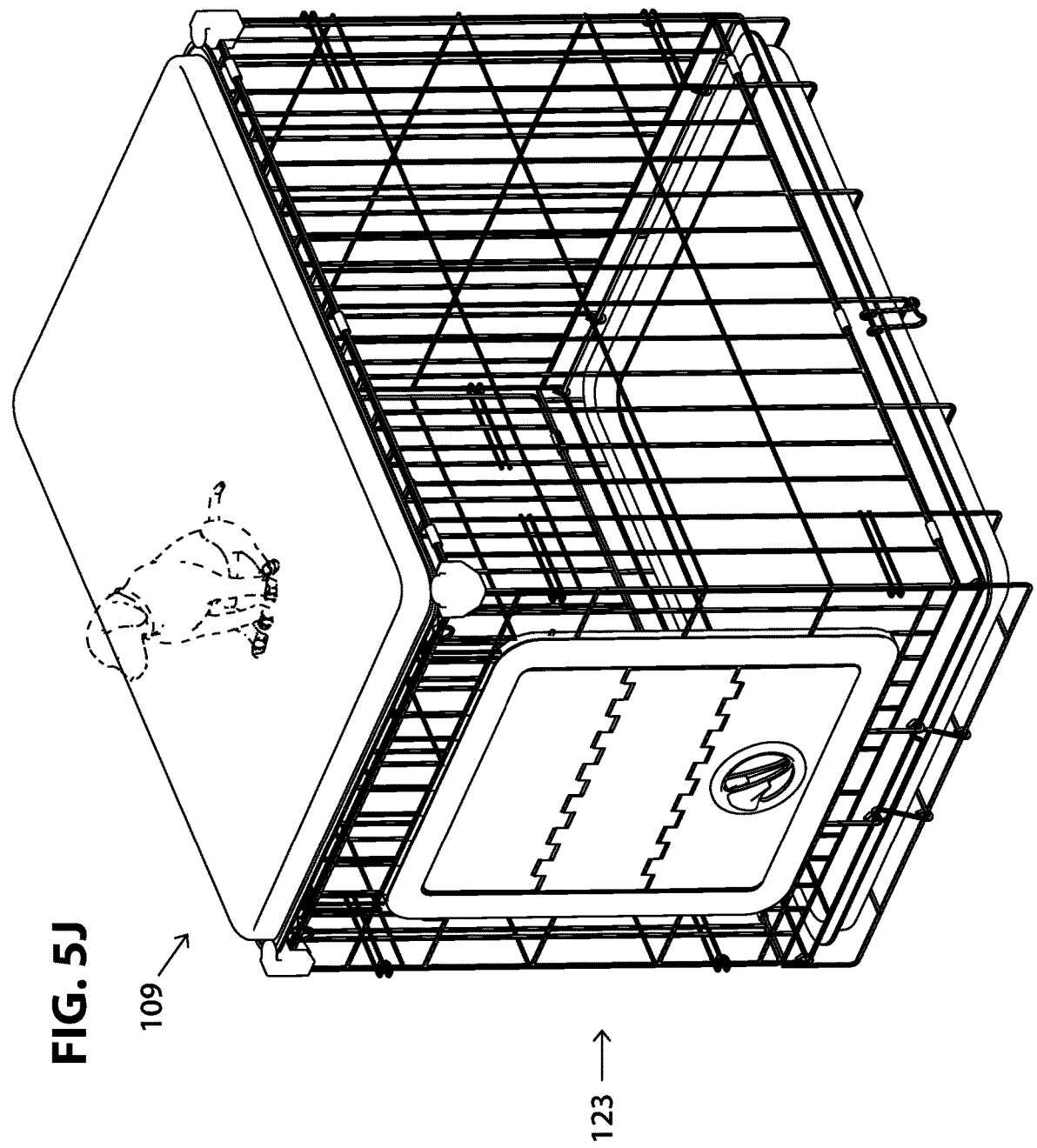
Figure 6:
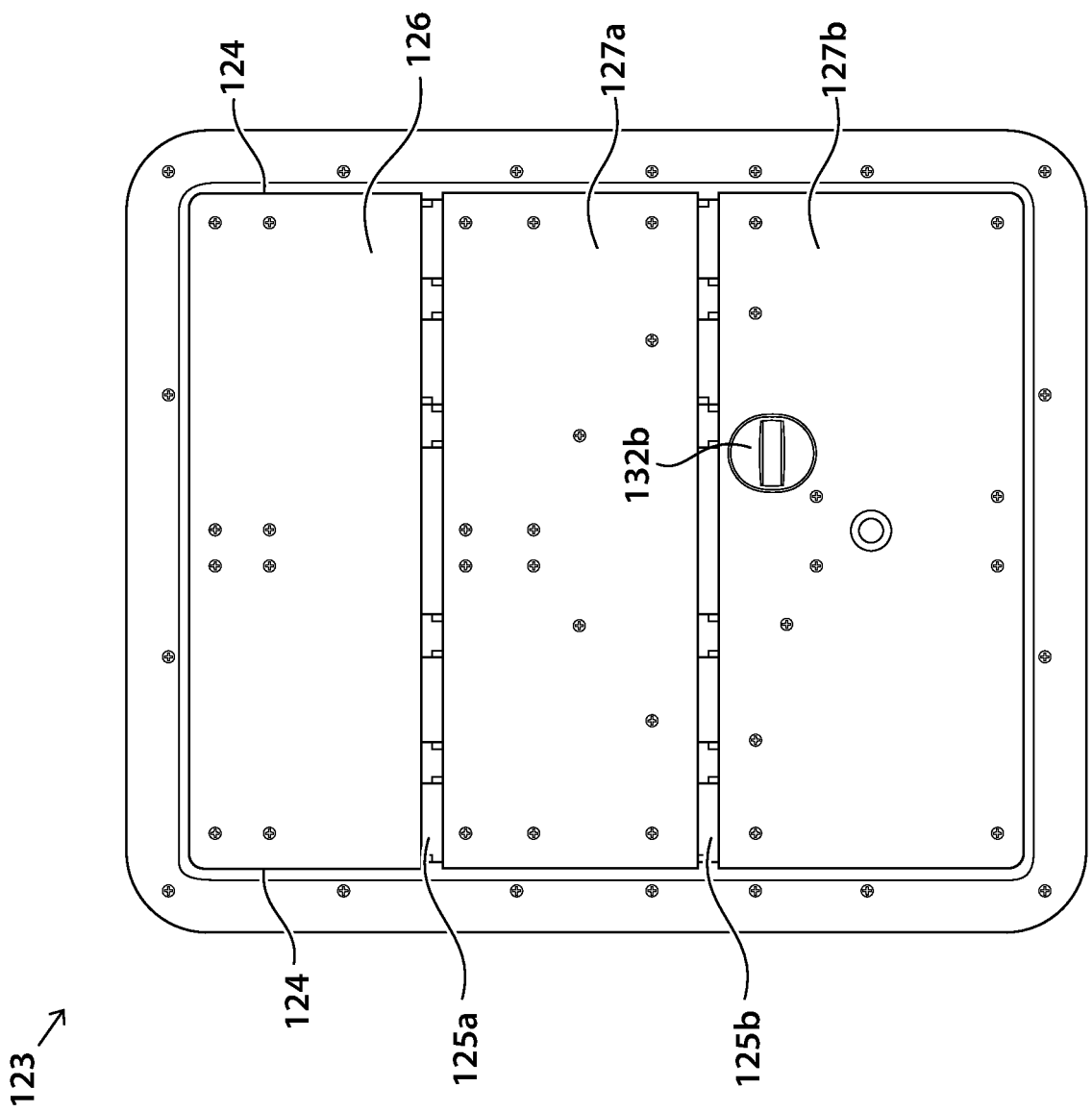
Figure 7A:
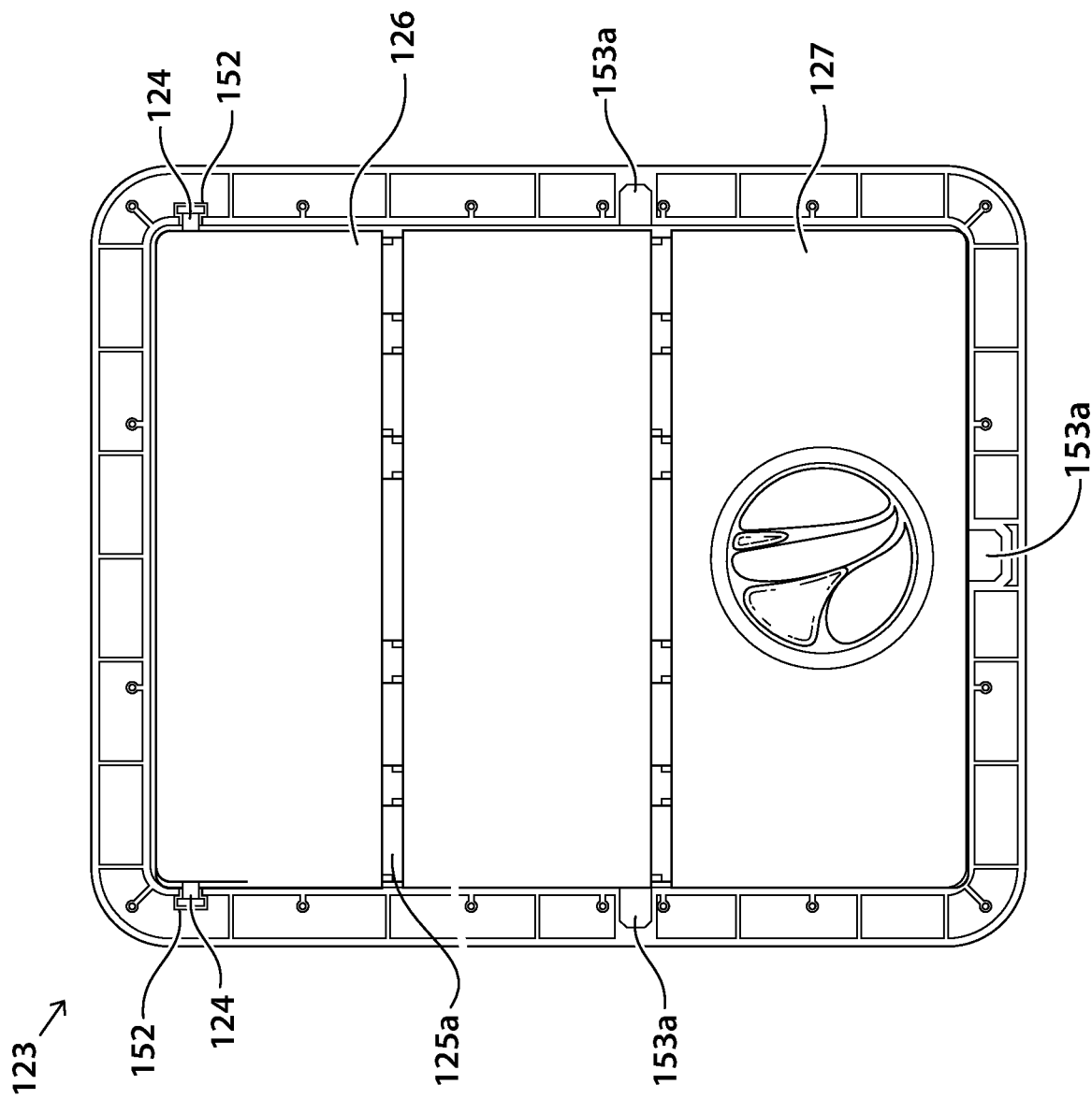
Figure 7B:
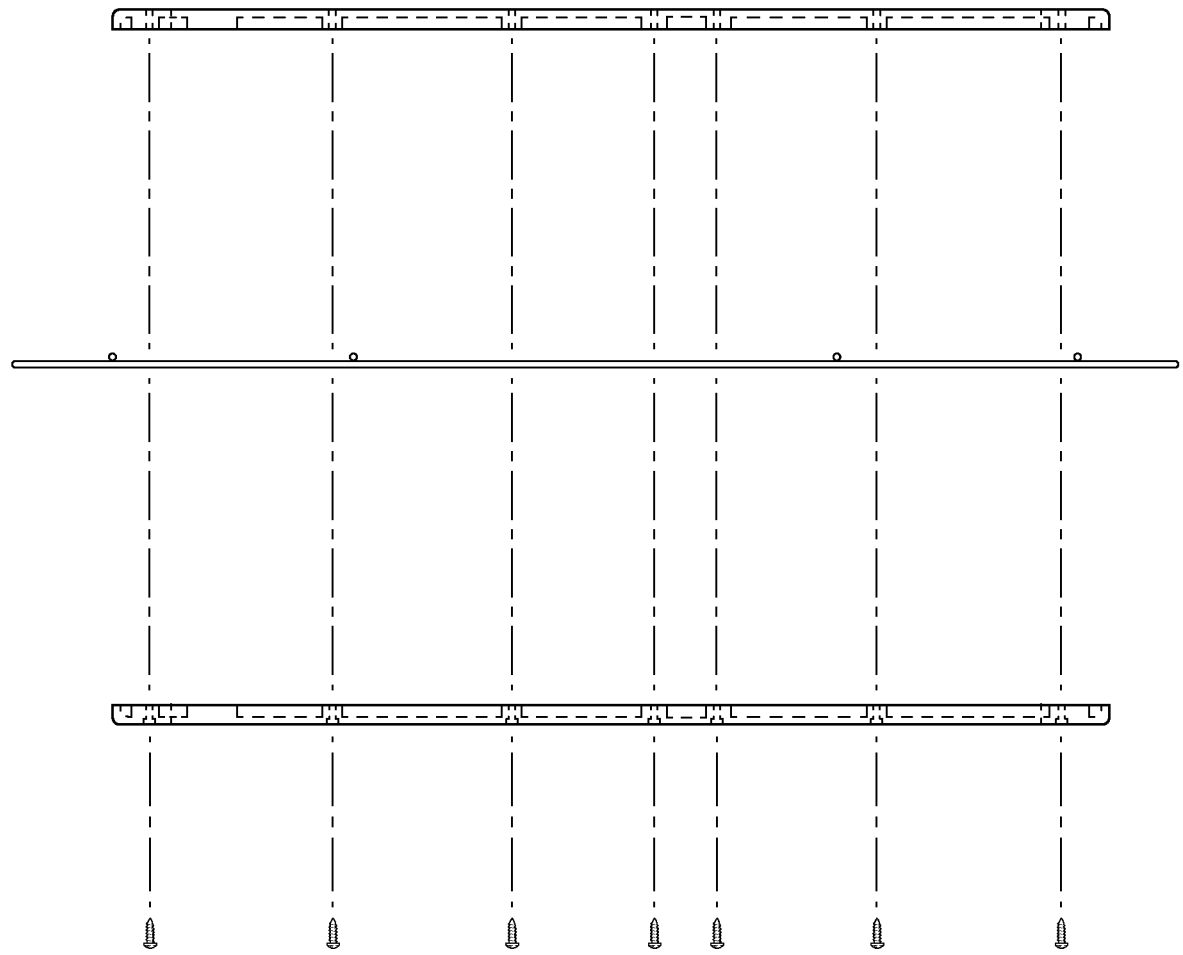
Figure 7C:
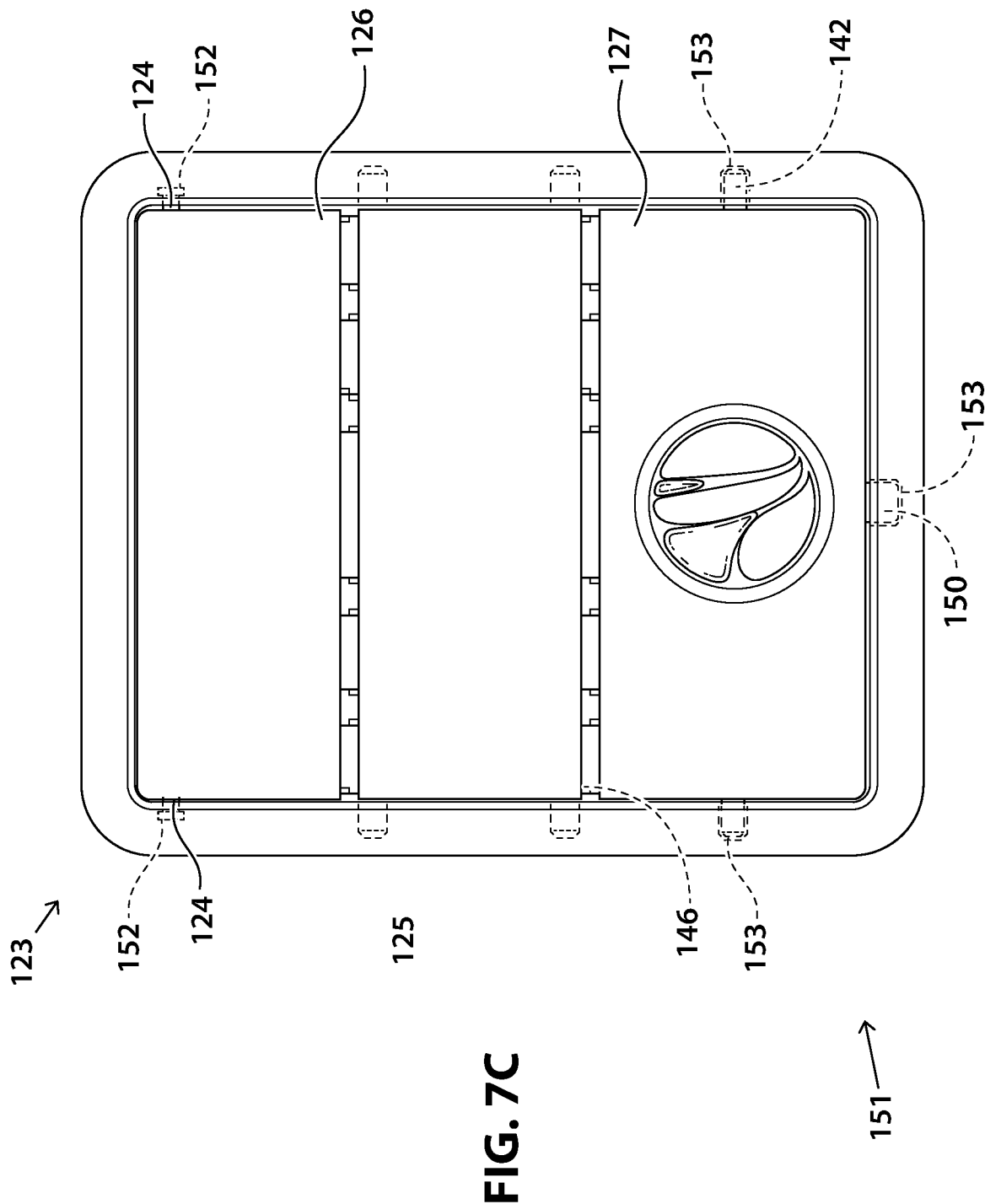
Figure 7F:
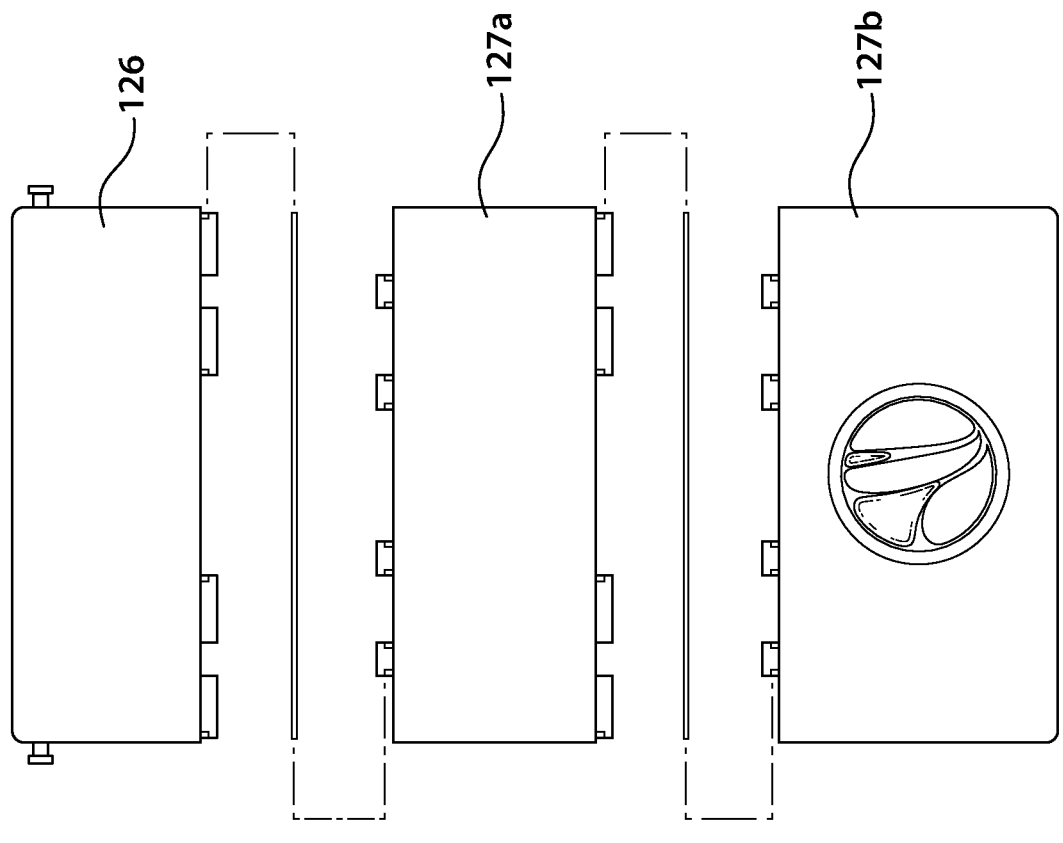
Figure 8A:
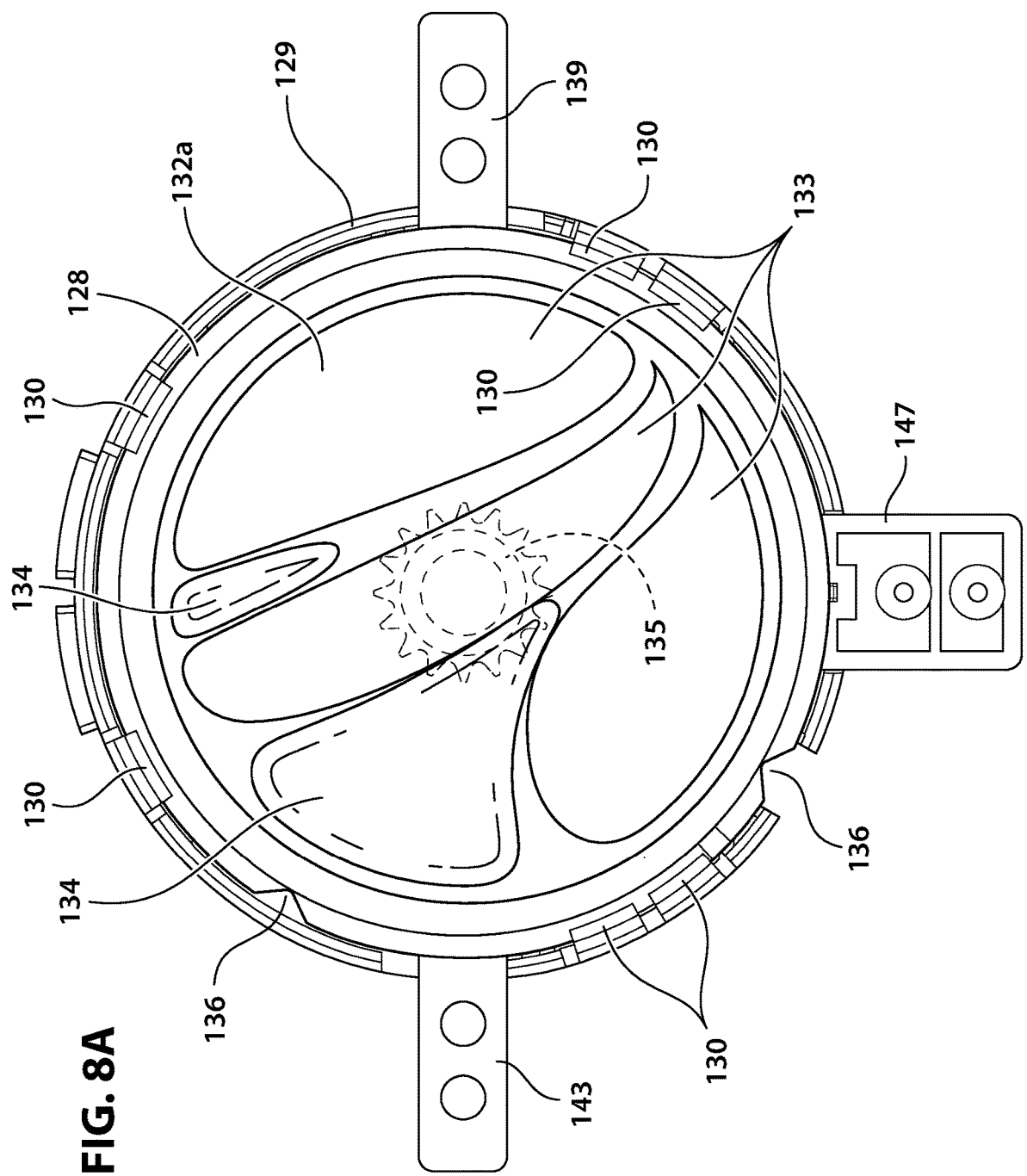
Figure 8C:
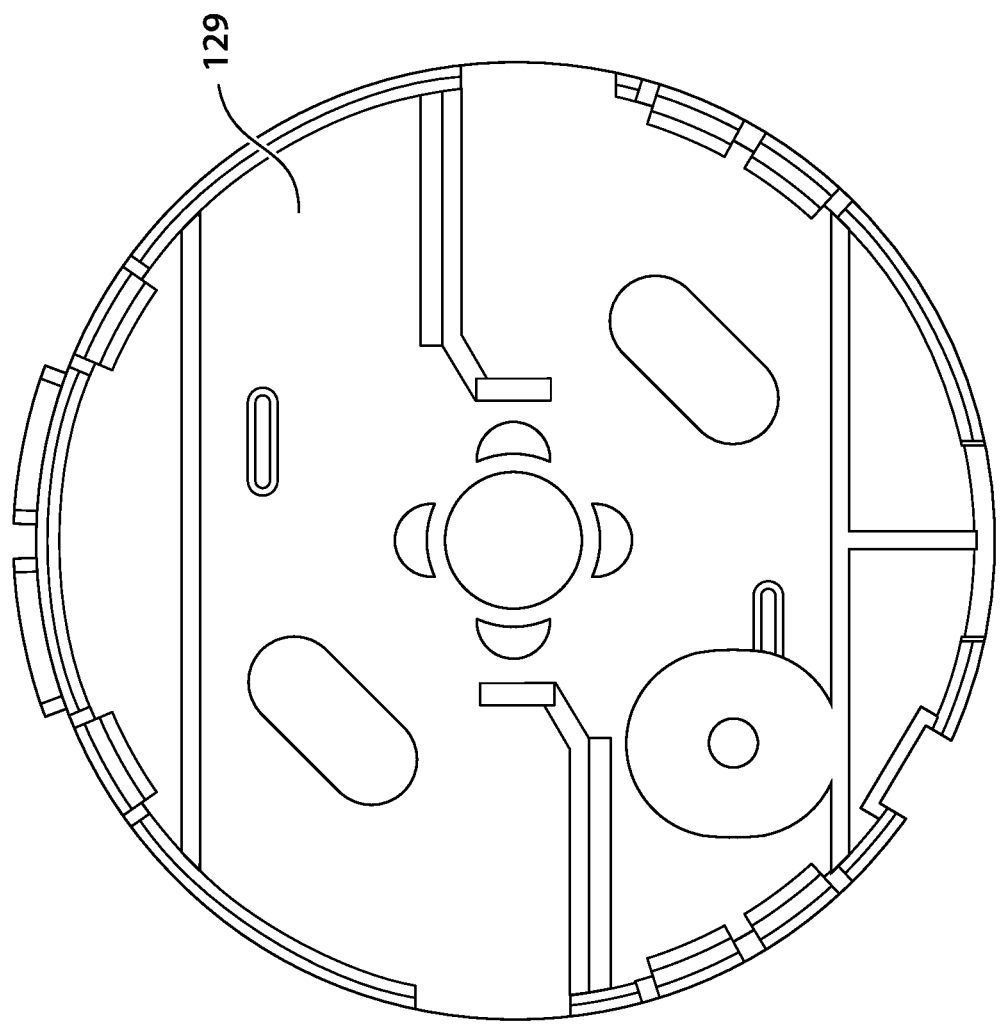
Figure 8F:
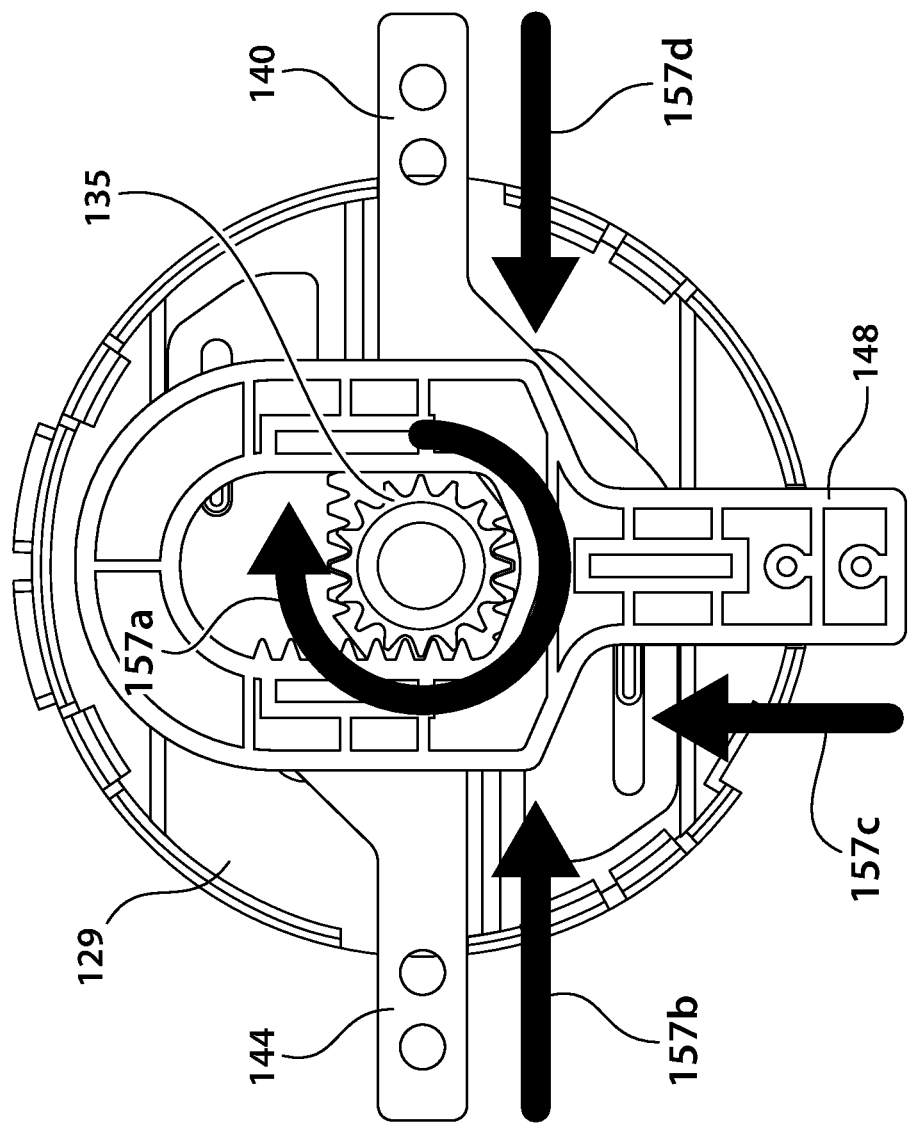
Figure 8G:
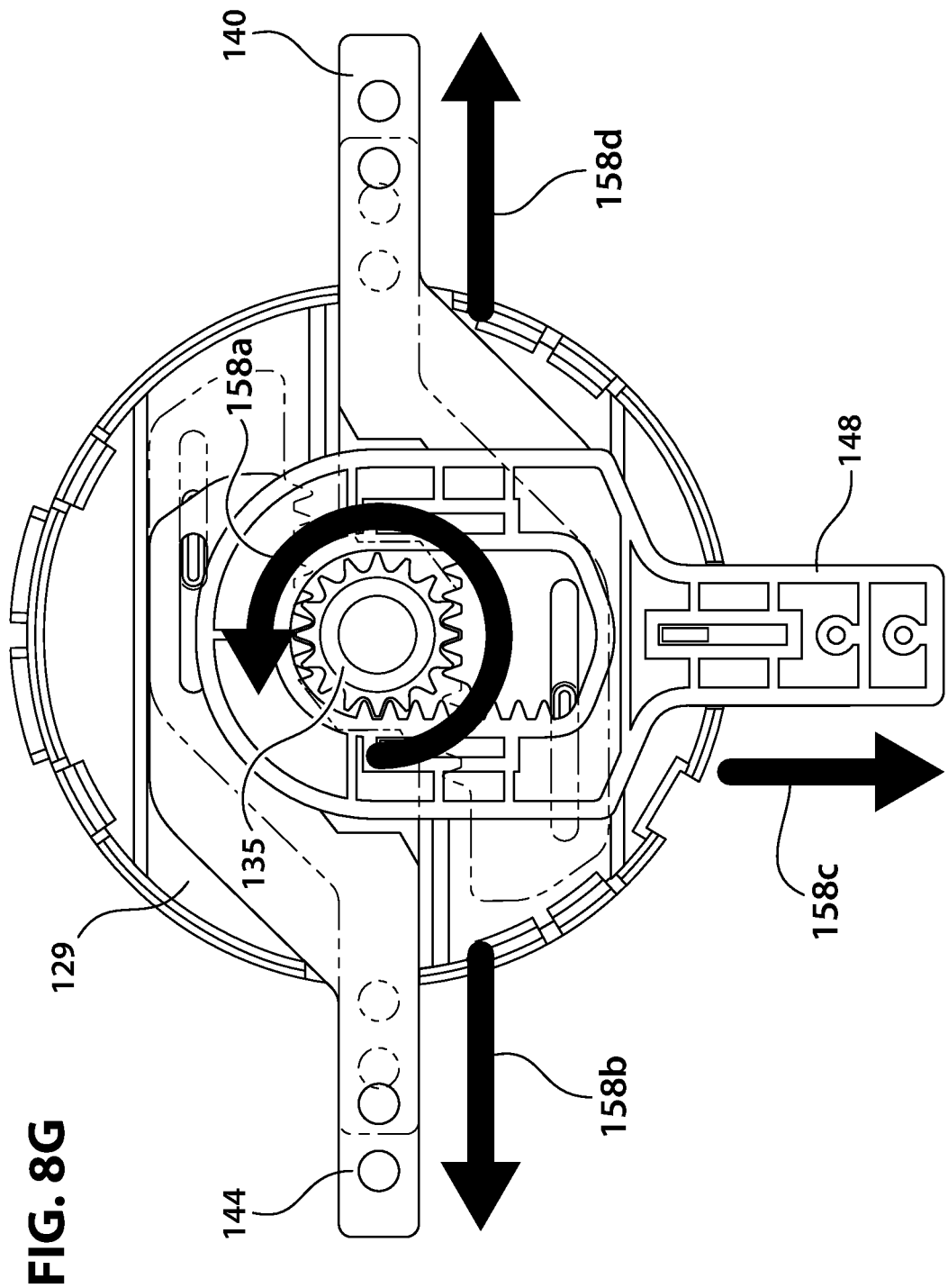
Figure 10A:
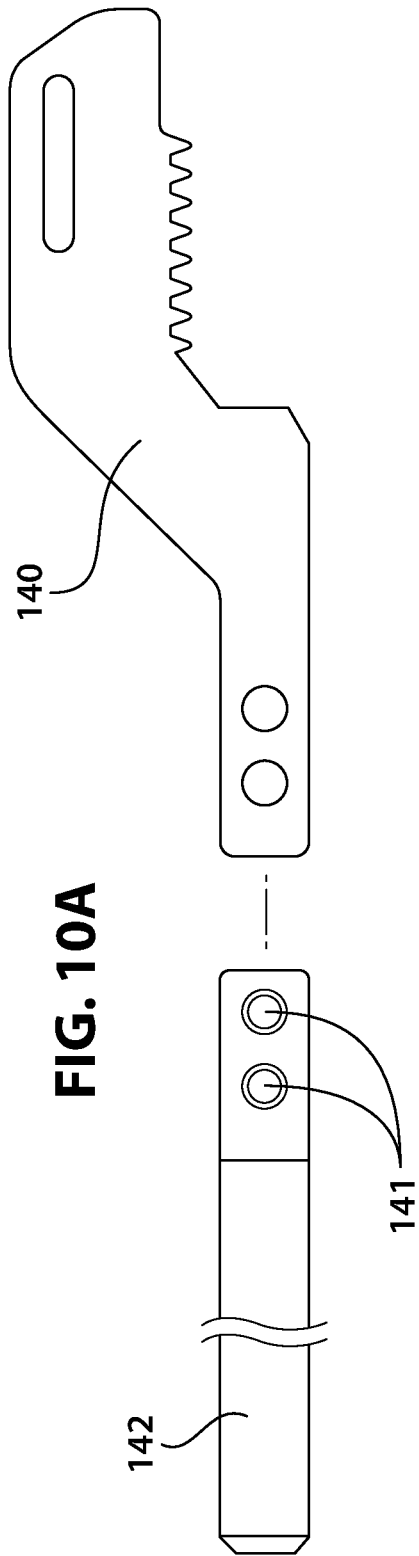
Figure 10B:
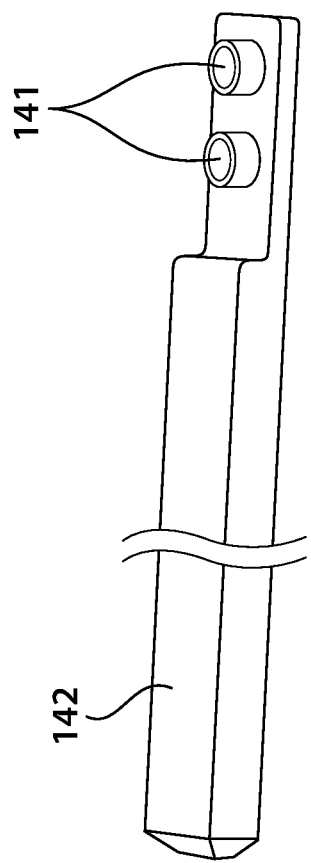
Figure 10C:
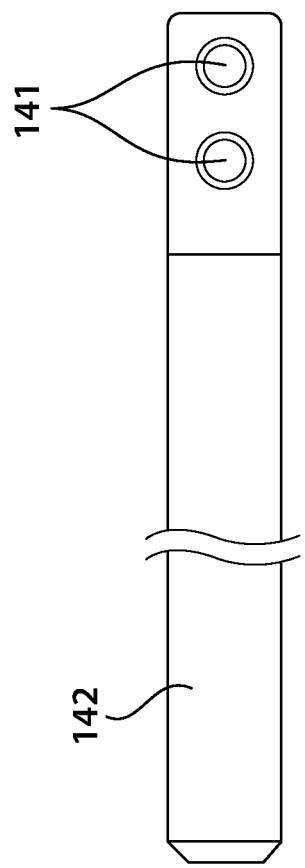
Figure 10D:
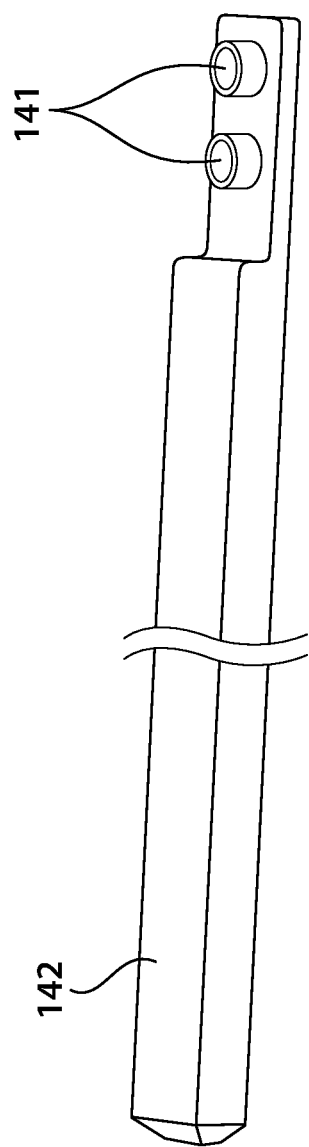
Figure 10E:
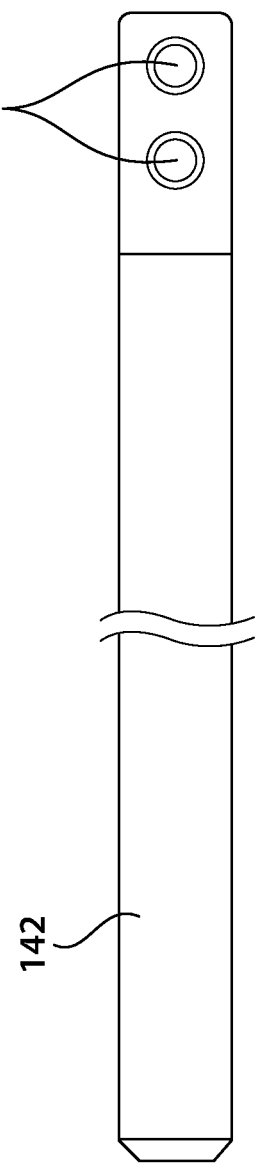
Figure 10F:
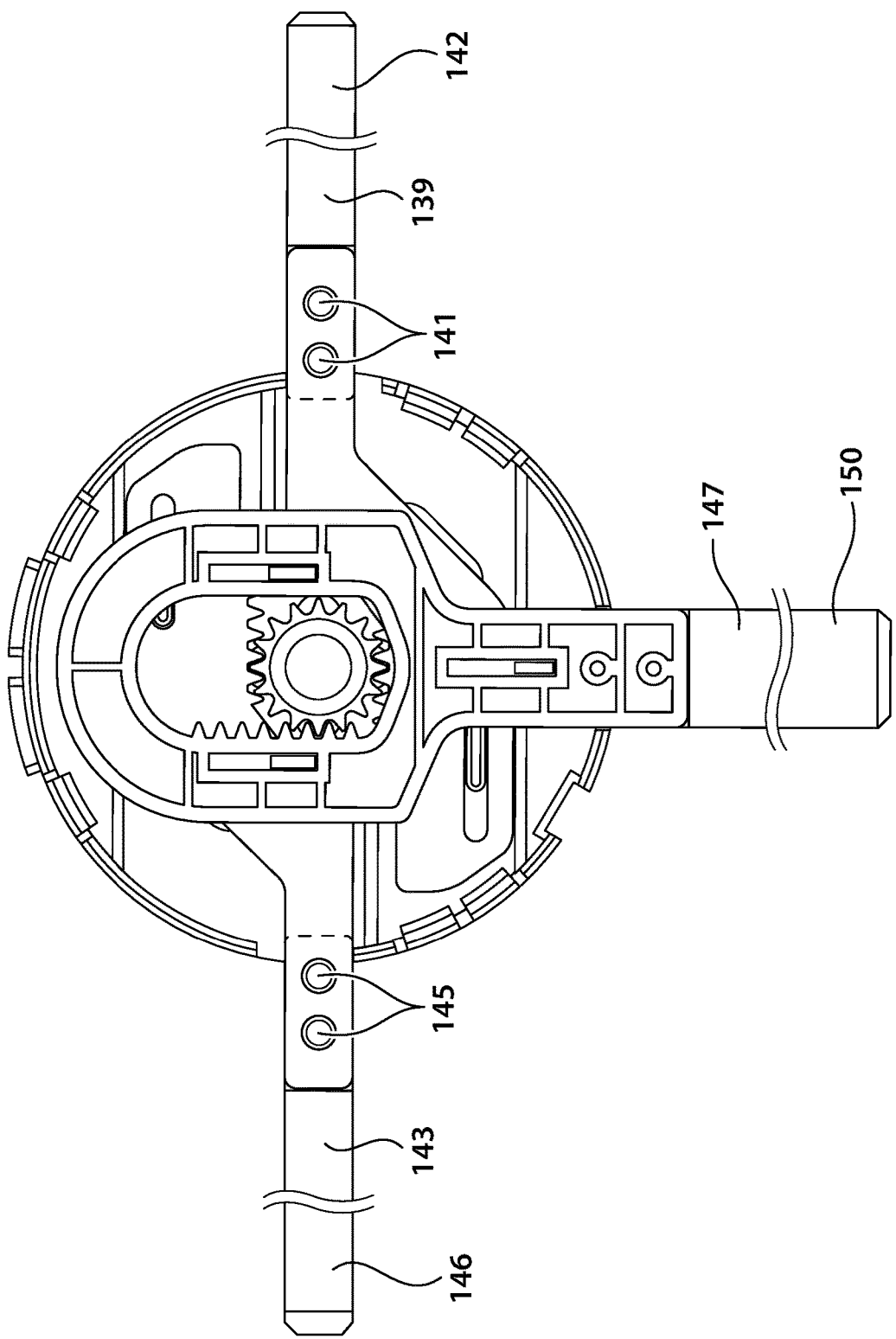
Figure 10H:
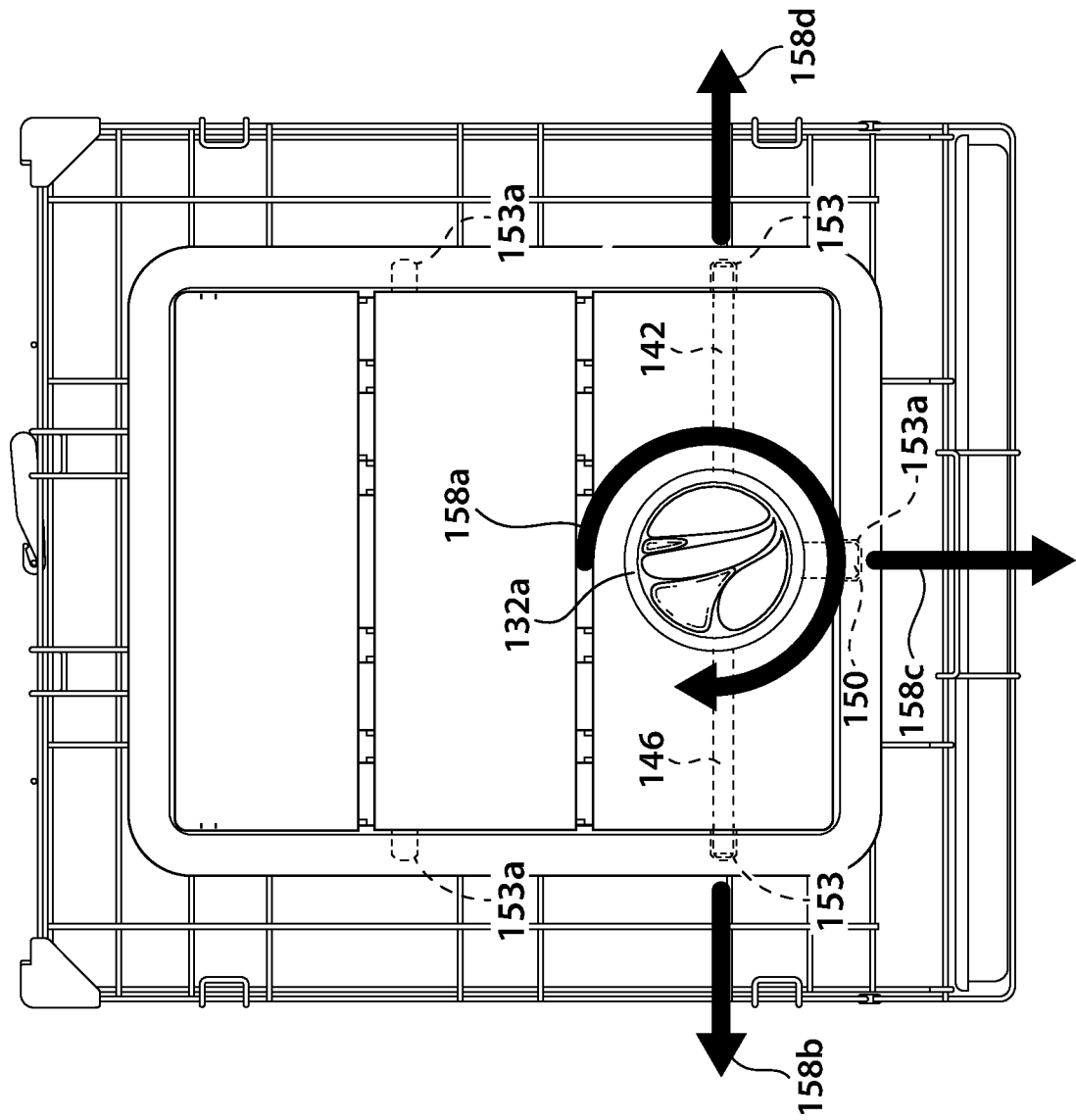
Figure 11A:
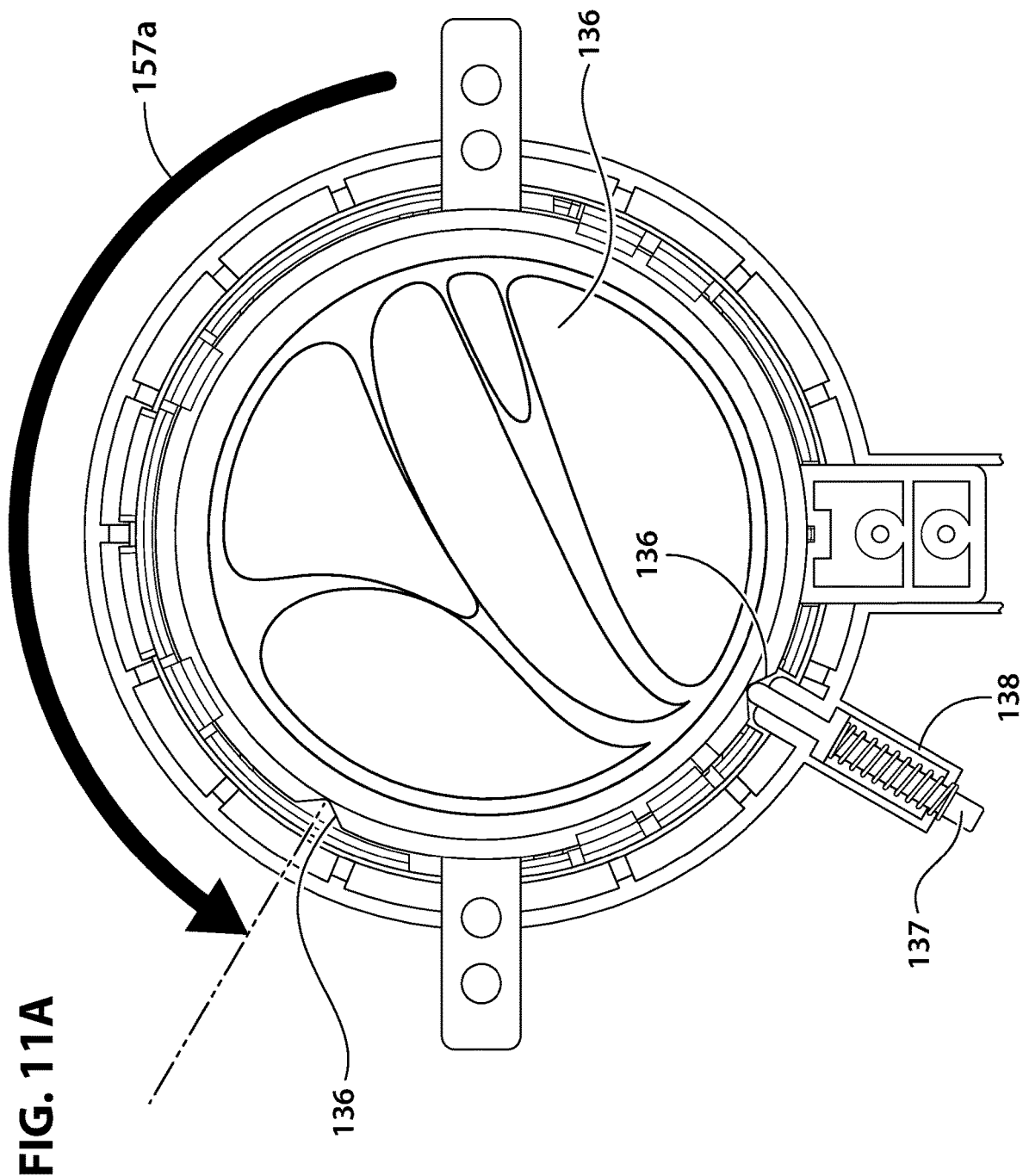
Figure 11B:
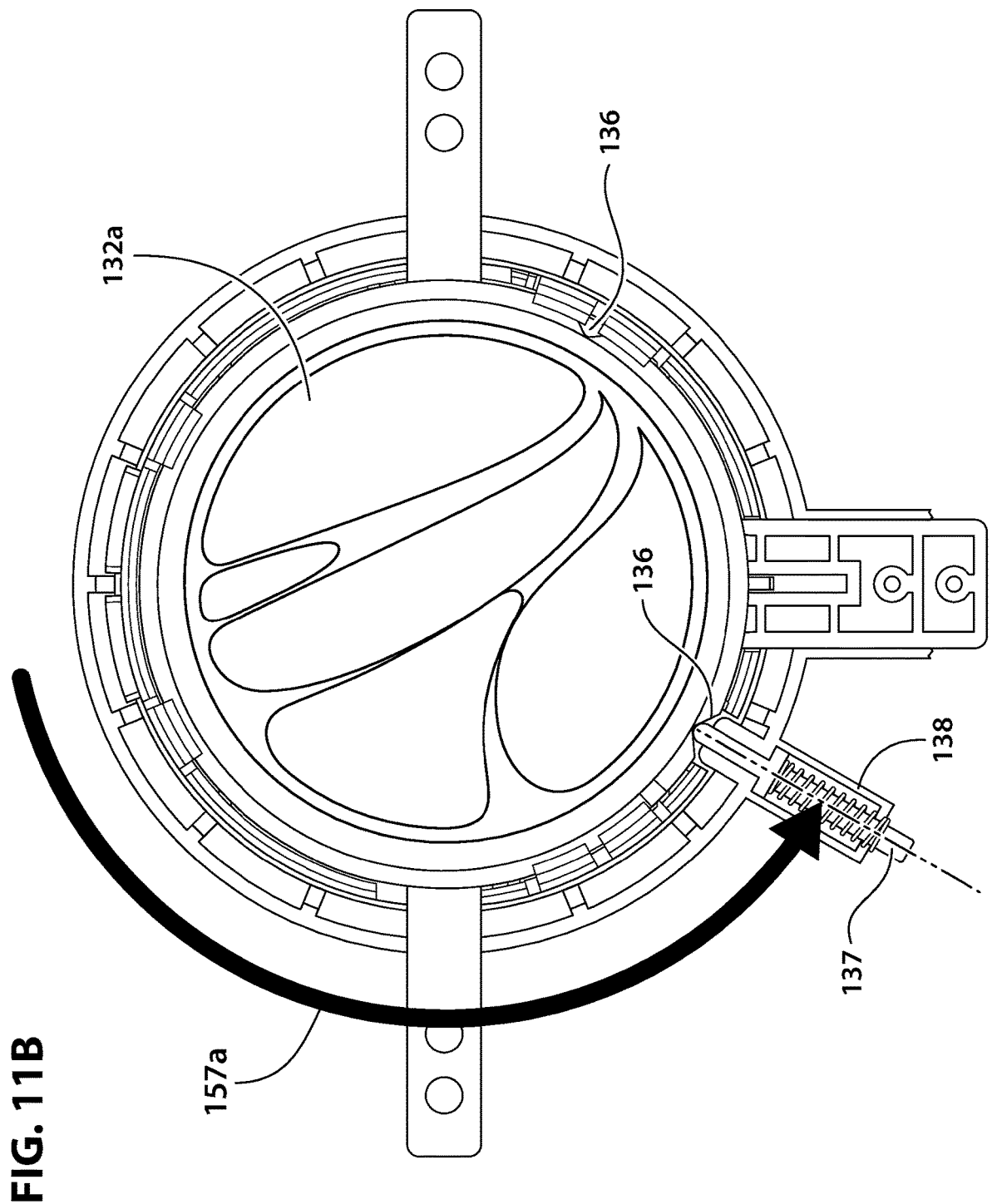
Figure 12A:
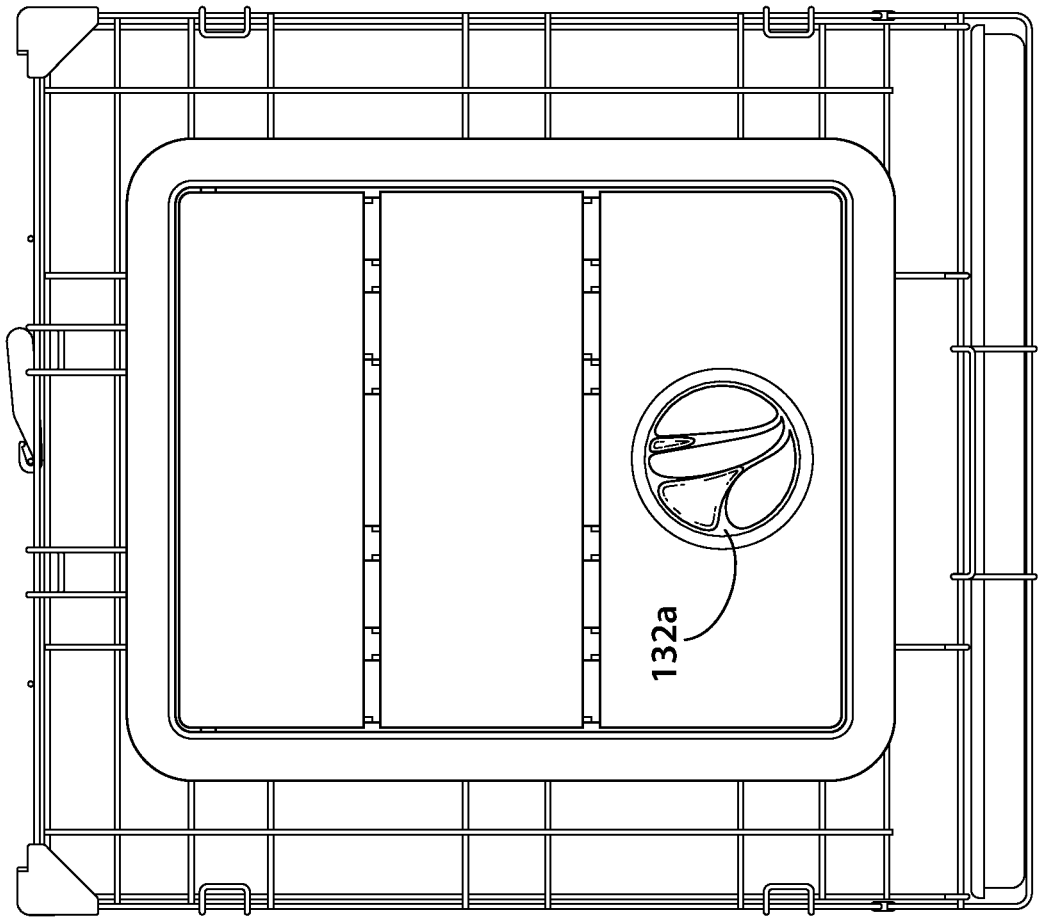
Figure 12B:
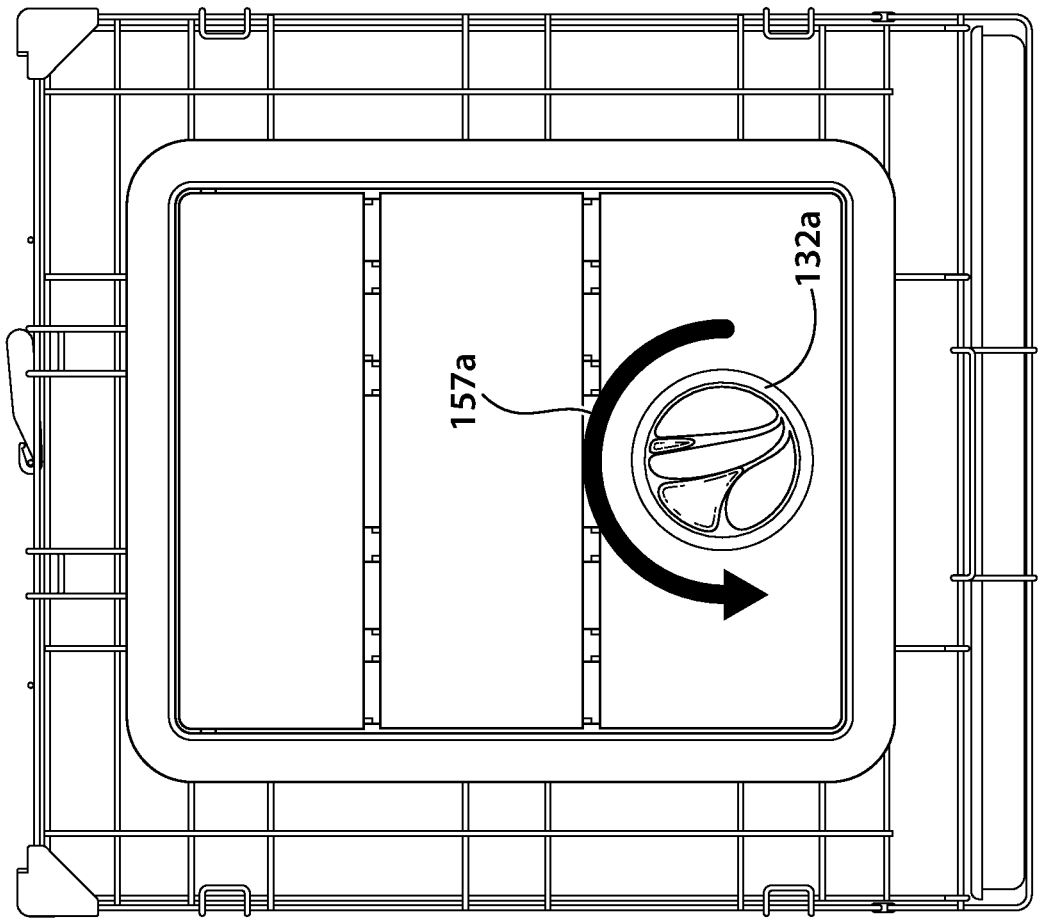
Figure 12C:
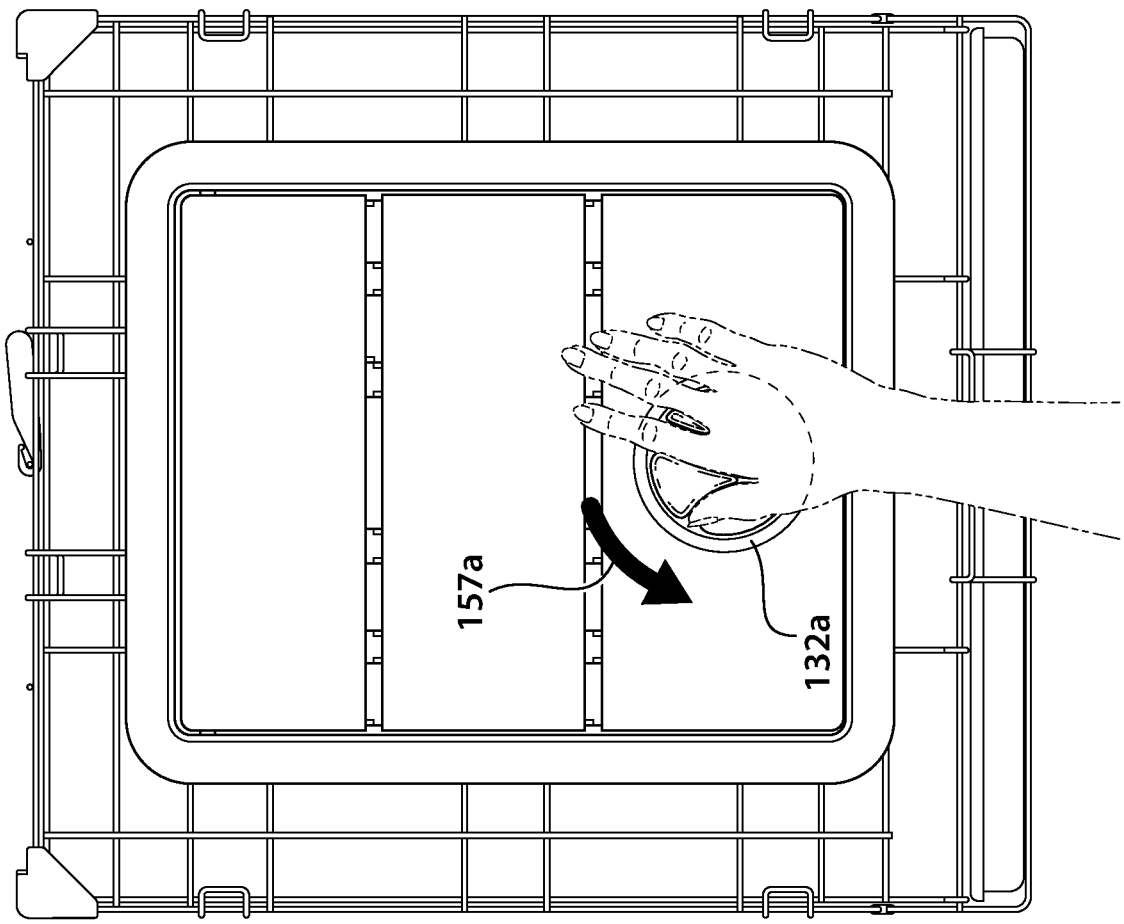
Figure 12D:
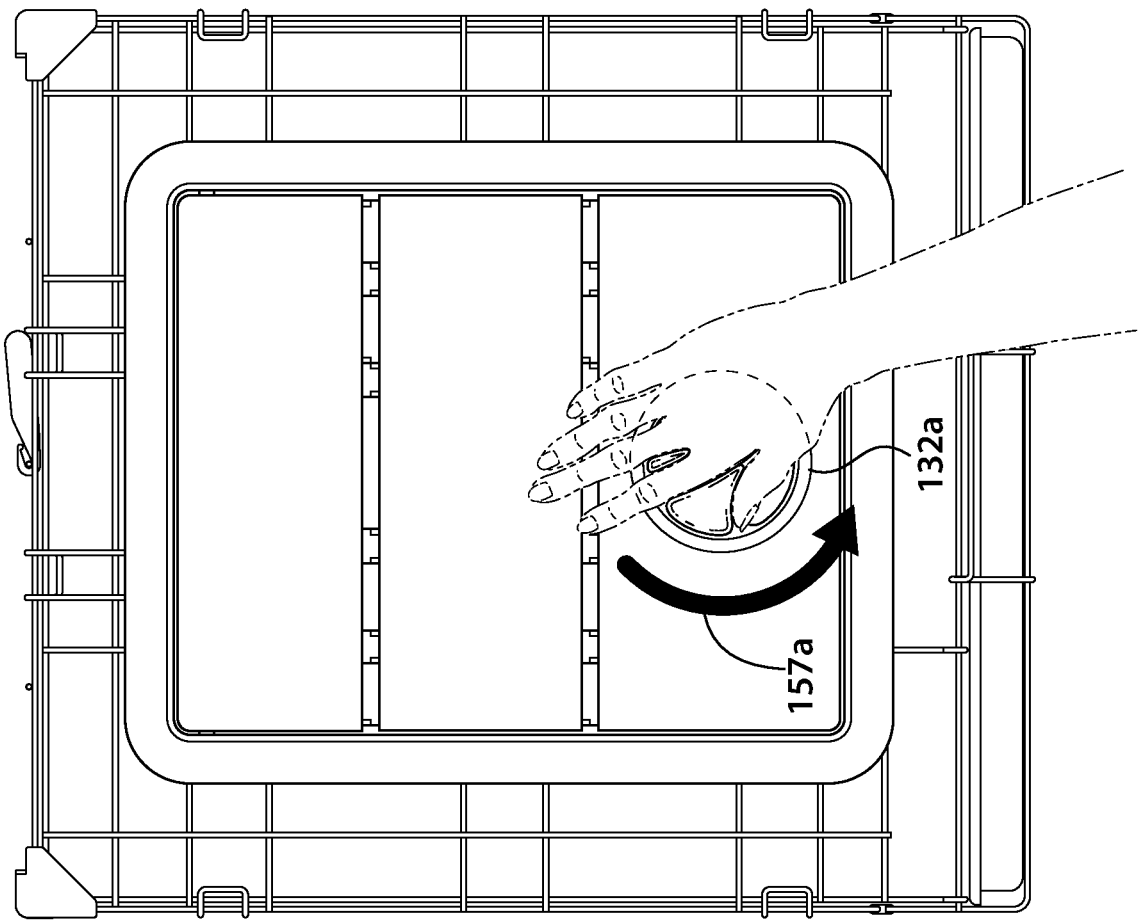
Figure 13A:
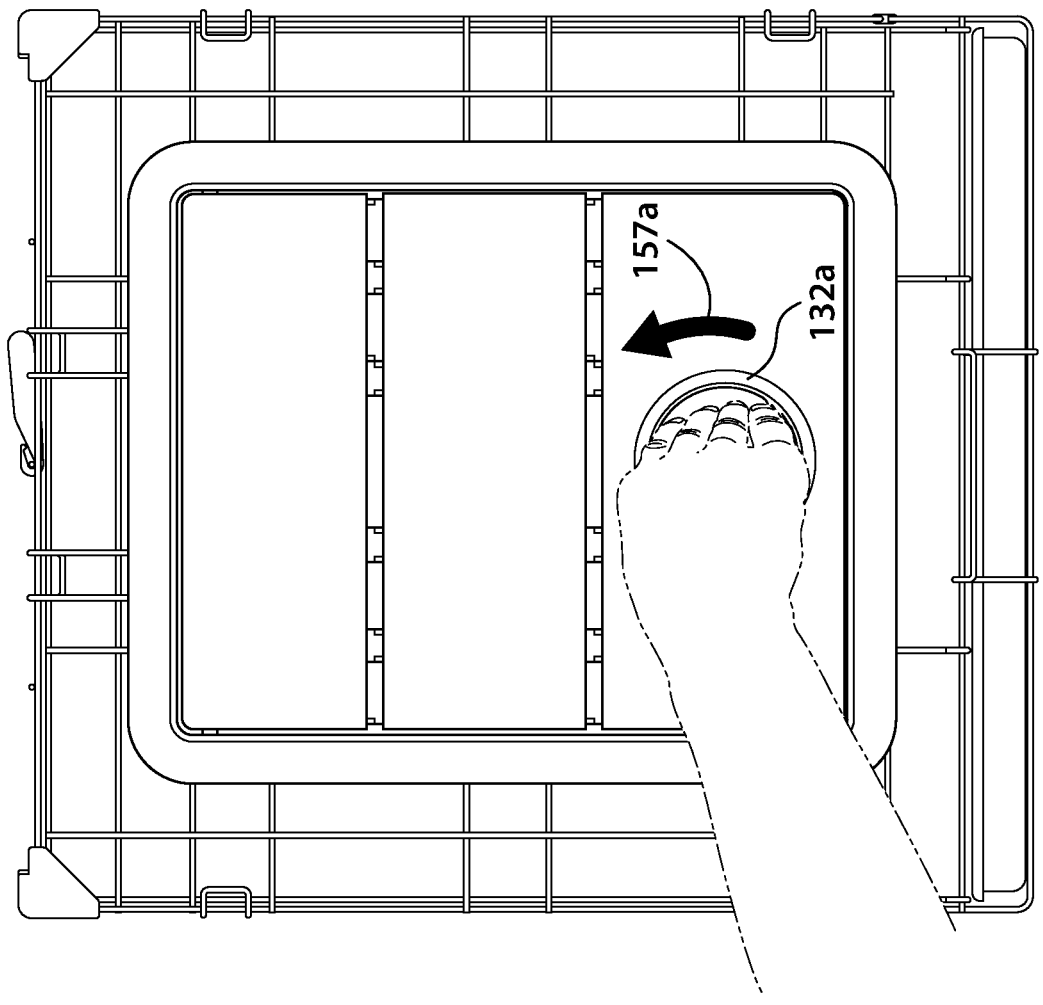
Figure 13B:
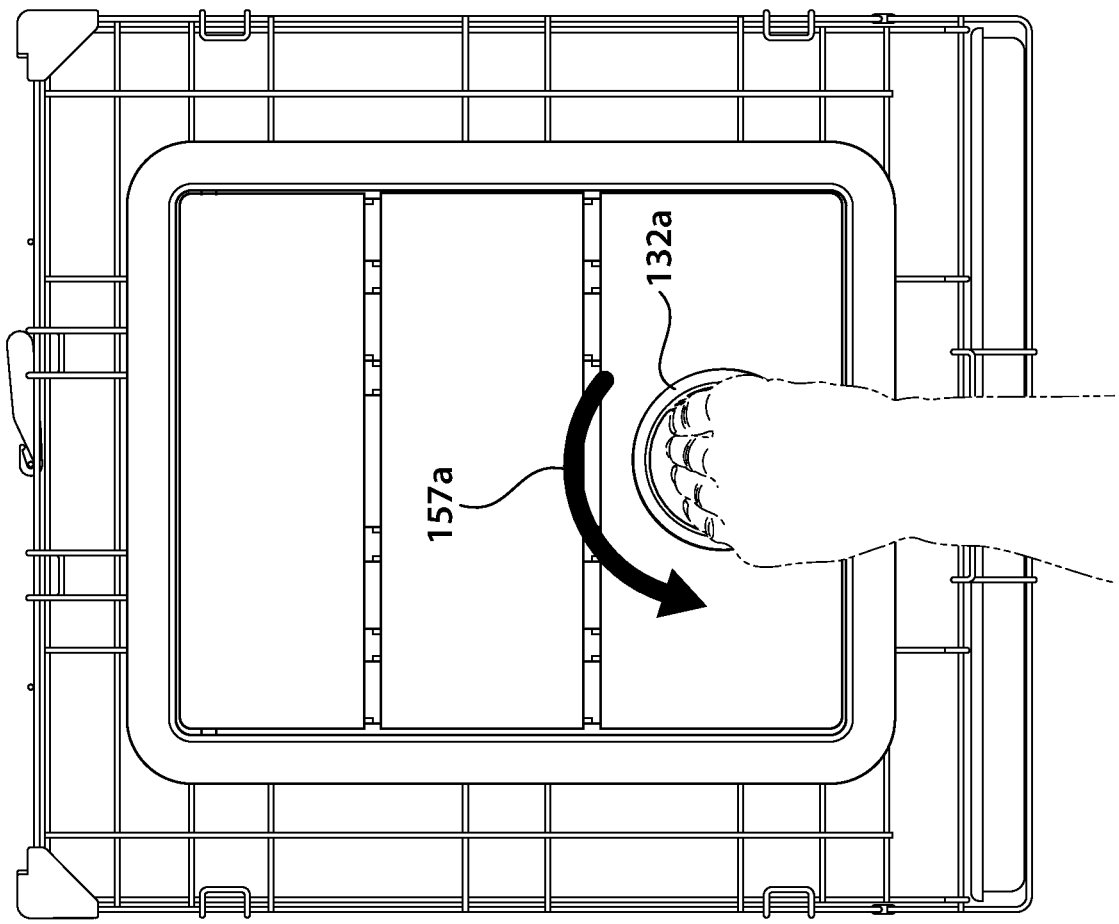
Figure 14A:
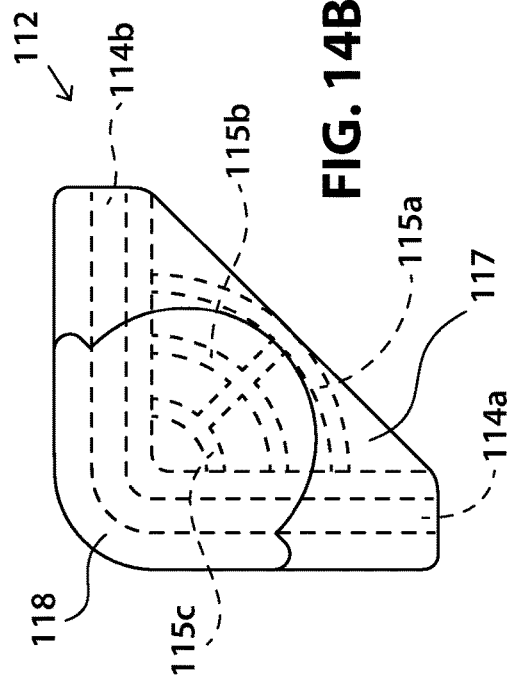
Figure 14B:
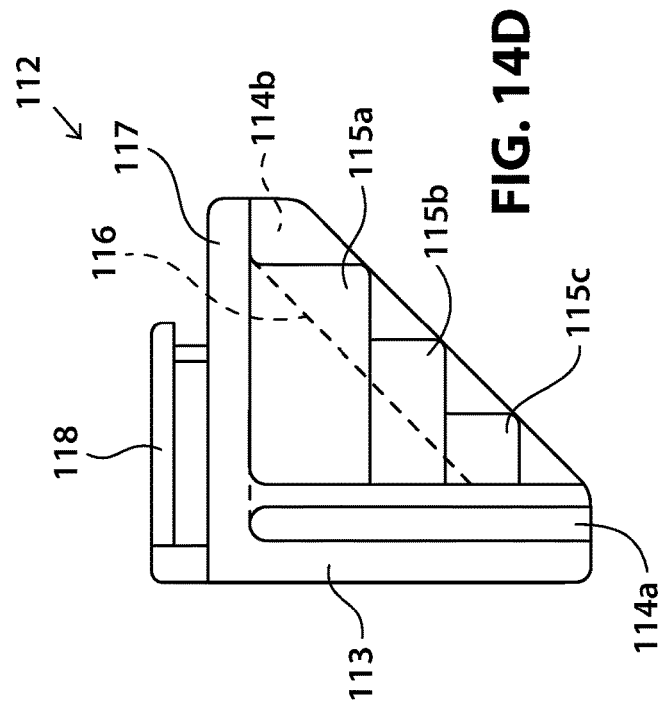
Figure 14C:
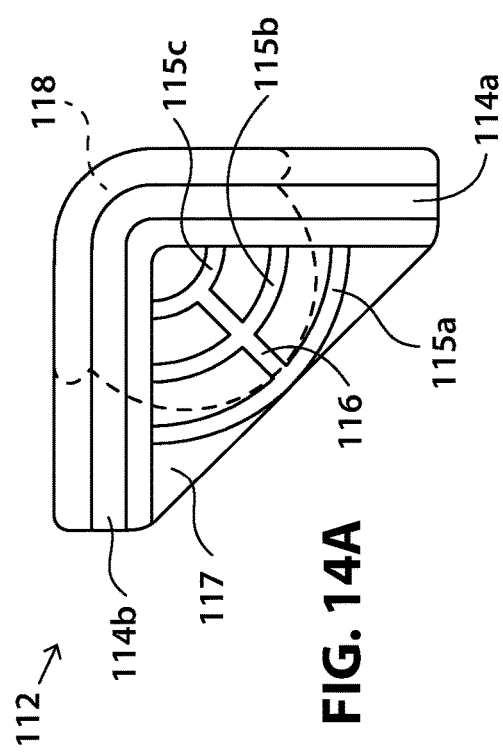
Figure 14D:
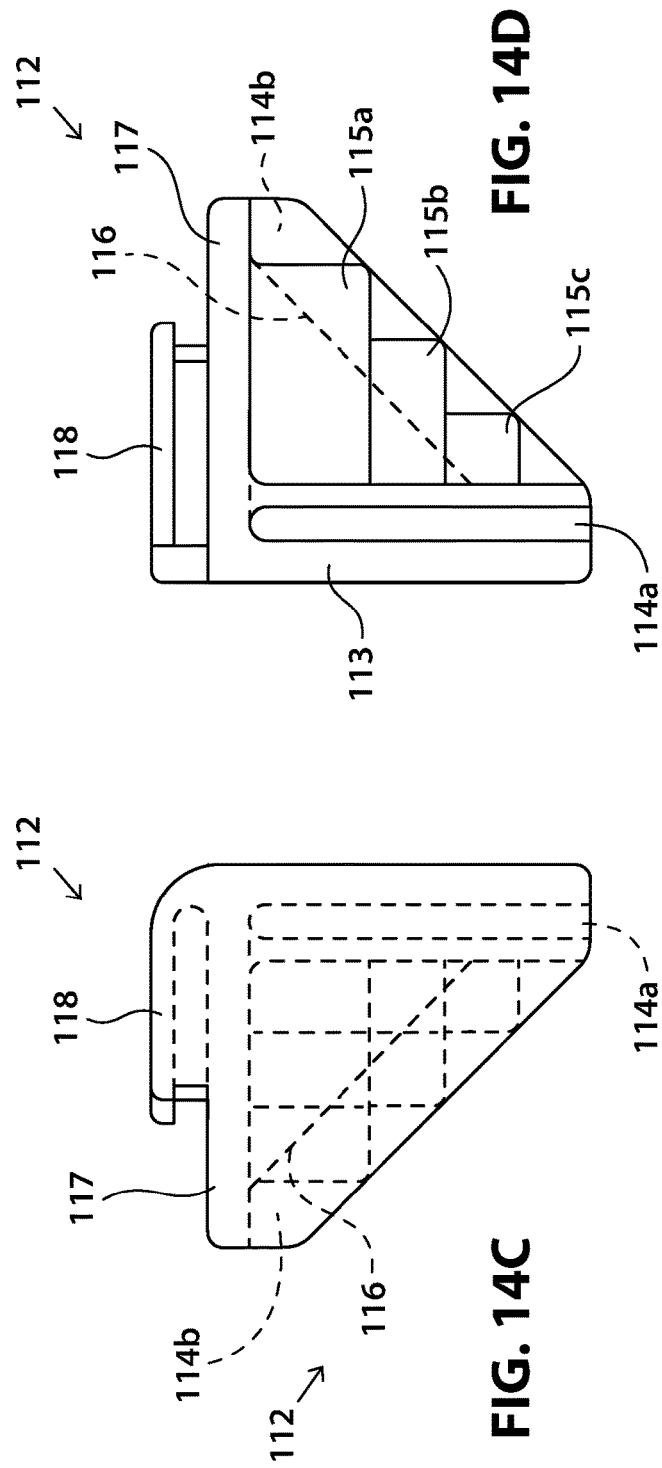
Figure 14E:
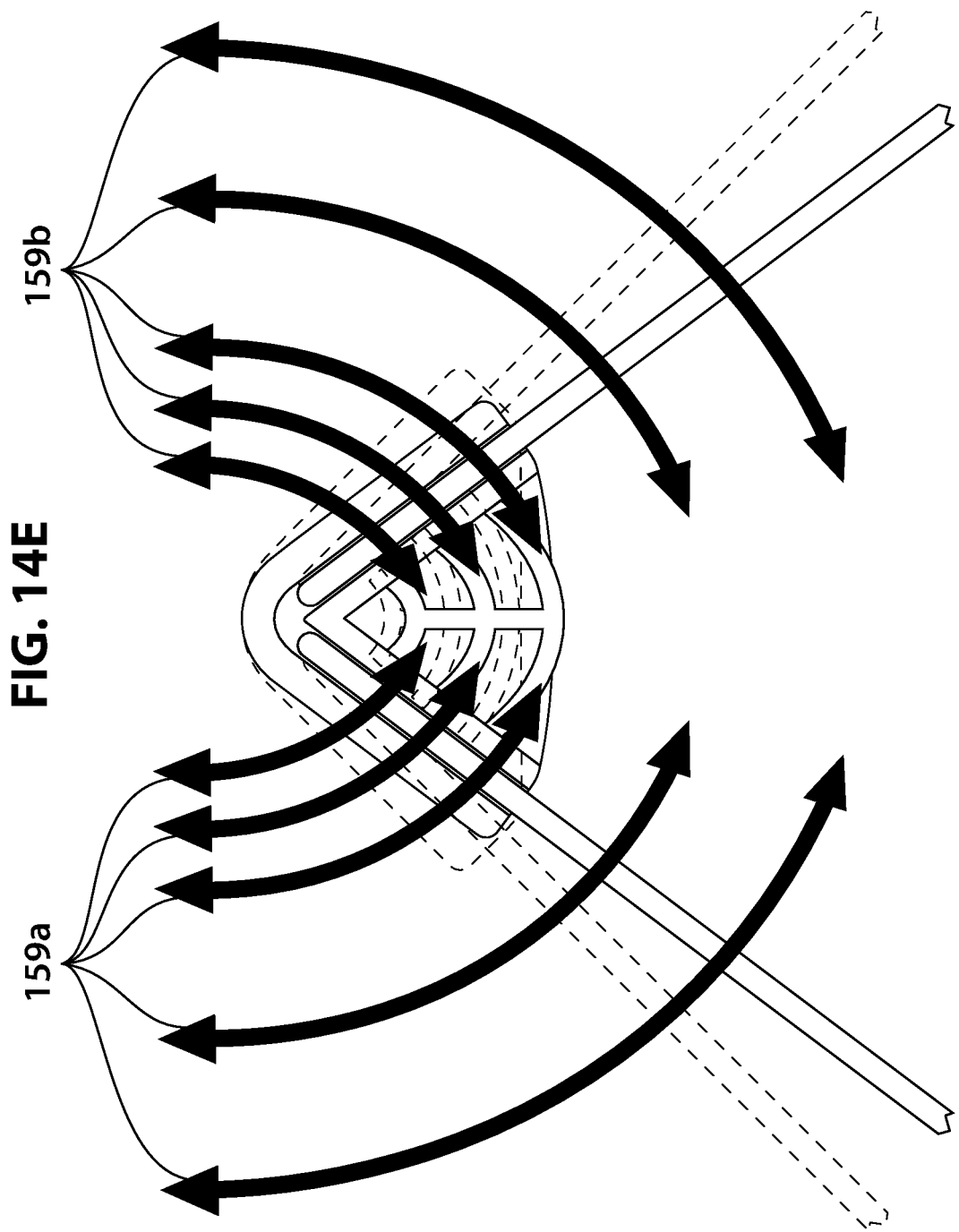
Figure 14G:
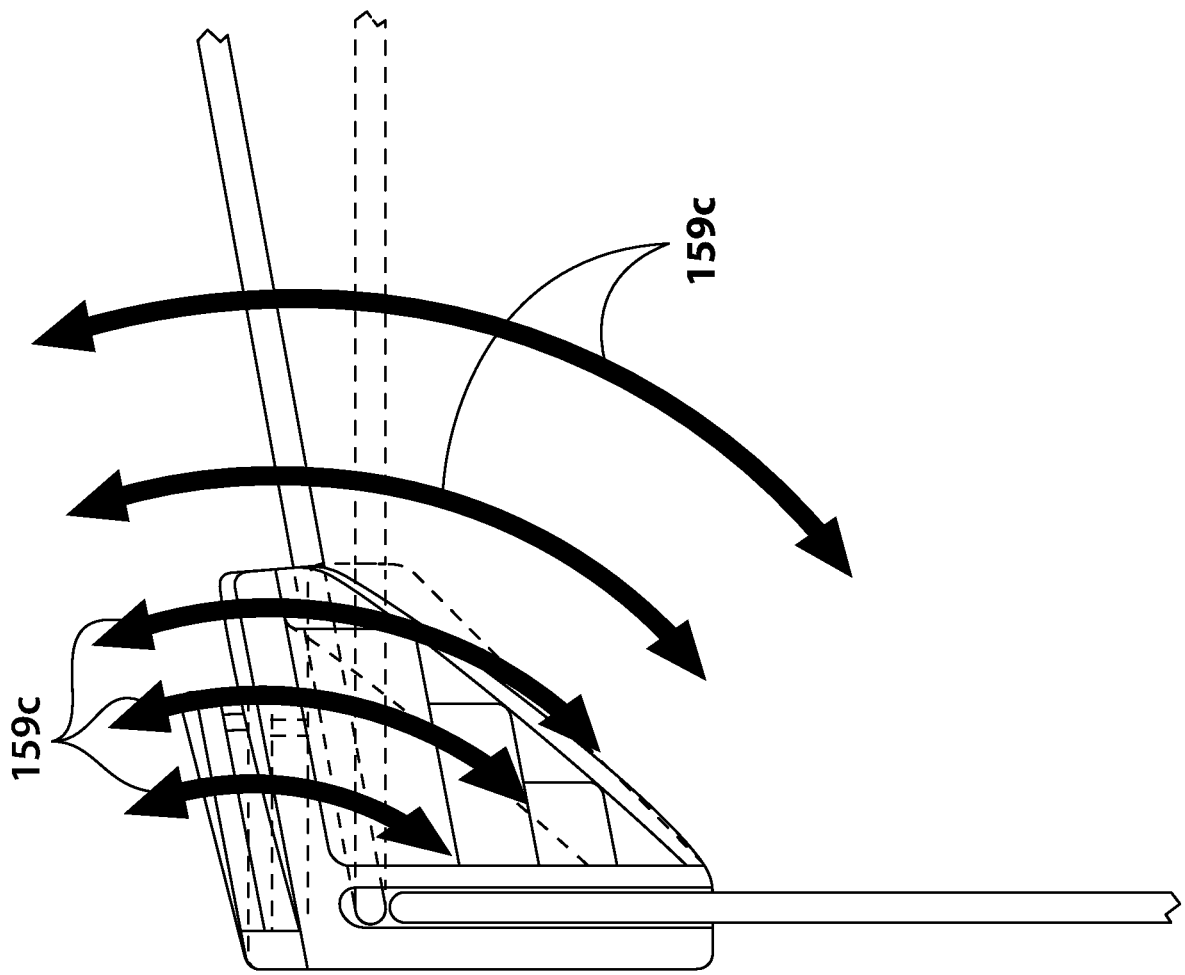
Figure 14H:
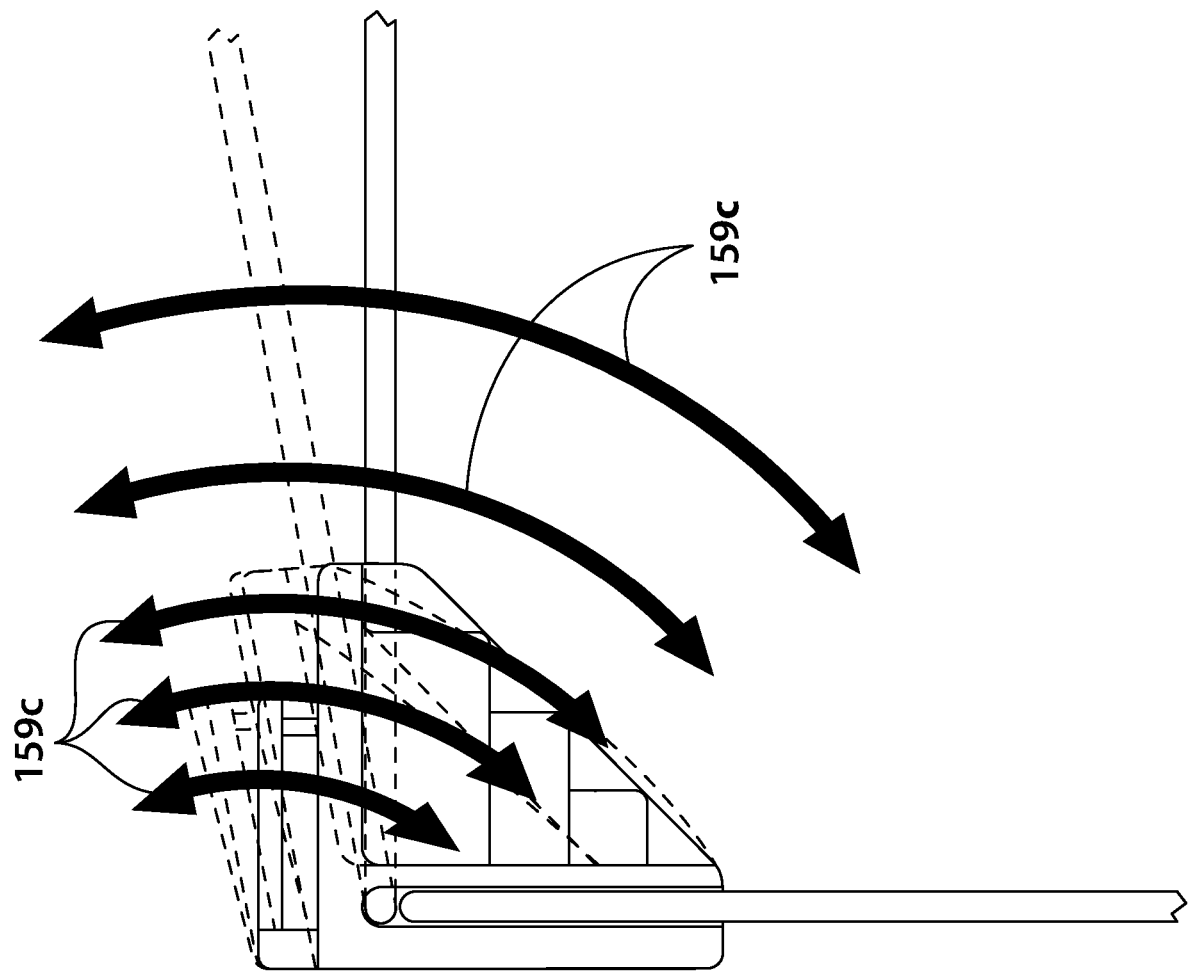
Figure 14J:
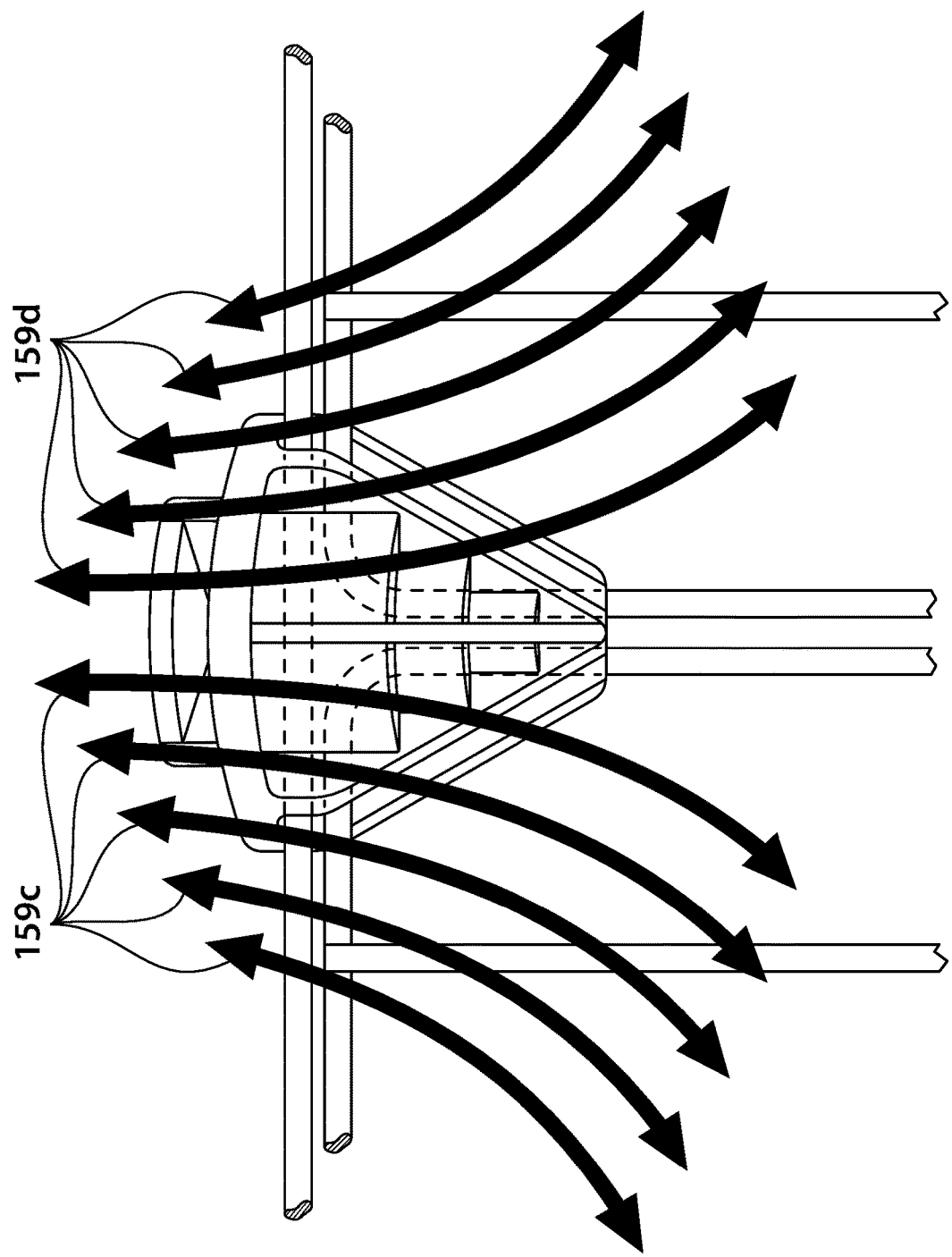
Figure 14K:
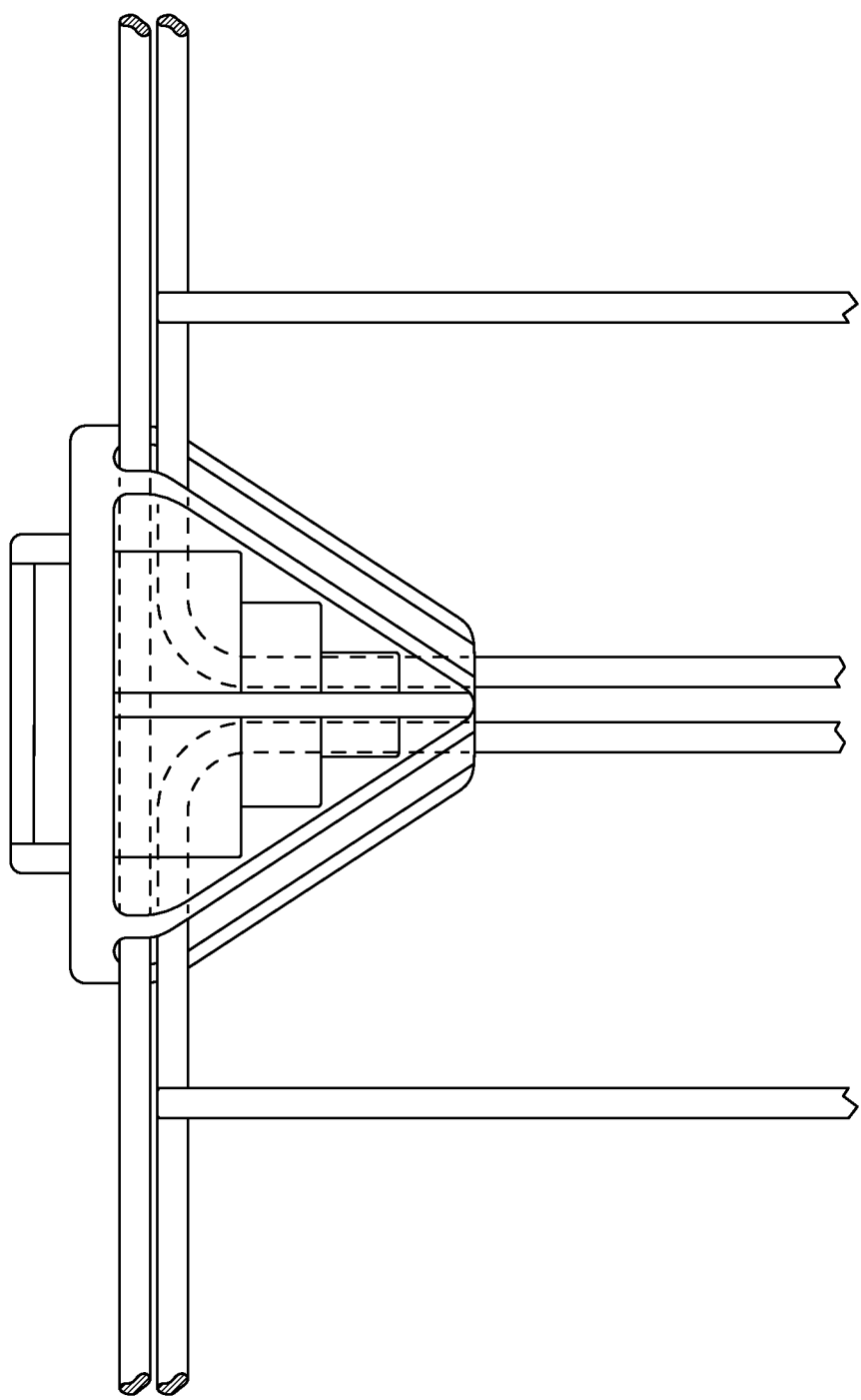
Figures 15A, 15B:
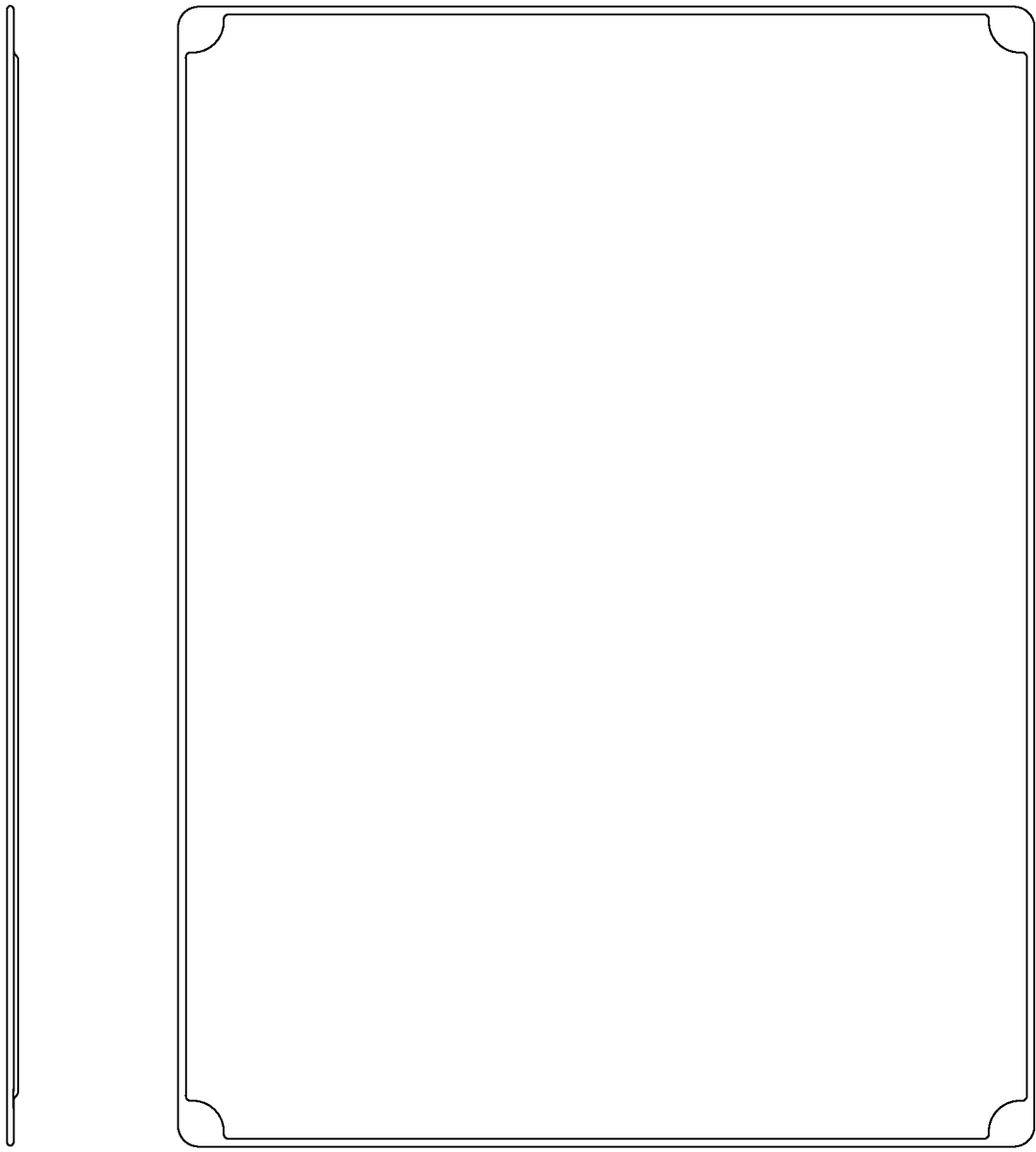
FIG. 15A, FIG. 15B, FIG. 15C, FIG. 15D, FIG. 15E, and FIG. 15F illustrate top and side views of how to install multi-function grooming platform on the big-dog-accommodating triple-hinged multi-function-shelf-trunk-platform-and-door pet crate.
Figure 15D:
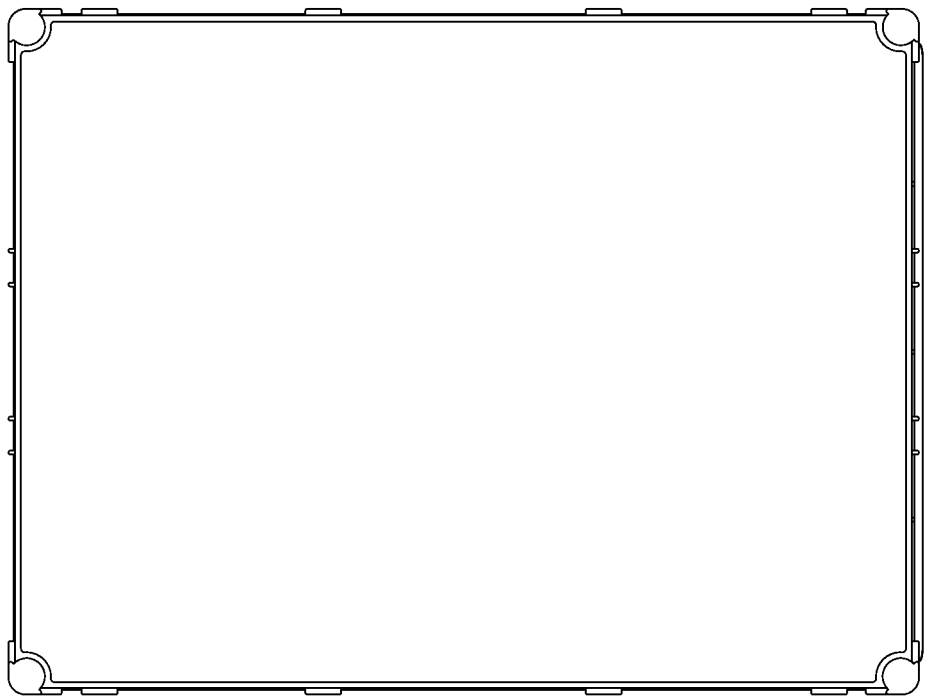
Figure 15C:
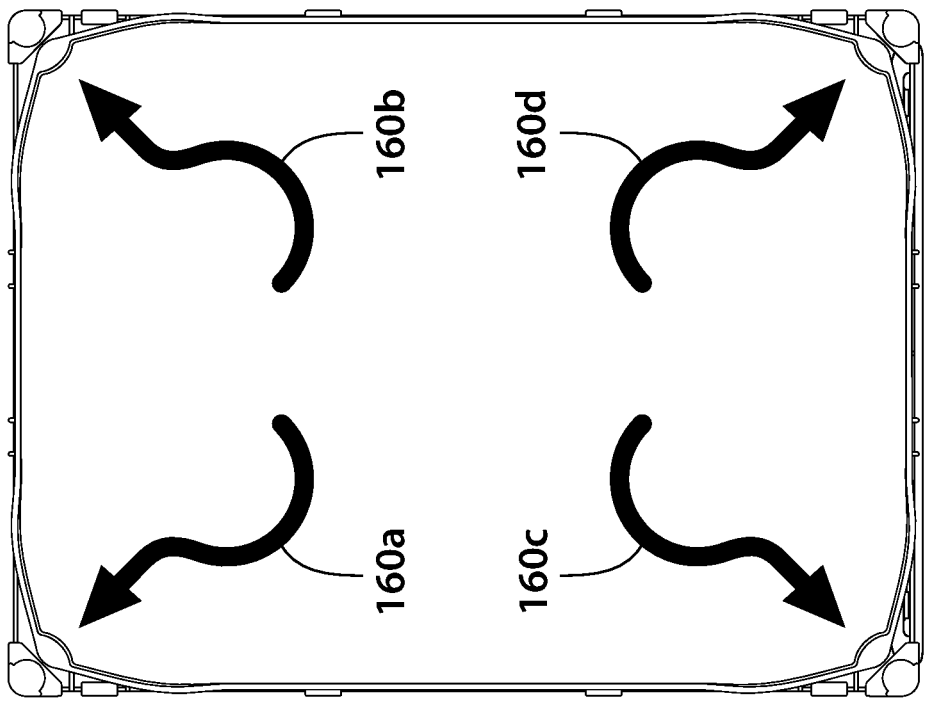
Figure 15E:
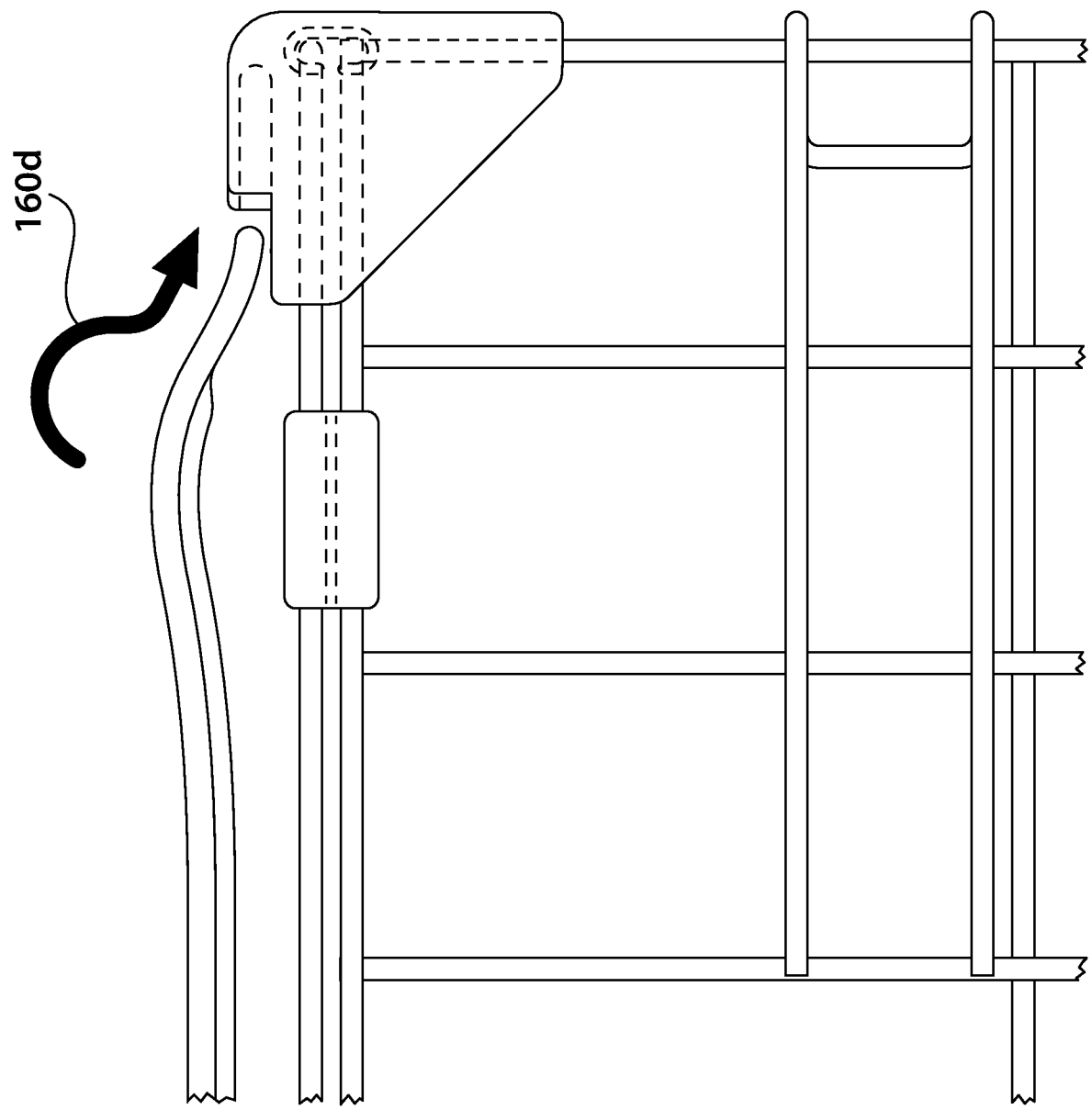
Figure 15F:
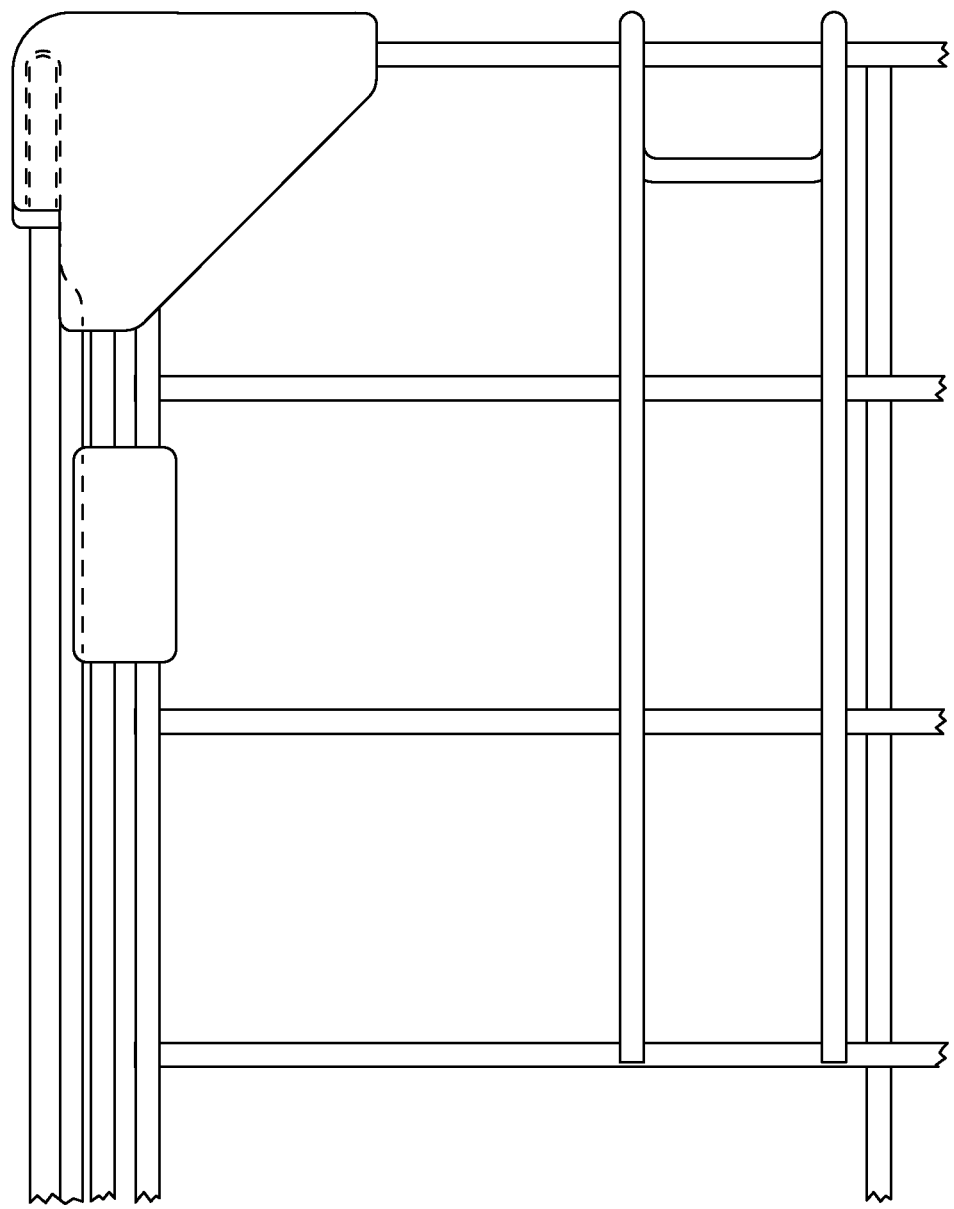
Figure 16A:
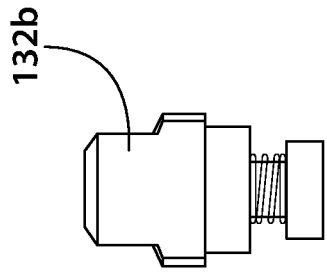
FIG. 16A, FIG. 16B, FIG. 16C, FIG. 16D, FIG.
Figure 16C:
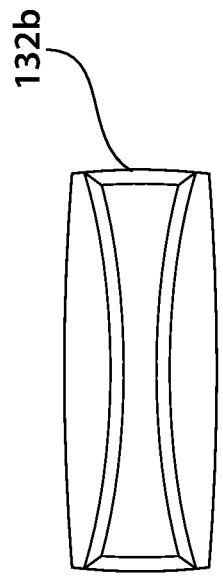
Figure 16B:
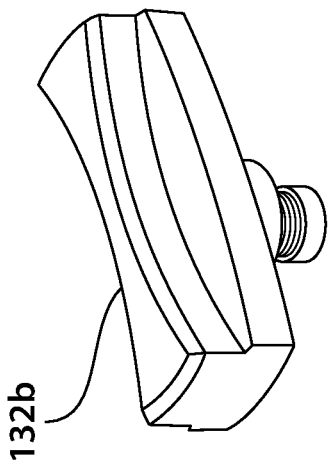
Figure 16D:
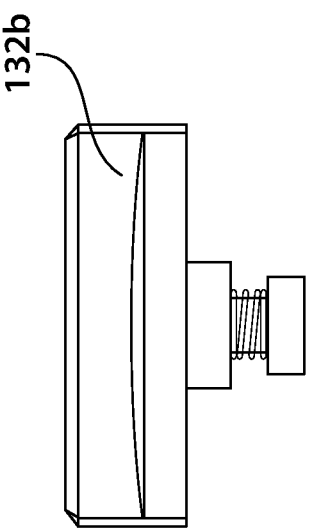
Figure 16G:
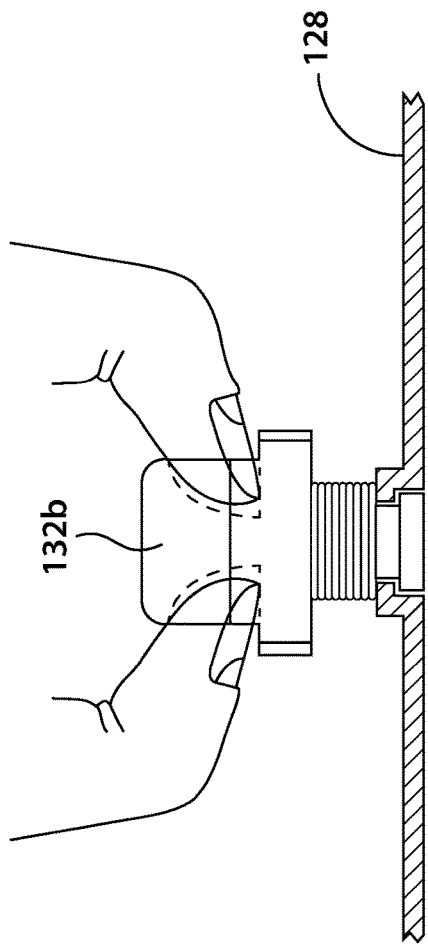
Figure 16H:
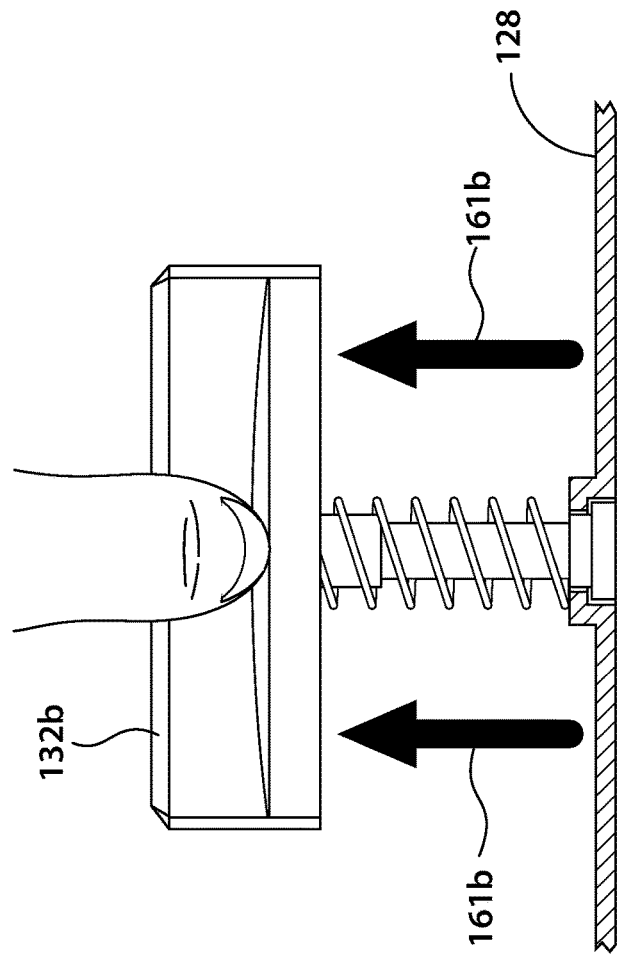
Figure 16I:
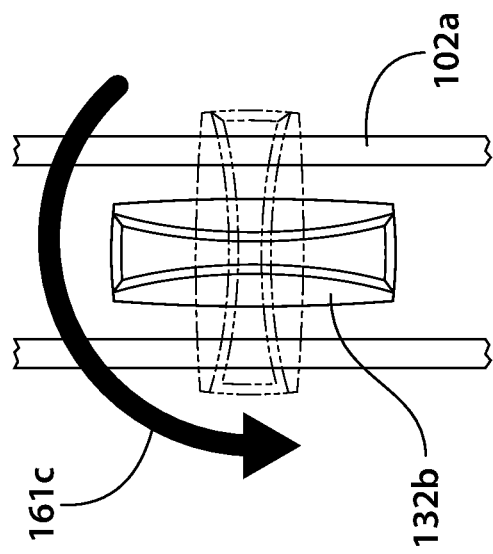
Figure 16J:
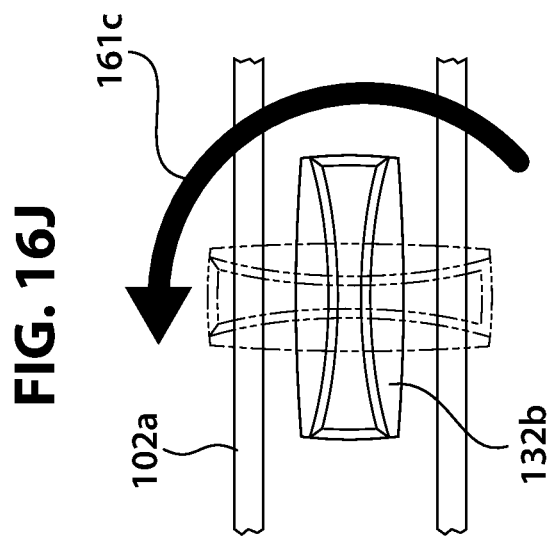
Figure 16L:
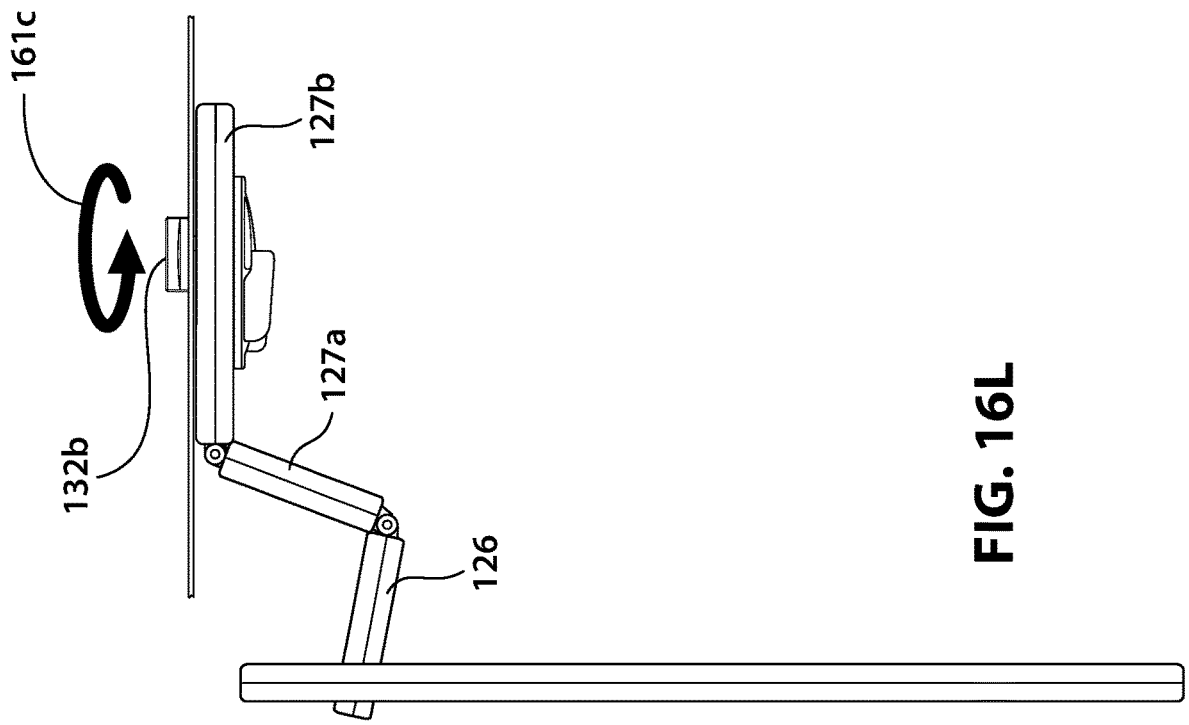
Figure 16K:
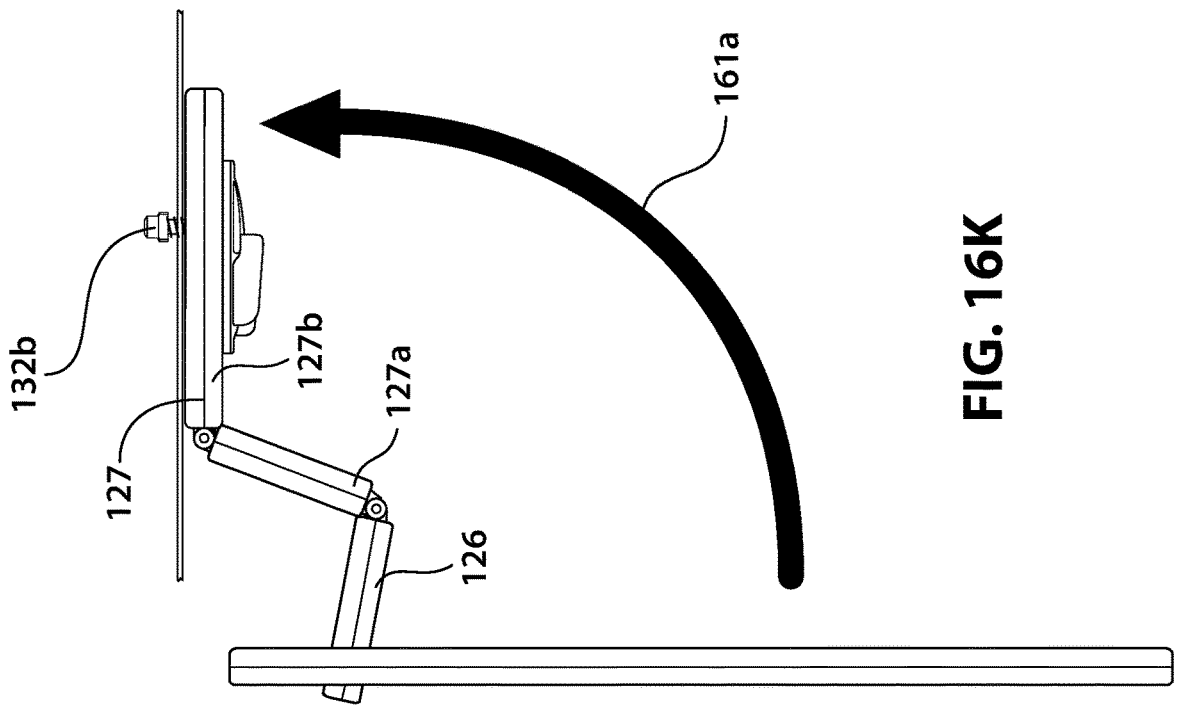
Figure 17:
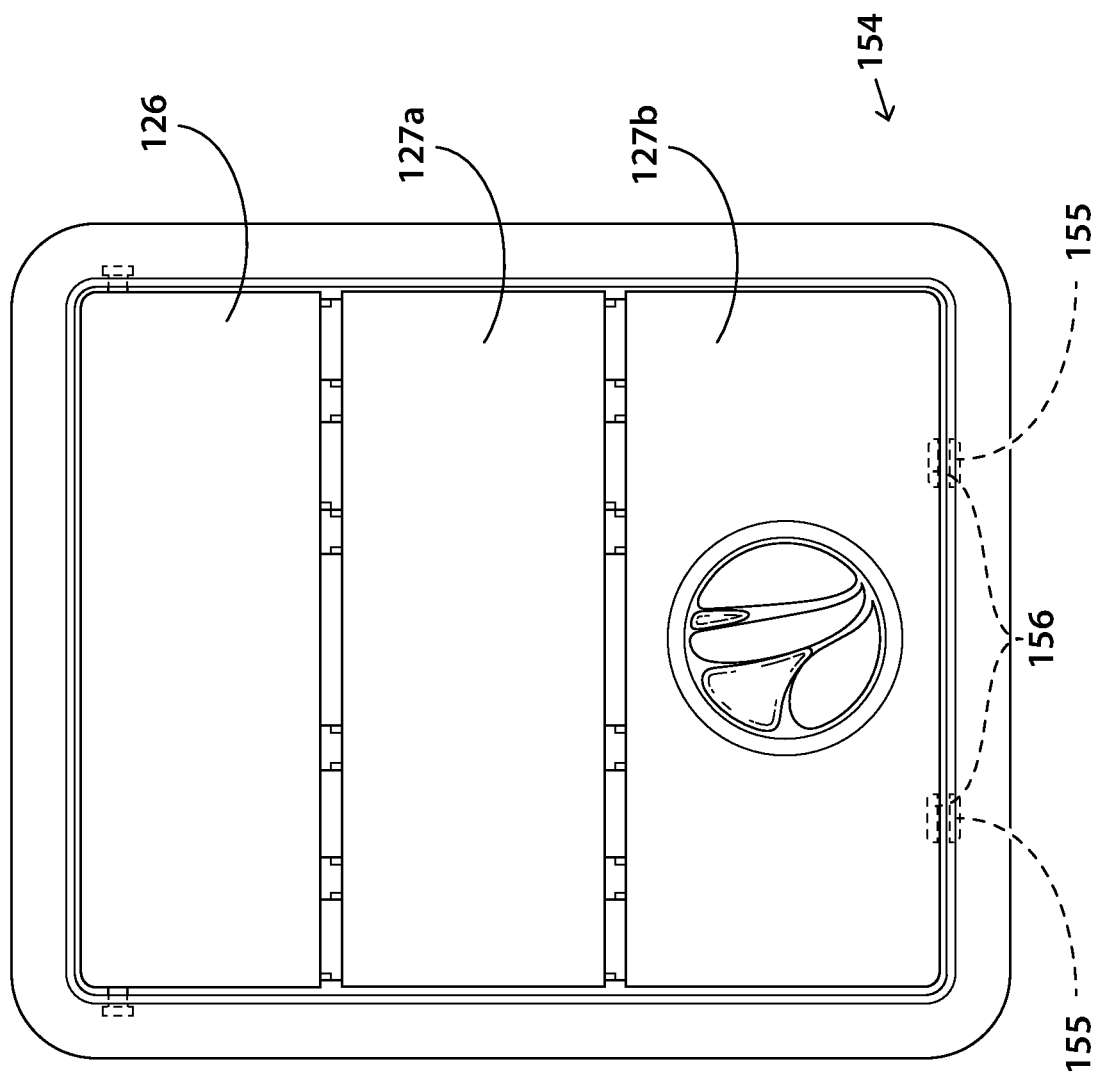
FIG. 17 illustrates front view of how to stop and lock big-dog-accommodating triple-hinged multi-function-shelf-trunk-platform-and-door system from swinging.

The present invention substantially departs from the conventional concepts and designs of the prior art. In doing so, the present invention provides the big-dog-accommodating triple-hinged multi-function-shelf-trunk-platform-and-door pet crate (having: a) Multi-function slanted urine-storing bed-roof-terrace system, b) Multi-function platform-locking shock-absorbing gusset systems, c) Multi-function platform-locking shock-absorbing gusset systems, and d) Multi-function big-dog-accommodating triple-hinged triple-front-lock single-top-lock multi-function-shelf-trunk-platform-and-door system), having many unique and significant features, functions, and advantages, which overcome all the disadvantages of the prior art, as follows:

1) It is an object of the new invention to provide a big-dog-accommodating triple-hinged multi-function-shelf-trunk-platform-and-door pet crate, having
    multi-function big-dog-accommodating triple-hinged multi-function-shelf-trunk-platform-and-door system 123.
    Therefore, the big-dog-accommodating triple-hinged multi-function-shelf-trunk-platform-and-door pet crate:
    a) Can quickly and hingedly swing open and gravitationally close,
       to allow for big dogs to comfortably fit into the big-dog-accommodating triple-hinged multi-function-shelf-trunk-platform-and-door pet crate
       (See FIGS. 1C and 1D);
    b) Can lock to create a grooming platform,
       to allow pets to be groomed on top of the big-dog-accommodating triple-hinged multi-function-shelf-trunk-platform-and-door pet crate
       (see FIG. 5F and FIG. 5G);
    c) Can lock to create an accessory shelf,
       to allow for holding pet accessories
       (see FIG. 5D and FIG. 5E);
    d) Can lock to create an interior accessory storage compartment,
       to allow for storing pet accessories
       (see FIG. 5B and FIG. 5C); and
    e) Can lock to create an exterior accessory storage compartment,
       to allow for storing pet accessories
       (see FIG. 5F and FIG. 5G).
2) It is an object of the new invention to provide a big-dog-accommodating triple-hinged multi-function-shelf-trunk-platform-and-door pet crate, having
    multi-function big-dog-accommodating triple-hinged multi-function-shelf-trunk-platform-and-door system 123.
    Therefore, the big-dog-accommodating triple-hinged multi-function-shelf-trunk-platform-and-door pet crate:
    a) Can lock in horizontal position against the top panel of the big-dog-accommodating triple-hinged multi-function-shelf-trunk-platform-and-door pet crate,
       to allow interior space for better utilization for different-size pets
       (see FIG. 5B and FIG. 5C);
    b) Can allow a quick single sliding movement,
       to lock the door in multiple vertical or horizontal positions;
    c) Can lock and adapt interchangeably,
       to multiple wire crate panel or multiple plastic crate panel; and
    d) Can quickly lock against the top panel of the big-dog-accommodating triple-hinged multi-function-shelf-trunk-platform-and-door pet crate,
       to allow large dogs to enter and exit easily
       (see FIG. 5B and FIG. 5C).
3) It is another object of the new invention to provide a big-dog-accommodating triple-hinged multi-function-shelf-trunk-platform-and-door pet crate, having
    multi-function slanted urine-storing bed-roof-terrace system 109.
    Therefore, the big-dog-accommodating triple-hinged multi-function-shelf-trunk-platform-and-door pet crate:
    a) Can provide a grooming platform (when used a grooming platform), which allows urine to run down the sanitary urine-storing gutters,
       to keep the grooming platform dry when used as a grooming platform,
    b) Can provide gutter ridges to elevate pet paws from the sanitary urine-storing gutters,
       to prevent pets from stepping in urine
       (see FIG. 2A and FIG. 2B);
    c) Can provide an alternate platform for pets,
       to allow the pets to sit, stand, play, rest, and sleep thereon
       (see FIG. 5J and FIG. 5I);
    d) Can keep pets away from urine,
       to keep the pets dry; and
    e) Can provide a roof (when used as a roof),
       to protect pets from the weather elements,
       (See FIG. 5J and FIG. 5I).
4) It is another object of the new invention to provide a big-dog-accommodating triple-hinged multi-function-shelf-trunk-platform-and-door pet crate, having
    multi-function door-locking ring system 151.
    Therefore, the big-dog-accommodating triple-hinged multi-function-shelf-trunk-platform-and-door pet crate:
    a) Can lock door hinges in multiple locations,
       to create multiple configuration options;
    b) Can lock grooming platform to top panel,
       to keep pets safe while grooming;
    c) Can provide alternative locking location,
       to create interior storage option
       (see FIG. 5B and FIG. 5C); and
    d) Can provide alternative locking location
       to create exterior storage options
       (see FIG. 5F and FIG. 5G).
5) It is a further object of the new invention to provide a big-dog-accommodating triple-hinged multi-function-shelf-trunk-platform-and-door pet crate, having
    multi-function grooming platform system 119.
    Therefore, the big-dog-accommodating triple-hinged multi-function-shelf-trunk-platform-and-door pet crate:
    a) Can quickly and easily be locked
       to multi-function platform-locking shock-absorbing gusset systems
       (see FIG. 5H);

b) Can conveniently provide secondary location for a pet,
to stand, sit, lay, or be groomed on
(see FIG. 5H);
c) Can conveniently allow pet grooming,
to take place in the same location as the big-dog-accommodating triple-hinged multi-function-shelf-trunk-platform-and-door pet crate
(see FIG. 5H); and
d) Can conveniently provide standing, sitting, laying, or grooming area atop the big-dog-accommodating triple-hinged multi-function-shelf-trunk-platform-and-door pet crate,
to take no additional square footage
(see FIG. 5H).

6) It is a further object of the new invention to provide a big-dog-accommodating triple-hinged multi-function-shelf-trunk-platform-and-door pet crate, having multi-function grooming platform system 119.
Therefore, the big-dog-accommodating triple-hinged multi-function-shelf-trunk-platform-and-door pet crate:
a) Can conveniently provide alternate location for a pet,
to provide them relief from confinement
(see FIG. 5H);
b) Can conveniently be locked using platform-locking notches,
to secure multi-function grooming platform from slipping
(see FIG. 5H);
c) Can quickly and easily be assembled and disassembled without tools; and
d) Can quickly and easily be cleaned.

7) It is an even further object of the new invention to provide a big-dog-accommodating triple-hinged multi-function-shelf-trunk-platform-and-door pet crate, having palm knob 132*a*.
Therefore, the big-dog-accommodating triple-hinged multi-function-shelf-trunk-platform-and-door pet crate:
a) Can conform to person's arthritic hand with little bending of fingers or hand,
to lock and unlock the multi-function door system easily
(see FIG. 12C and FIG. 12D);
b) Can allow other conventional grips on the palm knob,
to lock and unlock the multi-function door system with one hand;
c) Can allow minimal movement for a person's arthritic hand,
to rotate the palm knob; and
d) Can fit differently sized hands.

8) It is yet another object of the new invention to provide a big-dog-accommodating triple-hinged multi-function-shelf-trunk-platform-and-door pet crate, having multi-function platform-locking shock-absorbing gusset systems 112.
Therefore, the big-dog-accommodating triple-hinged multi-function-shelf-trunk-platform-and-door pet crate:
a) Can minimize shocks and impacts exerted on the big-dog-accommodating triple-hinged multi-function-shelf-trunk-platform-and-door pet crate,
to provide pets with comfort while being stationary or transported;

b) Can prevent all top corners of the big-dog-accommodating triple-hinged multi-function-shelf-trunk-platform-and-door pet crate from causing injuries to people and pets,
to make the big-dog-accommodating triple-hinged multi-function-shelf-trunk-platform-and-door pet crate safer to use;
c) Can absorb vibrations exerted on the big-dog-accommodating triple-hinged multi-function-shelf-trunk-platform-and-door pet crate,
to provide pets with comfort while being stationary or transported; and
d) Can resist the twisting, bending, and wobbling forces exerted on the big-dog-accommodating triple-hinged multi-function-shelf-trunk-platform-and-door pet crate
to strengthen the big-dog-accommodating triple-hinged multi-function-shelf-trunk-platform-and-door pet crate
(see FIG. 14E, FIG. 14F, FIG. 14G, FIG. 14H, FIG. 14I, and FIG. 14J).

What is claimed is:

1. A big-dog-accommodating triple-hinge-and-triple-lock-door pet crate comprising:
a top panel;
a bottom panel;
a left panel;
a right panel;
a front panel
having an opening for ingress and egress of a pet into and out of said pet crate;
a rear panel;
a bottom hook foldably connected to said bottom panel;
a plurality of side hooks respectively welded to said left and said right panels;
a plurality of top hooks respectively welded to said front and said rear panels;
a plurality of clamps clamping said top, said bottom, said left, and said right panels together;
a handle foldably clamped to said top panel;
a slanted bed-roof-terrace, said slanted bed-roof-terrace seated on said bottom panel;
a plurality of urine-storing gutters respectively molded around said slanted bed-roof-terrace;
a plurality of shock-absorbing gussets, said shock-absorbing gussets each comprising:
a plurality of gusset walls and a plurality of gusset recesses respectively molded between said gusset walls, each of said shock-absorbing gussets clamping three of said top, said bottom, said left, and said right panels together;
a grooming platform, said grooming platform seated on said top panel and
having four grooming-platform corners;
a big-dog-accommodating triple-hinge triple-lock door, said big-dog-accommodating triple-hinge triple-lock door for:
accommodating big dogs,
functioning as a drying shelf,
functioning as a grooming shelf,
functioning as an interior storage compartment,
said big-dog-accommodating triple-hinge triple-lock door comprising:
a first big-dog-accommodating door hinge attached to said front panel,
a second big-dog-accommodating door hinge,
a third big-dog-accommodating door hinge, a first big-dog-accommodating door panel rotatably attached to
said first big-dog-accommodating door hinge and said second big-dog-accommodating door hinge,
a second big-dog-accommodating door panel rotatably attached to
said second big-dog-accommodating door hinge and said third big-dog-accommodating door hinge,
a third big-dog-accommodating door panel rotatably attached to
said third big-dog-accommodating door hinge,
a front knob panel,
a rear knob panel,
a plurality of front knob hooks respectively molded to said front knob panel,
a plurality of rear knob hooks respectively molded to said rear knob panel,
each of said front knob hooks having a hook-receiving opening, said front knob hooks for respectively snap-locked into said hook-receiving openings to sandwich said front knob panel and said rear knob panel in said opening of said front panel,
a palm knob rotatably sandwiched between said front knob panel and said rear knob panel, said front knob panel having a hole from which said palm knob protrudes outwardly to enable access to said palm knob,
a plurality of palm recesses respectively molded to said palm knob,
a plurality of palm hills respectively molded to said palm knob,
a circular knob gear molded to said palm knob,
two knob notches respectively molded to said palm knob,
a spring-loaded pin inserted into one of said two knob notches
for releasably locking said palm knob,
a spring-loaded-pin housing molded to said front knob panel and said rear knob panel for housing said spring-loaded pin,
a first locking rod sandwiched between said front knob panel and said rear knob panel,
a plurality of first linear gears molded to said first locking rod and engaged to said circular knob gear,
a second locking rod sandwiched between said front knob panel and said rear knob panel,
a plurality of second linear gears molded to said second locking rod and engaged to said circular knob gear,
a third locking rod sandwiched between said front knob panel and said rear knob panel,
a plurality of third linear gears molded to said third locking rod and engaged to said circular knob gear;
a plurality of triple-door-locking rings, said triple-door-locking rings comprising:
two hinge-locking rings respectively attached to said first big-dog-accommodating door hinge and swingably attached to said front panel,
three rod-locking rings respectively attached to said front panel, said spring-loaded pin for being inserted into one of said two knob notches to respectively lock said first locking rod, said second locking rod, said third locking rod in said three rod-locking rings; and
a plurality of triple-door-locking magnets, said triple-door-locking magnets comprising:
a panel magnet attached to said front panel,
a door magnet attached to said third big-dog-accommodating door panel for pulling said panel magnet thereto to close said big-dog-accommodating triple-hinge triple-lock door.

2. The big-dog-accommodating triple-hinge-and-triple-lock-door pet crate of claim 1, further comprising:
a plurality of curved gusset springs respectively molded to said gusset walls,
a plurality of vertical gusset springs respectively molded to said gusset walls and to said curved gusset springs, and
a plurality of horizontal gusset springs respectively molded to said gusset walls, to said curved gusset springs, and to said vertical gusset springs,
wherein said curved gusset springs, said vertical gusset spring, and said horizontal gusset spring are for absorbing impact and vibration and for strengthening said pet crate.

3. The big-dog-accommodating triple-hinge-and-triple-lock-door pet crate of claim 2, further comprising four platform-locking shock-absorbing gusset tabs respectively molded to said horizontal gusset springs, wherein said four platform-locking shock-absorbing gusset tabs are:
for cushioning said pet crate,
for absorbing impact and vibration,
for strengthening said pet crate,
for locking said four grooming-platform corners thereunder
to lock said grooming platform on said top panel, and
for locking said slanted bed-roof-terrace thereto
to lock said slanted bed-roof-terrace on said top panel.

4. The big-dog-accommodating triple-hinge-and-triple-lock-door pet crate of claim 1, further comprising a spring-loaded knob rotatably attached to said rear knob panel, wherein said spring-loaded knob is formed into a letter-T shape and is for being lifted and rotated to rest on said top panel to lock said big-dog-accommodating triple-hinge triple-lock door to said top panel.

5. The big-dog-accommodating triple-hinge-and-triple-lock-door pet crate of claim 1, further comprising a plurality of gutter ridges respectively molded to said urine-storing gutters, provided a pet, wherein said gutter ridges are for preventing said pet from stepping in said urine-storing gutters and are for strengthening said urine-storing gutters.

6. The big-dog-accommodating triple-hinge-and-triple-lock-door pet crate of claim 1, further comprising:
a first attacher molded to said first locking rod,
a first extender attached to said first attacher for extending said first locking rod,
a second attacher molded to said second locking rod,
a second extender attached to said second attacher for extending said second locking rod,
a third attacher molded to said third locking rod, and
a third extender attached to said third attacher for extending said third locking rod.

7. The big-dog-accommodating triple-hinge-and-triple-lock-door pet crate of claim 1, wherein, said big-dog-accommodating triple-hinge-and-triple-lock-door pet crate is partially or entirely made of a material selected from the group consisting of: plastic, wood, metal, and a combination of at least two of said above-mentioned materials.

8. The big-dog-accommodating triple-hinge-and-triple-lock-door pet crate of claim 1, wherein said big-dog-accommodating triple-hinge-and-triple-lock-door pet crate is partially or entirely made of wires welded to one another.

9. The big-dog-accommodating triple-hinge-and-triple-lock-door pet crate of claim 1, further comprising a plurality of
platform dikes respectively molded around said grooming platform, provided urine, wherein said platform dikes are for preventing said urine from running off said grooming platform and are for strengthening said grooming platform.

10. A pet crate comprising:
a top panel;
a bottom panel;
a left panel;
a right panel;
a front panel
having an opening for ingress and egress of a pet into and out of said pet crate;
a rear panel;
a bottom hook foldably connected to said bottom panel;
a plurality of side hooks respectively welded to said left and said right panels;
a plurality of top hooks respectively welded to said front and said rear panels;
a plurality of clamps clamping said top, said bottom, said left, and said right panels together;
a handle foldably clamped to said top panel;
a slanted bed-roof-terrace, said slanted bed-roof-terrace seated on said bottom panel;
a plurality of gutters respectively molded around said slanted bed-roof-terrace;
a plurality of shock-absorbing gussets, said shock-absorbing gussets each comprising:
a plurality of gusset walls and a plurality of gusset recesses respectively molded between said gusset walls, each of said shock-absorbing gussets clamping three of said top, said bottom, said left, and said right panels together;
a grooming platform, said grooming platform seated on said top panel and having four grooming-platform corners;
a big-dog-accommodating triple-hinge triple-lock door, said big-dog-accommodating triple-hinge triple-lock door comprising:
a first big-dog-accommodating door hinge attached to said front panel,
a second big-dog-accommodating door hinge,
a third big-dog-accommodating door hinge,
a first big-dog-accommodating door panel rotatably attached to
said first big-dog-accommodating door hinge and said second big-dog-accommodating door hinge,
a second big-dog-accommodating door panel rotatably attached to
said second big-dog-accommodating door hinge and said third big-dog-accommodating door hinge,
a third big-dog-accommodating door panel rotatably attached to
said third big-dog-accommodating door hinge,
a front knob panel,
a rear knob panel,
a plurality of front knob hooks respectively molded to said front knob panel,
a plurality of rear knob hooks respectively molded to said rear knob panel, each of said front knob hooks having a hook-receiving opening, said front knob hooks for respectively snap-locked into said hook-receiving openings to sandwich said front knob panel and said rear knob panel in said opening of said front panel,
a knob rotatably sandwiched between said front knob panel and said rear knob panel, said front knob panel having a hole from which said knob protrudes outwardly to enable access to said knob,
a circular knob gear molded to said knob,
two knob notches respectively molded to said knob,
a spring-loaded pin inserted into one of said two knob notches for releasably locking said knob,
a spring-loaded-pin housing molded to said front knob panel and said rear knob panel for housing said spring-loaded pin,
a first locking rod sandwiched between said front knob panel and said rear knob panel,
a plurality of first linear gears molded to said first locking rod and engaged to said circular knob gear,
a second locking rod sandwiched between said front knob panel and said rear knob panel,
a plurality of second linear gears molded to said second locking rod and engaged to said circular knob gear,
a third locking rod sandwiched between said front knob panel and said rear knob panel,
a plurality of third linear gears molded to said third locking rod and engaged to said circular knob gear;
two hinge rings respectively attached to said first big-dog-accommodating door hinge and swingably attached to said front panel;
three rod rings respectively attached to said front panel, said spring-loaded pin for being inserted into one of said two knob notches to respectively lock said first locking rod, said second locking rod, said third locking rod in said three rod rings;
a panel magnet attached to said front panel; and
a door magnet attached to said third big-dog-accommodating door panel for pulling said panel magnet thereto to close said big-dog-accommodating triple-hinge triple-lock door.

11. The pet crate of claim 10, further comprising:
at least one of curved spring, vertical spring, and curved spring molded to said gusset walls of each of said shock-absorbing gussets,
wherein said curved spring, said vertical spring, and said horizontal spring are for absorbing impact and vibration and for strengthening each of said shock-absorbing gussets.

12. The pet crate of claim 11, further comprising four tabs respectively molded to said gusset walls of each of said shock-absorbing gussets,
wherein said four tabs are for locking said
four grooming-platform corners thereunder to lock said grooming platform on said top panel.

13. The pet crate of claim 10, further comprising a spring-loaded knob rotatably attached to said rear knob panel, wherein said spring-loaded knob is formed into a letter-T shape and is for being lifted and rotated to rest on said top panel to lock said big-dog-accommodating triple-hinge triple-lock door to said top panel.

14. The pet crate of claim 10, wherein said gutters are respectively molded around said slanted bed-roof-terrace, said gutters further comprising a plurality of ridges respectively molded to said gutters, provided a pet, wherein said ridges are for preventing said pet from stepping in said gutters and are for strengthening said gutters.

15. The pet crate of claim 10, further comprising:
a first attacher,
a first extender attached to said first attacher for extending said first locking rod,
a second attacher,
a second extender attached to said second attacher for extending said second locking rod,
a third attacher, and
a third extender attached to said third attacher for extending said third locking rod.

16. The pet crate of claim 10, wherein, said pet crate is partially or entirely made of a material selected from the group consisting of: plastic, wood, metal, and a combination of at least two of said above-mentioned materials.

17. The pet crate of claim 10, wherein, said pet crate is partially or entirely made of wires welded to one another.

18. The pet crate of claim 10, further comprising a plurality of dikes respectively molded to and around said grooming platform, provided urine, wherein said dikes are for preventing said urine from running off said grooming platform and are for strengthening said grooming platform.

19. A pet crate comprising:
a top panel;
a bottom panel;
a left panel;
a right panel;
a front panel having an opening for ingress and egress of a pet into and out of said pet crate;
a rear panel;
a bottom hook foldably connected to said bottom panel;
a plurality of side hooks respectively welded to said left and said right panels;
a plurality of top hooks respectively welded to said front and said rear panels;
a plurality of clamps clamping said top, said bottom, said left, and said right panels together;
a first big-dog-accommodating door hinge attached to said front panel;
a second big-dog-accommodating door hinge;
a third big-dog-accommodating door hinge;
a first big-dog-accommodating door panel rotatably attached to
said first big-dog-accommodating door hinge and
said second big-dog-accommodating door hinge;
a second big-dog-accommodating door panel rotatably attached to
said second big-dog-accommodating door hinge and
said third big-dog-accommodating door hinge;
a third big-dog-accommodating door panel rotatably attached to
said third big-dog-accommodating door hinge;
two rings respectively attached to said front panel for locking said first door hinge therein;
a first magnet attached to said front panel;
a second magnet attached to said third big-dog-accommodating door panel for pulling said third big-dog-accommodating door panel to said first magnet to lock said third big-dog-accommodating door panel thereto; and
a third magnet attached to said top panel for pulling said second magnet thereto to lock said third big-dog-accommodating door panel to said top panel.

20. The pet crate of claim 19, wherein, said pet crate is partially or entirely made of a material selected from the group consisting of: plastic, wood, metal, and metallic wires welded to one another.

* * * * *